US008848933B2

(12) United States Patent
Yoshioka et al.

(10) Patent No.: US 8,848,933 B2
(45) Date of Patent: Sep. 30, 2014

(54) SIGNAL ENHANCEMENT DEVICE, METHOD THEREOF, PROGRAM, AND RECORDING MEDIUM

(75) Inventors: Takuya Yoshioka, Kyoto (JP); Tomohiro Nakatani, Kyoto (JP); Masato Miyoshi, Kyoto (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 868 days.

(21) Appl. No.: 12/920,222

(22) PCT Filed: Mar. 5, 2009

(86) PCT No.: PCT/JP2009/054215
§ 371 (c)(1),
(2), (4) Date: Nov. 9, 2010

(87) PCT Pub. No.: WO2009/110574
PCT Pub. Date: Sep. 11, 2009

(65) Prior Publication Data
US 2011/0044462 A1 Feb. 24, 2011

(30) Foreign Application Priority Data
Mar. 6, 2008 (JP) ................................ 2008-056757
Aug. 22, 2008 (JP) ................................ 2008-214066

(51) Int. Cl.
*H04B 3/20* (2006.01)

(52) U.S. Cl.
USPC ........... 381/66; 381/71.12; 381/92; 381/94.3; 381/98; 700/94; 704/219; 704/226

(58) Field of Classification Search
CPC . G10L 21/0216; G10L 21/0232; G10L 15/20; G10L 21/0205; G10L 25/12; G10L 25/18;
(Continued)

(56) References Cited

U.S. PATENT DOCUMENTS 7,440,891 B1 10/2008 Shozakai et al.
8,271,277 B2 * 9/2012 Kinoshita et al. ............ 704/226
(Continued)

FOREIGN PATENT DOCUMENTS

JP 2005 249816 9/2005
JP 2006 243290 9/2006
(Continued)

OTHER PUBLICATIONS

Marc, et al "Dereverberation and Denoising Using Multichannel Linear Prediction", IEEE Transactions on Audio Speech, and Langauge Processing, vol. 15, No. 6, Aug. 2007.*
Marc, et al "On the Use of Lime Dereverberation Algorithm in an Acoustic Environment with a Noise Source", IEEE, 2006, p. 825-828.*

(Continued)

*Primary Examiner* — Leshui Zhang
(74) *Attorney, Agent, or Firm* — Oblon, Spivak, McClelland, Maier & Neustadt, L.L.P.

(57) ABSTRACT

The initial values of parameter estimates are set, including reverberation parameter estimates, which includes a regression coefficient used in a linear convolutional operation for calculating an estimated value of reverberation included in an observed signal, source parameter estimates, which includes estimated values of a linear prediction coefficient and a prediction residual power that identify the power spectrum of a source signal, and noise parameter estimates, which include noise power spectrum estimates. Then, the maximum likelihood estimation is used to alternately repeat processing for updating at least one of the reverberation parameter estimates and the noise parameter estimates and processing for updating the source parameter estimates until a predetermined termination condition is satisfied.

16 Claims, 12 Drawing Sheets

(58) Field of Classification Search

CPC .......... G10L 25/21; G10L 25/39; G10L 25/84; H04R 3/005; H04R 3/02; H04R 2410/05; H04R 2203/509

USPC .............. 381/92, 94.1, 94.2, 94.3, 94.4, 94.7, 381/94.8, 95, 96, 98, 100, 101, 102, 103, 381/106, 107, 108, 110, 120, 121, 122, 77, 381/80, 83, 334, 91, 26, 71.1, 71.3, 71.4, 381/71.11, 71.12, 61, 62, 66; 700/94; 704/219, 220, 222, 226, 233, 236, 237, 704/239, 240, 246, 262, 265; 708/300, 305, 708/308, 315, 320, 322, 403, 404, 405, 420, 708/441, 494

See application file for complete search history.

(56) References Cited

U.S. PATENT DOCUMENTS

| | | | |
|---|---|---|---|
| 8,290,170 B2 * | 10/2012 | Nakatani et al. ................ | 381/66 |
| 2006/0122832 A1 | 6/2006 | Takiguchi et al. | |
| 2008/0294432 A1 | 11/2008 | Takiguchi et al. | |

FOREIGN PATENT DOCUMENTS

| | | | |
|---|---|---|---|
| JP | 2006243290 A | * | 9/2006 |
| JP | 2007 41508 | | 2/2007 |
| WO | 98 39946 | | 9/1998 |

OTHER PUBLICATIONS

Lim, S. Jae et al., "All-Pole Modeling of Degraded Speech", IEEE Transactions on Acoustics, Speech, and Signal Processing, vol. ASSP-26, No. 3, pp. 197-210, (Jun. 1978).

Yoshioka, Takuya et al., "Dereverberation by Using Time-Variant Nature of Speech Production System", EURASIP Journal on Advances in Signal Process, vol. 2007, Article ID 65698, 15 pages, doi: 10. 1155/2007/65698, (2007).

Ito, Nobutaka et al., "Diffuse noise suppression by crystal-array-based post-filter design", IEICE Technical Report EA2008-13, SIP2008-22, The Institute of Electronics, Information and Communication Engineers, pp. 43-46, (May 2008), (with partial English translation).

International Search Report issued May 26, 2009 in PCT/JP09/054215 filed Mar. 5, 2009.

* cited by examiner

Background Art

SIGNAL ENHANCEMENT DEVICE, METHOD THEREOF, PROGRAM, AND RECORDING MEDIUM

TECHNICAL FIELD

The present invention relates to a technology for enhancing a source signal by reducing additive distortion and multiplicative distortion contained in an observed signal.

BACKGROUND ART

Signal enhancement technologies for enhancing a source signal contained in an observed signal in which additive distortion and multiplicative distortion are superimposed on the source signal reduce the additive distortion or multiplicative distortion. First, a general signal enhancement technology for a speech signal will be described. In this case, the additive distortion corresponds to noise in a room while the multiplicative distortion corresponds to reverberation.

FIG. 1 is a block diagram showing the general structure of a signal enhancement device.

First, a time-domain waveform signal of observed sound is obtained by using a sensor such as a microphone, by loading it from an audio file, or by using other ways. Then, it is sampled, quantized, and input to a subband decomposition unit. The time-domain observed signal is divided into narrow-band signals of different frequency bands by the subband decomposition unit. This means that the time-domain observed signal is converted to a time-frequency-domain observed signal. A set of the observed signals divided into the frequency bands will be hereafter referred to as a complex spectrogram of the observed signal. The subband decomposition unit realizes this process by using conventional technologies, such as a short time Fourier transform and a polyphase filter bank. There is also a source signal enhancement method that directly uses the time-domain observed signal without dividing the signal into frequency bands. This specification assumes the time-frequency-domain if the domain of the signal is not explicitly indicated.

A parameter estimation unit then estimates some parameters characterizing the observed signal from the complex spectrogram of the observed signal. The parameters may be parameters of an all pole model characterizing power spectra of a source signal or noise, regression coefficients of an autoregressive model characterizing a room transfer system, and so on.

A source signal estimation unit calculates an estimate of the complex spectrogram of the source signal by using the complex spectrogram of the observed signal and the estimated parameter values. Then, a subband synthesis unit generates an estimate of the time-domain source signal based on the estimated complex spectrogram of the source signal. The way of processing for the subband synthesis unit is chosen according to the way of processing for the subband decomposition unit. If the subband decomposition unit executes a short time Fourier transform, the subband synthesis unit performs an overlap add technique. If the subband decomposition unit executes polyphase filter bank analysis, the subband synthesis unit performs polyphase filter bank synthesis. If the subband decomposition unit is omitted, the subband synthesis unit is also omitted.

The conventional speech signal enhancement technologies can be divided roughly into two categories: One is designed for an environment where a source signal and noise are present (refer to non-patent literature 1, for example); the other is designed for an environment where a source signal and reverberation are present (refer to non-patent literature 2, for example). The former reduces noise contained in an observed signal in which the noise is imposed on the source signal. The latter reduces reverberation contained in an observed signal in which the reverberation is imposed on the source signal. Next, the speech signal enhancement technologies proposed in non-patent literature 1 and 2 will be described. Symbols such as ^ and ~ used in the text given below should be typed above a letter but are typed immediately after the letter because of the limitations of text notation.

<Noise Reduction Technology in Non-Patent Literature 1>

Non-patent literature 1 describes a noise reduction technology for reducing noise contained in an observed signal in which the noise is imposed on a source signal. The ways of processing in each unit disclosed in non-patent literature 1 will be described below.

The subband decomposition unit in non-patent literature 1 divides the observed signal into narrow-band signals of different frequency bands using a short time Fourier transform. The parameter estimation unit in non-patent literature 1 estimates source parameters $_{s}\Theta$ of an all pole model of the source signal and noise parameters $_{d}\Theta$ of a noise model, where these parameters are chosen as the parameters characterizing the observed signal in which the noise is superimposed onto the source signal.

In the example described in non-patent literature 1, true values $_{d}\Theta^{\sim}$ of the noise parameters are calculated by using the observed signal in a time segment where the source signal is supposed to be absent (step S101). Initial values $_{s}\Theta^{\hat{}(0)}$ of the source parameter estimates are specified (step S102). An index i indicating an iteration count is set to 0 (step S103).

Both the source parameter estimates $_{s}\Theta^{\hat{}(i)}$ and the true values $_{d}\Theta^{\sim}$ of the noise parameters are then used to calculate a posterior distribution $p(S|Y, {}_{s}\Theta^{\hat{}(i)}, {}_{d}\Theta^{\sim})$ of a complex spectrogram S of the source signal conditioned on the source parameter estimates $_{s}\Theta^{\hat{}(i)}$, the true values $_{d}\Theta^{\sim}$ of the noise parameters, and the complex spectrogram Y of the observed signal (step S104). Then, the conditional posterior distribution $p(S|Y, {}_{s}\Theta^{\hat{}(i)}, {}_{d}\Theta^{\sim})$ is used to update the source parameter estimates from $_{s}\Theta^{\hat{}(i)}$ to $_{s}\Theta^{\hat{}(i+1)}$ (step S105). Until a predetermined termination condition is satisfied (step S106), steps S104 and S105 are iteratively performed while incrementing the i value by 1 in each iteration (step S107). The source parameter estimates $_{s}\Theta^{\hat{}(i+1)}$ obtained when the predetermined termination condition is satisfied are output as final estimates $_{s}\Theta^{\hat{}}$ of the source parameters (step S108).

The source signal estimation unit then obtains an estimate of the complex spectrogram of the source signal by using the parameters $_{d}\Theta^{\sim}$ and $_{s}\Theta^{\hat{}}$ estimated by the parameter estimation unit and a Wiener filter. The subband synthesis unit converts the estimate of the complex spectrogram to the estimate of the time-domain source signal by using an overlap add technique.

<Reverberation Reduction Technology in Non-Patent Literature 2>

Non-Patent Literature 2 describes a reverberation reduction technology for reducing reverberation contained in an observed signal in which the reverberation is imposed on the source signal. The ways of processing in each unit disclosed in non-patent literature 2 will be described below.

In the reverberation reduction technology disclosed in non-patent literature 2, subband decomposition is not performed. The parameter estimation unit and the source signal estimation unit in non-patent literature 2 process the time-domain observed signal directly. The parameter estimation unit estimates source parameters $_{s}\Theta$ and reverberation parameters $_{g}\Theta$, where these parameters are chosen as the parameters characterizing the observed signal, in which the reverberation is imposed on the source signal. The reverberation parameters in non-patent literature 2 are regression coefficients of a linear filter for calculating the reverberation imposed on the source signal. The linear filter is applied to the time-domain observed signal in which only the reverberation is superimposed onto the source signal.

In the example described in non-patent literature 2, initial values) ${}_g\hat{\Theta}^{(0)}$ of the reverberation parameter estimates are specified (step S111). An index i indicating an iteration count is set to 0 (step S112).

By using the reverberation parameter estimates ${}_g\hat{\Theta}^{(0)}$, the source parameter estimates are updated to ${}_s\hat{\Theta}^{(i+1)}$ (step S113). Then, by using the updated source parameter estimates ${}_s\hat{\Theta}^{(i+1)}$, the reverberation parameter estimates are updated to ${}_g\hat{\Theta}^{(i+1)}$ (step S114). Until a predetermined termination condition is satisfied (step S115), steps S113 and S114 are iteratively performed while incrematin the i value by 1 in each iteration (step S116). The source parameter estimates ${}_s\hat{\Theta}^{(i+1)}$ obtained when the predetermined termination condition is satisfied are considered to be final estimates ${}_s\hat{\Theta}$ of the source parameters. The reverberation parameter estimates ${}_g\hat{\Theta}^{(i+1)}$ are output as the final estimate ${}_g\hat{\Theta}$ of the reverberation parameters (step S117).

Then, the source signal estimation unit estimates the reverberation contained in the observed signal by convolving the observed signal with a linear filter generated by using the final estimates $g\hat{\Theta}$ of the reverberation parameters calculated by the parameter estimation unit and subtracts it from the observed signal. By doing this, the source signal estimation unit calculates and outputs a dereverberated signal.

Non-patent literature 1: Lim, J. S. and Oppenheim, A. V., "All pole modeling of degraded speech," IEEE Trans. Acoust. Speech, Signal Process., Vol. 26, No. 3, pp. 197-210 (1978).

Non-patent literature 2: Yoshida, T., Hikichi, T. and Miyoshi, M., "Dereverberation by Using Time-Variant Nature of Speech Production System," EURASIP J. Advances in Signal Process, Vol. 2007 (2007), Article ID 65698, 15 pages, doi: 10.1155/2007/65698.

DISCLOSURE OF THE INVENTION

Problems to be Solved by the Invention

No signal enhancement technology for a noisy reverberant environment has ever been provided.

Signals observed by M sensors 1000-1 to 1000-M (M≥1) in a noisy reverberant environment are generated by a system shown in FIG. 2. First, reverberation is imposed on a signal (hereafter "source signal") that is free from noise and reverberation and emitted from a signal source 1010 (such as a speaker). This results from the process in which the source signal is convolved with room impulse responses by a reverberation superimposing system (room transfer system). Then, a noise superimposing system superimposes noise to the signal obtained after the reverberation has been imposed (hereafter "reverberant signal"). Thus, signals that include both of the noise and reverberation (hereafter "noisy reverberant signal") are generated and observed by the sensors.

As has been described earlier, the conventional reverberation reduction technology estimates the reverberation parameters and the source parameters when the reverberant signal is given, and then restores the source signal by using the estimated reverberation parameters. To execute reverberation reduction processing in the system shown in FIG. 2, the reverberant signal must be obtained in advance by reducing the noise from the noisy reverberant signal by noise reduction processing. To reduce the noise efficiently from the noisy reverberant signal in the system shown in FIG. 2, it is preferable that the characteristics of the reverberant signal be known in advance. However, the characteristics of the reverberant signal are determined by the characteristics of the source signal (the source parameters) and the room transfer system (the reverberation parameters), and therefore these characteristics would be obtained by the reverberation reduction processing. Consequently, in order to enhance the source signal effectively in the system shown in FIG. 2, the noise reduction processing and the reverberation reduction processing must be unified.

The conventional noise reduction technology reduces noise contained in an observed signal in which only the noise is imposed on the source signal. Therefore, accurate noise reduction cannot be expected if one simply applies the conventional noise reduction technology to the above noise reduction processing to reduce the noise from the noisy reverberant signal. The noise reduction processing and reverberation reduction processing should not be simply concatenated; they should be unified. However, how to do that is not obvious.

These problems could occur not only when the target is a speech signal but also when the target is a different acoustic signal, an ultrasonic signal, or other types of signals. They are general problems when ones wishes to reduce additive distortion and multiplicative distortion and thereby enhance the original signal contained in a signal in which multiplicative distortion and additive distortion are present. Here, the multiplicative distortion is imposed by a linear convolutive system on the original signal, which is free from the multiplicative and additive distortion and emitted from a signal source. The additive distortion is then imposed on the multiplicatively distorted signal. In this specification, the following terms are used to clarify the relationship in the case of a speech signal: A signal that is emitted from a signal source and free from additive distortion or multiplicative distortion is called a source signal; a signal generated by imposing multiplicative distortion on the source signal is called a reverberant signal; a signal generated by imposing additive distortion on the reverberant signal is called a noise reverberant signal; a linear convolutive system that imposes the multiplicative distortion is called a room transfer system; the additive distortion is called noise; and the multiplicative distortion is called reverberation.

Means to Solve the Problems

According to the present invention, in a parameter estimation unit, time-frequency-domain observed signals which are calculated based on signals observed in the time domain are first stored in a memory. In an initialization unit, initial values of parameter estimates are set. The parameters include reverberation parameter estimates that include regression coefficients used for linear convolution for calculating an estimate of the reverberation contained in the observed signal; source parameter estimates that include estimates of linear prediction coefficients and prediction residual powers that characterize the power spectra of a source signal; and noise parameter estimates that include a noise power spectrum estimate.

Then, the observed signal and the parameter estimates are input to a first updating unit. The first updating unit performs one of two updating processes: one updates at least one of the reverberation parameter estimates and the noise parameter estimates; the other updates the source parameter estimates. The updating processing is performed so that the logarithmic likelihood function of the parameter estimates is increased;

At least one of the parameter estimates updated in the first updating unit are input to a second updating unit. The second updating unit performs one of two updating processes: one updates at least one of the reverberation parameter estimates and the noise parameter estimates; the other updates the source parameter estimates. Here, the updating processing that is not chosen in the first updating unit is executed. The updating processing is performed so that the logarithmic likelihood function of the parameter estimates is increased.

Whether a termination condition is satisfied is determined in a termination condition check unit. If the termination condition is not satisfied, the processing in the first updating unit and that in the second updating unit are executed again.

Effects of the Invention

As described above, in the parameter estimation unit of the present invention, the update of the parameter estimates in the first updating unit and the update of the parameter estimates in the second updating unit are iteratively performed with each depending on the other. Hence, noise and reverberation can be accurately reduced from a signal observed in a noisy reverberant environment and the source signal is enhanced.

DETAILED DESCRIPTION OF THE EMBODIMENTS

Figure 1:
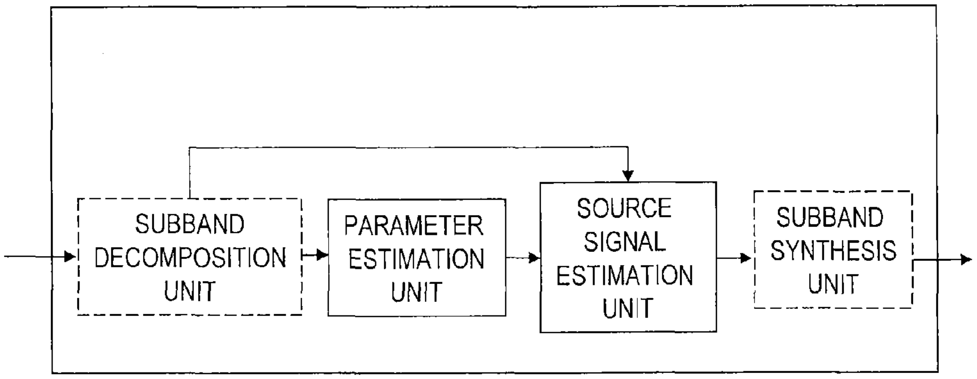
FIG. 1 is a block diagram showing a general structure of a speech signal enhancement device.

Now, embodiments of the present invention will be described with reference to the drawings.

A parameter estimation unit in the embodiments will be described first. The parameters in the embodiments include reverberation parameters, source parameters, and noise parameters. The reverberation parameters include at least regression matrices assuming that the room transfer system is modeled as a multi-channel autoregressive system. By convolving a multi-input multi-output impulse response formed by the regression matrices with the reverberant signal, the reverberation contained in the reverberant signal is calculated. The source parameters include at least prediction residual powers and linear prediction coefficients characterizing a short time power spectral densities of the source signal. The noise parameters include at least a short time cross-power spectral matrix of noise. The parameter estimation unit of the embodiments estimates the reverberation parameters, source parameters, and noise parameters by maximum likelihood estimation by using a variation of the EM algorithm such as the ECM algorithm.

More specifically, the parameter estimation unit in the embodiments can be described for example as follows. The parameters in the embodiments can be classified into two groups: a first parameter group includes at least the reverberation parameters; and a second parameter group includes at least the source parameters. The noise parameters may be included in either of the first parameter group or the second parameter group, but they are supposed to be included in the first parameter group in the embodiments.

An observed signal is first stored in a memory.

An initialization unit initializes the estimates of the parameters of the first parameter group and the estimates of the parameters of the second parameter group.

The observed signal, the estimates of the parameters of the first parameter group, and the estimates of the parameters of the second parameter group are input to a first updating unit. The first updating unit keeps the estimates of the parameters of one of the first parameter group or the second parameter group fixed and updates the estimates of at least at part of the parameters of the remaining parameter group. The first updating unit updates the parameter estimates so that the logarithmic likelihood function of the parameter estimates is increased.

The observed signal and at least some of the estimates of the parameters of the first parameter group and the estimates of the parameters of the second parameter group are input to a second updating unit. The second updating unit keeps the estimates of the parameters of the parameter group that is updated by the first updating unit fixed and updates the estimates of at least ar part of the parameters of the parameter group kept that is fixed in the first updating unit. The second updating unit updates the parameter estimates so that the logarithmic likelihood function of the parameter estimates is increased.

A termination condition check unit determines whether a predetermined termination condition is satisfied. If the termination condition is not satisfied, the processing goes back to the stage that is performed by the first updating unit. If the predetermined termination condition is satisfied, the parameter estimates at that time are output.

First Embodiment

Outline of Parameter Estimation Processing in this Embodiment

An outline of the parameter estimation processing in this embodiment will be described next.

[Observed Signal Storage Processing Stage]

In the observed signal storage processing stage, the observed signal is stored in a memory.

[Initialization Processing Stage]

In the initialization processing stage, the estimates of the parameters of the first parameter group and the estimates of the parameters of the second parameter group are initialized.

[First Update Processing Stage]

In the first update processing stage of this embodiment, the parameter estimates of the second parameter group, which includes the source parameters, are updated while the parameter estimates of the first parameter group, which includes the reverberation parameters, are kept fixed. More specifically, the first update processing stage in this embodiment performs noise reduction and update of the source parameter estimates.

<<Noise Reduction>>

In the noise reduction, the observed signal and parameter estimates are used to calculate the covariance matrix and mean of a complex normal distribution characterizing the conditional posterior distribution of a reverberant signal, p(reverberant signal|observed signal, parameter estimates).

This processing can be regarded as reducing the noise contained in the observed signal in the sense that the conditional posterior distribution of the reverberant signal, which is free from the noise, is obtained from the observed signal. Note that this noise reduction is executed based on the reverberation parameter estimates and the source parameter estimates. This means that the noise is reduced by taking the reverberation characteristics into account. Accordingly, accurate noise reduction can be performed even in reverberant environments.

<<Update of Source Parameter Estimates>>

In the update of the source parameter estimates, the source parameter estimates are updated by using the reverberation parameter estimates and the covariance matrix and mean of the conditional posterior distribution of the reverberant signal. The source parameter estimates are updated so that the auxiliary function of the source parameters is maximized.

One can define the auxiliary function as follows: Consider a logarithmic likelihood function of the parameter estimates that is defined based on the observed signal and reverberant signal. By weighting the logarithmic likelihood function by the conditional posterior distribution of the reverberant signal, p(reverberant signal|observed signal), and integrating it over the reverberant signal, the auxiliary function is obtained. The weighted integration makes it possible to update the source parameter estimates by taking account of the uncertainty of the reverberant signal calculated in the noise reduction stage.

[Second Update Processing Stage]

In the second update processing stage of this embodiment, the parameter estimates of the first parameter group, which includes the reverberation parameters, are updated while the parameter estimates of the second parameter group, which includes the source parameters, are kept fixed. The reverberation parameter estimates are updated so that the auxiliary function of the parameters is maximized.

[Termination Condition Check Stage]

The termination condition check stage checks if a predetermined termination condition is satisfied. If the termination condition is not satisfied, the processing goes back to the first update processing stage. If the termination condition is satisfied, the parameter estimates at that time are output.

In the processing described above, the covariance matrix of the conditional posterior distribution of the reverberant signal increases monotonically as the noise variance. In other words, as the noise level increases, the covariance matrix of the conditional posterior distribution of the reverberant signal increases. This means that the way for evaluating the uncertainty of the reverberant signal obtained at the noise reduction stage in this embodiment is valid.

<Principle of this Embodiment>

Now, the principle of this embodiment will be described.

This embodiment is based on a statistical estimation methodology. Source parameters ${}_{s}\Theta$, reverberation parameters ${}_{g}\Theta$, and noise parameters ${}_{d}\Theta$ must be specified first. A set of all the parameters is expressed as $\Theta=\{{}_{s}\Theta, {}_{g}\Theta, {}_{d}\Theta\}$. These parameters, Θ, must be associated with a set Y of noisy reverberant signals (i.e., the observed signals). The noisy reverberant signal set Y is a set of noisy reverberant signals observed during a predetermined period. The noisy reverberant signal set Y in this embodiment is assumed to be a complex spectrogram of the noisy reverberant signal, as described later.

In this embodiment, the probability density function $p(Y|\Theta)$ of the noisy reverberant signal set Y conditioned on given parameters Θ are formulated to associate the parameters Θ with the set Y. With this formulation, the noisy reverberant signal set Y is regarded as a signal characterized by the probability distribution described by the probability density function $p(Y|\Theta^{\sim})$ conditioned on the true values $\Theta^{\sim}=\{{}_{s}\Theta^{\sim}, {}_{g}\Theta^{\sim}, {}_{d}\Theta^{\sim}\}$ of the unknown parameters.

In this embodiment, the true values $\Theta^{\sim}$ of the parameters are estimated by maximum likelihood estimation from the set Y of the noisy reverberant signals (i.e., the observed signals). One obtains the parameter values $\Theta^{\wedge}=\{{}_{s}\Theta^{\wedge}, {}_{g}\Theta^{\wedge}, {}_{d}\Theta^{\sim}\}$ that combine to maximize the likelihood function $p(Y|\Theta^{\sim})$ when the noisy reverberant signal set Y is observed. These values are then considered to be the final estimates of the true values $\Theta^{\sim}$ of the parameters. The noise parameters ${}_{d}\Theta$ are estimated separately from a period in which the source signal is assumed to be absent, and the estimates are regarded as the true values ${}_{d}\Theta^{\sim}$ of the noise parameters. The estimates calculated by the maximum likelihood estimation are regarded as the true values ${}_{s}\Theta^{\sim}$ of the source parameters and the true values ${}_{g}\Theta^{\sim}$ of the reverberation parameters.

Actually, the values ${}_{s}\Theta^{\sim}$ and ${}_{g}\Theta^{\sim}$ that maximize the probability density function $p(Y|\Theta^{\sim})$ cannot be obtained directly at the same time. Therefore, the expectation-conditional maximization (ECM) algorithm is used in this embodiment. The set of the noisy reverberant signals (i.e., the observed signals) Y is used and the following steps are iteratively executed in turn to update the parameter estimates: E-step, which calculates the conditional posterior distribution of the reverberant signal set X based on the noisy reverberant signal set Y and the parameter estimates $\Theta^{\wedge}$; CM-step 1, which updates the source parameter estimates ${}_{s}\Theta^{\wedge}$; CM-step2, which updates the reverberation parameter estimates ${}_{g}\Theta^{\wedge}$. The parameter estimates obtained when a predetermined termination condition is satisfied are assumed to be the estimates of the true parameter values (i.e., the final estimates). The reverberant signal set X is a set of reverberant signals during the predetermined observation period. The reverberant signal set X in this embodiment is assumed to be a complex spectrogram of the reverberant signal, as described later.

[Statistical Model of Observed Signal (Noisy Reverberant Signal)]

What should be done first is to define the probability density function $p(Y|\Theta)$ of the noisy reverberant signal set Y conditioned on parameters Θ. For that purpose, a statistical model of the observed signal (noisy reverberant signal) set Y is assumed. In this embodiment, an all pole model of the source signal, an autoregressive model of the room transfer system, and a model of noise are assumed as described later.

In the following, it is assumed that all the signals have been converted to time-frequency-domain complex spectrograms. Each complex spectrogram is associated with the number of frames T (constant) and the number of frequency bands N (constant). Although the following use terminologies that are usually used with a short time Fourier transform, any time-frequency analysis methods that have a constant bandwidth (such as a polyphase filter bank) can be used to convert a signal into the time-frequency-domain.

<<Model of Source Signal>>

First, the all pole model of the source signal will be described. Let $S_{t,w}$ be the (complex-valued) discrete Fourier transform coefficient of a source signal in the t-th frame ($0 \le t \le T-1$) and the w-th frequency band ($0 \le w \le N-1$). Here, t ($0 \le t \le T-1$) is a frame index, and w ($0 \le w \le N-1$) is a frequency band index.

$S_{t,w}$ is assumed to satisfy the following conditions:

1. Let us denote an angular frequency by $\omega \in \{-\pi, \pi\}$. The power spectral density ${}_s\lambda_t(\omega)$ of the source signal in the t-th frame is expressed by an all pole spectral density of order P ($P \ge 1$) as follows.

$$ {}_s\lambda_t(\omega) = \frac{{}_s\sigma_t^2}{|A_t(e^{j\omega})|^2} \tag{1} $$

$$ A_t(z) = 1 - a_{t,1}z^{-1} - \dots - a_{t,P}z^{-P} \tag{2} $$

Here, $\{a_{t,1}, \dots, a_{t,P}\}$ and ${}_s\sigma_t^2$ are, respectively, linear prediction coefficients and a prediction residual power obtained from linear prediction analysis of the source signal. Moreover, z is a complex variable in z transform; e is Napier's constant, and j is an imaginary unit. Therefore, the source parameters ${}_s\Theta$ are defined as ${}_s\Theta = \{a_{t,1}, \dots, a_{t,p}, {}_s\sigma_t^2\}_{0 \le t \le T-1}$, where $\{m_\alpha\}_{0 \le \alpha \le M-1}$ is a set of M elements, $m_0, m_1, \dots m_{M-1}$.

2. The coefficient $S_{t,w}$ is distributed according to the complex normal distribution whose mean is 0 and whose variance is ${}_s\lambda_t(2\pi w/N)$ as shown below.

$$ p(S_{t,w}|{}_s\Theta) = N_C\{S_{t,w}; 0, {}_s\lambda_t(2\pi w/N)\} \tag{3} $$

Here, $N_c\{x; \mu, \Sigma\}$ is the probability density function of a $\zeta$ dimensional random variable x that follows the complex normal distribution with mean $\mu$ and covariance matrix $\Sigma$, which is defined as follows. In the equation, $\alpha^H$ denotes a complex conjugate transpose (Hermitian conjugate) of $\alpha$.

$$ N_C\{x; \mu, \Sigma\} = \frac{1}{\pi^\zeta|\Sigma|}\exp\{-(x-\mu)^H\Sigma^{-1}(x-\mu)\} \tag{4} $$

Here, $|\Sigma|$ is the determinant of $\Sigma$. By substituting Equation (4) into Equation (3) and setting $\zeta=1$, the probability density function of $S_{t,w}$ is obtained by the following equation.

$$ p(S_{t,w}|_s\Theta) = \frac{1}{\pi_s\lambda_t(2\pi w/N)}\exp\left\{-\frac{|S_{t,w}|^2}{{}_s\lambda_t(2\pi w/N)}\right\} \tag{5} $$

3. If $(t, w) \ne (t', w')$, $S_{t,w}$ and $S_{t',w'}$ are statistically independent.

Model of Room Transfer System

Next, the model of the room transfer system will be described. Let $X_{t,w}$ be the discrete Fourier transform coefficient of the reverberant signal in the t-th frame ($0 \le t \le T-1$) and the w-th frequency band ($0 \le w \le N-1$). It is assumed that the room transfer system can be expressed by using an autoregressive model in each frequency band. If regression coefficients of the autoregressive model in the w-th frequency band are $g_{1,w}, \dots, g_{Kw,w}$, the discrete Fourier transform coefficient $X_{t,w}$ of the reverberant signal is generated as shown below, where $g_{k,w}^*$ is a complex conjugate of $g_{k,w}$.

$$ X_{t,w} = \sum_{k=1}^{K_w} g_{k,w}^* X_{t-k,w} + S_{t,w} \tag{6} $$

The reverberation parameters ${}_g\Theta$ are defined as ${}_g\Theta = \{\{g_{k,w}\}_{1 \le k \le Kw}\}_{0 \le w \le N-1}$. These reverberation parameters ${}_g\Theta$ are applied to the reverberant signal, in which only reverberation is superimposed onto the source signal, according to the following equation to calculate the reverberation contained in the reverberant signal.

$$ S_{t,w} = X_{t,w} - \sum_{k=1}^{K_w} g_{k,w}^* X_{t-k,w} $$

<<Noise Model>>

A noise model will be described next. In this embodiment, let $D_{t,w}$ and $Y_{t,w}$ be the discrete Fourier transform coefficients of the noise and the noisy reverberant signal, respectively, in the t-th frame ($0 \le t \le T-1$) and the w-th frequency band ($0 \le w \le N-1$). Let $Y_{t,w}$ be the sum of the reverberant signal $X_{t,w}$ and noise $D_{t,w}$.

$$ Y_{t,w} = X_{t,w} + D_{t,w} \tag{7} $$

It is assumed that $D_{t,w}$ satisfies the following conditions:

1. Noise is stationary, and its power spectral density is given by ${}_d\lambda(\omega)$ (independent of the frame number t because of the stationary). The coefficient $D_{t,w}$ is distributed according to a complex normal distribution with mean 0 and variance ${}_d\lambda(2\pi w/N)$.

$$ \begin{aligned} p(D_{t,w}|_d\Theta) &= N_C\{D_{t,w}; 0, {}_d\lambda(2\pi w/N)\} \\ &= \frac{1}{\pi_d\lambda(2\pi w/N)}\exp\left\{-\frac{|D_{t,w}|^2}{{}_d\lambda(2\pi w/N)}\right\} \end{aligned} \tag{8} $$

Here, the noise parameters ${}_d\Theta$ are defined as ${}_d\Theta = \{{}_d\lambda(2\pi w/N)\}_{0 \le w \le N-1}$ and characterize the noise.

2. If $(t, w) \ne (t', w')$, $D_{t,w}$ and $D_{t',w'}$ are statistically independent.

3. For any $(t, w, t', w')$, $S_{t,w}$ and $D_{t',w'}$ are statistically independent.

<<Probability Density Function of Noisy Reverberant Signal>>

On the basis of the above assumptions, the probability density function of the noisy reverberant signal is formulated below.

In this embodiment, the complex spectrograms of the source signal, reverberant signal, and noisy reverberant signal (corresponding to sets of the source signals, reverberant signals, and noisy reverberant signals, respectively) are expressed as S, X, and Y respectively.

$$ S = \{S_{t,w}\}_{0 \le t \le T-1, 0 \le w \le N-1} \tag{9} $$

$$ X = \{X_{t,w}\}_{0 \le t \le T-1, 0 \le w \le N-1} \tag{10} $$

$$ Y = \{Y_{t,w}\}_{0 \le t \le T-1, 0 \le w \le N-1} \tag{11} $$

Here, $\{m_{\alpha\beta}\}_{0 \le \alpha \le T-1, 0 \le \beta \le N-1}$ is a set of T·N elements from $m_{0,0}$ to $m_{T-1,N-1}$.

More specifically, the probability density function of the complex spectrogram Y of the noisy reverberant signal (corresponding to the likelihood function of the parameters $\Theta$ for the given set Y of the observed signals) can be expressed as follows.

$$ p(Y|\Theta) = \int p(Y, X|\Theta)dX \tag{12} $$

On the basis of the above assumptions, $p(Y, X|\Theta)$ can be expressed as follows.

$$p(Y, X \mid \Theta) \propto \left(\prod_{w=0}^{N-1} {}_d\lambda(2\pi w/N)^{-T}\right) \left(\prod_{t=0}^{T-1} ({}_s\sigma_t^2)^{-N}\right) \times \exp\left\{-\sum_{t=0}^{T-1}\sum_{w=0}^{N-1}\left(\frac{|Y_{t,w} - X_{t,w}|^2}{{}_d\lambda(2\pi w/N)} + \frac{|A_t(e^{j2\pi w/N})|^2 \left|X_{t,w} - \sum_{k=1}^{K_w} g_{k,w}^* X_{t-k,w}\right|^2}{{}_s\sigma_t^2}\right)\right\} \quad (13)$$

Now, the probability density function $p(Y|\Theta)$ of the complex spectrogram of the noisy reverberant signal has been formulated by using the parameters $\Theta=\{{}_s\Theta, {}_g\Theta, {}_d\Theta\}$.

[Maximum Likelihood Estimation of Source Parameters and Reverberation Parameters]

In this embodiment, the true values $\Theta^{\sim}$ of the unknown parameters are estimated from the complex spectrogram Y of the observed noisy reverberant signal by the maximum likelihood estimation as noted above. The values $\Theta$ that combined to maximize the likelihood function $p(Y|\Theta)$. Here, the parameters $\Theta$ are regarded as variables for a given set Y of noisy reverberant signals, used as the estimates of the true values $\Theta^{\sim}$. In this embodiment, however, the true values ${}_d\Theta^{\sim}$ of the noise parameters are estimated separately in advance from the period in which the source signal is absent. Since the true values ${}_d\Theta^{\sim}$ of the noise parameters are known and $\Theta^{\hat{}}=\{{}_s\Theta^{\hat{}}, {}_g\Theta^{\hat{}}, {}_d\Theta^{\sim}\}$, only ${}_s\Theta^{\hat{}}$ and ${}_g\Theta^{\hat{}}$ are calculated in this embodiment.

Because ${}_s\Theta^{\hat{}}$ and ${}_g\Theta^{\hat{}}$ that maximize the likelihood function $p(Y|\Theta)$ cannot be obtained directly at the same time, they are calculated by using the ECM algorithm. The processing flow in the ECM algorithm will be described below. In the processing, three steps, E-Step, CM-step 1 and CM-step2, are executed iteratively in turn. The parameter estimates in the i-th iteration are indicated by superscript (i). For the sake of clarification, $\Theta^{\sim}$, $\Theta^{\hat{}}$, and $\Theta^{\hat{}(i)}$ are defined as follows.

$$\tilde{\Theta}=\{{}_s\tilde{\Theta},{}_g\tilde{\Theta},{}_d\tilde{\Theta}\} \quad (14)$$

$${}_s\tilde{\Theta}=\{\tilde{a}_{t,1}, \ldots, \tilde{a}_{t,P},{}_s\tilde{\sigma}_t^2\}_{0\le t\le T-1} \quad (15)$$

$${}_g\tilde{\Theta}=\{\{\tilde{g}_{k,w}\}_{1\le k\le K_w}\}_{0\le N-1} \quad (16)$$

$${}_d\tilde{\Theta}=\{{}_d\tilde{\lambda}(2\pi w/N)\}_{0\le w\le N-1} \quad (17)$$

$$\hat{\Theta}=\{{}_s\hat{\Theta},{}_g\hat{\Theta},{}_d\tilde{\Theta}\} \quad (18)$$

$${}_s\hat{\Theta}=\{\hat{a}_{t,1}, \ldots, \hat{a}_{t,P},{}_s\hat{\sigma}_t^2\}_{0\le t\le T-1} \quad (19)$$

$${}_g\hat{\Theta}=\{\{\hat{g}_{k,w}\}_{1\le k\le K_w}\}_{0\le w\le N-1} \quad (20)$$

$$\hat{\Theta}^{(i)}=\{{}_s\hat{\Theta}^{(i)},{}_g\hat{\Theta}^{(i)},{}_d\tilde{\Theta}\} \quad (21)$$

$${}_s\hat{\Theta}^{(i)}=\{\hat{a}_{t,1}^{(i)}, \ldots, \hat{a}_{t,P}^{(i)},{}_s\hat{\sigma}_t^{2(i)}\}_{0\le t\le T-1} \quad (22)$$

$${}_g\hat{\Theta}^{(i)}=\{\{\hat{g}_{k,w}^{(i)}\}_{1\le k\le K_w}\}_{0\le w\le N-1} \quad (23)$$

<<ECM Algorithm>>

1. The initial values $\Theta^{\hat{}(0)}$ of the parameter estimates are set. An iteration index i is set to 0.

2. E-step (Noise Reduction)

The conditional posterior distribution $p(X|Y, \Theta^{\hat{}(i)})$ of the reverberant signal is calculated.

3. CM-step 1 (Update of Source Parameter Estimates)

An auxiliary function $Q(\Theta|\Theta^{\hat{}(i)})$ is defined by the following equation.

$$Q(\Theta|\hat{\Theta}^{(i)})=\int p(X|Y,\hat{\Theta}^{(i)})\log p(Y,X|\Theta)dX \quad (24)$$

Now, the source parameter estimates are updated from ${}_s\Theta^{\hat{}(i)}$ to ${}_s\Theta^{\hat{}(i+1)}$ as follows.

$${}_s\hat{\Theta}^{(i+1)} = \underset{{}_s\Theta}{\mathrm{argmax}}\, Q(\Theta \mid \hat{\Theta}^{(i)}) \text{ under condition } {}_g\Theta = {}_g\hat{\Theta}^{(i)} \quad (25)$$

This indicates that ${}_s\Theta^{\hat{}(i+1)}$ that maximize the auxiliary function $Q(\Theta|\Theta^{\hat{}(i)})$ for the fixed reverberation parameter estimates ${}_g\Theta^{\hat{}(i)}$ are the updated source parameter estimates.

4. CM-step2 (Update of Reverberation Parameter Estimates)

The reverberation parameter estimates are updated as follows.

$${}_g\hat{\Theta}^{(i+1)} = \underset{{}_g\Theta}{\mathrm{argmax}}\, Q(\Theta \mid \hat{\Theta}^{(i)}) \text{ under condition } {}_s\Theta = {}_s\hat{\Theta}^{(i+1)} \quad (26)$$

This indicates that ${}_g\Theta^{\hat{}(i+1)}$ that maximizes the auxiliary function $Q(\Theta|\Theta^{\hat{}(i)})$ for the fixed source parameter estimates ${}_s\Theta^{\hat{}(i+1)}$ are the updated reverberation parameter estimates.

5. Termination condition check

If a predetermined termination condition is satisfied, the processing is be terminated with ${}_s\Theta^{\hat{}}={}_s\Theta^{\hat{}(i+1)}$ and ${}_g\Theta^{\hat{}}={}_g\Theta^{\hat{}(i+1)}$. Otherwise, the processing goes back to the E-step while incrementing the i value by one.

<<Procedures for Each Step>>

The procedures for the E-step, CM-step1, and CM-step2 will be described next.

1. Procedure for E-step

The discrete Fourier transform coefficient series of the source signal, that of the reverberant signal, and that of the noisy reverberant signal in the w-th frequency band are expressed as follows.

$$S_w = \begin{bmatrix} S_{T-1,w} \\ S_{T-2,w} \\ \vdots \\ S_{0,w} \end{bmatrix},\ X_w = \begin{bmatrix} X_{T-1,w} \\ X_{T-2,w} \\ \vdots \\ X_{0,w} \end{bmatrix},\ Y_w = \begin{bmatrix} Y_{T-1,w} \\ Y_{T-2,w} \\ \vdots \\ Y_{0,w} \end{bmatrix} \quad (27)$$

The complex spectrogram S of the source signal, the complex spectrogram X of the reverberant signal, and the complex spectrogram Y of the noisy reverberant signal are equivalent to the sets of $S_w$, $X_w$, and $Y_w$, respectively, over the whole frequency bands ($0\le w\le N-1$).

The conditional posterior distribution $p(X|Y, \Theta^{\hat{}(i)})$ of the reverberant signal in Equation (24) can be expressed by a plurality of independent complex normal distributions for frequency band was shown below.

$$p(X \mid Y, \hat{\Theta}^{(i)}) = \prod_{w=0}^{N-1} N_C\{X_w;\ \mu_w(\hat{\Theta}^{(i)}, Y), \Sigma_w(\hat{\Theta}^{(i)})\} \quad (28)$$

The mean $\mu_w(\Theta^{\hat{}(i)}, Y)$ and the covariance matrix $\Sigma_w(\Theta^{\hat{}(i)})$ are given as follows.

$$\mu_w(\hat{\Theta}^{(i)},Y)=(B_wB_w^H+G_w^{(i)}A_w^{(i)}A_w^{(i)}G_w^{(i)H})^{-1}(B_wB_w^H)Y_w \tag{29}$$

$$\Sigma_w(\hat{\Theta}^{(i)})=(B_wB_w^H+G_w^{(i)}A_w^{(i)}A_w^{(i)H}G_w^{(i)H})^{-1} \tag{30}$$

The variables included in Equations (29) and (30) are defined as follows. The elements in blank spaces in Equation (31) are 0.

$$G_w^{(i)}=\begin{bmatrix} 1 & & & & & & \\ -\hat{g}_{1,w}^{(i)} & 1 & & & & & \\ -\hat{g}_{2,w}^{(i)} & -\hat{g}_{1,w}^{(i)} & \ddots & & & & \\ \vdots & -\hat{g}_{2,w}^{(i)} & \ddots & 1 & & & \\ -\hat{g}_{K_w,w}^{(i)} & \vdots & \ddots & -\hat{g}_{1,w}^{(i)} & 1 & & \\ & -\hat{g}_{K_w,w}^{(i)} & & -\hat{g}_{2,w}^{(i)} & -\hat{g}_{1,w}^{(i)} & 1 & \\ & & \ddots & \vdots & \vdots & \vdots & \ddots \\ & & & -\hat{g}_{K_w,w}^{(i)} & -\hat{g}_{K_w-1,w}^{(i)} & -\hat{g}_{K_w-2,w}^{(i)} & \cdots\ 1 \end{bmatrix} \tag{31}$$

$$A_w^{(i)}=\mathrm{diag}\left\{\sqrt{{}_s\lambda_{T-1}^{(i)}(2\pi w/N)},\ \sqrt{{}_s\lambda_{T-2}^{(i)}(2\pi w/N)},\ \ldots\ ,\ \sqrt{{}_s\lambda_0^{(i)}(2\pi w/N)}\right\} \tag{32}$$

$${}_s\lambda_t^{(i)}(\omega)=\frac{{}_s\hat{\sigma}_t^{2(i)}}{|1-\hat{a}_{t,1}^{(i)}e^{-j\omega}-\ldots-\hat{a}_{t,P}^{(i)}e^{-j\omega P}|^2} \tag{33}$$

$$B_w=\mathrm{diag}\left\{\sqrt{{}_d\hat{\lambda}_{T-1}(2\pi w/N)},\ \sqrt{{}_d\hat{\lambda}_{T-2}(2\pi w/N)},\ \ldots\ ,\ \sqrt{{}_d\hat{\lambda}_0(2\pi w/N)}\right\} \tag{34}$$

Since it is assumed that the noise is stationary as described above, the following relation holds:

$${}_d\lambda_{T-1}\hat{}(2\pi w/N)={}_d\lambda_{T-2}\hat{}(2\pi w/N)=\ldots={}_d\lambda_0\hat{}(2\pi w/N)={}_d\lambda\hat{}(2\pi w/N)$$

In addition, diag $\{\alpha_1, \ldots \alpha_\beta\}$ is a diagonal matrix containing scalars $\alpha_1, \ldots \alpha_\beta$ on its diagonal.

As indicated by Equation (28), the conditional posterior distribution $p(X|Y, \hat{\Theta}^{(i)})$ of the reverberant signal is calculated based on the source parameters, reverberation parameters, and noise parameters. As indicated by Equations (30) and (34), the scale of the covariance matrix of the conditional posterior distribution $p(X|Y, \hat{\Theta}^{(i)})$ of the reverberant signal set X increases monotonically with respect to the noise power spectrum (variance of the complex normal distribution characterizing the noise probability distribution). In that case, if the noise level is large, the scale of the covariance matrix of the conditional posterior distribution of the reverberant signal set X is large. By contrast, if the noise level is small, the scale of the covariance matrix of the conditional posterior distribution of the reverberant signal set X is small. This behavior is very reasonable. Because of this property, the parameter estimation accuracy in noisy reverberant environments can be improved.

In the following, let $\mu_{m,w}^{(i)}$ be the T−m-th element of the mean $\mu_w(\hat{\Theta}^{(i)},Y)$, $\mu_{m:n,w}^{(i)}$ (m≥n) be the partial vector constituting the T−m-th to T−n-th elements of the mean $\mu_w(\hat{\Theta}^{(i)},Y)$, and $\Sigma_{(c:m,\ d:n),w}$ (c≥m, d≥n) be the submatrix constituting the (T−c, T−d)-th to (T−m, T−n)-th elements (elements in the T−d-th to T−n-th rows and the T−c-th to T−m-th columns) of the covariance matrix $\Sigma_w(\hat{\Theta}^{(i)})$.

2. Procedure for CM-Step 1

The linear prediction coefficients of the source signal in the t-th frame and their estimates are expressed in vector form as follows.

$$a_t=\begin{bmatrix} a_{t,1} \\ \vdots \\ a_{t,P} \end{bmatrix},\ \hat{a}_t=\begin{bmatrix} \hat{a}_{t,1} \\ \vdots \\ \hat{a}_{t,P} \end{bmatrix} \tag{35}$$

The source parameters ${}_s\Theta$ and their estimates ${}_s\hat{\Theta}$ are equivalent to the sets of $\{a_t, {}_s\sigma_t^2\}$ and $\{\hat{a}_t, {}_s\hat{\sigma}_t^2\}$, respectively, for all frames (0≤t≤T−1).

The source parameters are updated according to Equation (25), which is done by updating the estimates of $a_t$ and ${}_s\sigma_t^2$ according to the following equations for all frames (0≤t≤T−1).

$$\hat{a}_t^{(i+1)}={}_sR_t^{(i)^{-1}}\,{}_sr_t^{(i)} \tag{36}$$

$${}_s\hat{\sigma}_t^{2(i+1)}=\sum_{w=0}^{N-1}\left|1-\hat{a}_{t,1}^{(i+1)}e^{-j\frac{2\pi w}{N}}-\ldots\ \hat{a}_{t,P}^{(i+1)}e^{-j\frac{2\pi w}{N}P}\right|^2 V_{t,w}^{(i)} \tag{37}$$

Here, ${}_sR_t^{(i)}$, ${}_sr_t^{(i)}$, and $v_{t,w}^{(i)}$ are defined as follows.

$${}_sR_t^{(i)}=\begin{bmatrix} {}_sr_t^{(i)}(0) & {}_sr_t^{(i)}(1) & \ldots & {}_sr_t^{(i)}(P-1) \\ {}_sr_t^{(i)}(1) & {}_sr_t^{(i)}(0) & \ddots & \vdots \\ \vdots & \ddots & \ddots & {}_sr_t^{(i)}(1) \\ {}_sr_t^{(i)}(P-1) & \ldots & {}_sr_t^{(i)}(1) & {}_sr_t^{(i)}(0) \end{bmatrix} \tag{38}$$

$${}_sr_t^{(i)}=\begin{bmatrix} {}_sr_t^{(i)}(1) \\ \vdots \\ {}_sr_t^{(i)}(P) \end{bmatrix} \tag{39}$$

$${}_sr_t^{(i)}(k)=\frac{1}{N}\sum_{w=0}^{N-1}V_{t,w}^{(i)}e^{j\frac{2\pi w}{N}k} \tag{40}$$

$$V_{t,w}^{(i)}=\begin{bmatrix} 1 & -\hat{g}_w^{(i)H} \end{bmatrix}\left(\mu_{t:t-K_w,w}^{(i)}\mu_{t:t-K_w,w}^{(i)(H)}+\Sigma_{(t:t-K_w,t:t-K_w),w)}^{(i)}\right)\begin{bmatrix} 1 \\ -\hat{g}_w^{(i)} \end{bmatrix} \tag{41}$$

$$\hat{g}_w^{(i)}=\begin{bmatrix} \hat{g}_{1,w}^{(i)} \\ \vdots \\ \hat{g}_{K_w,w}^{(i)} \end{bmatrix} \tag{42}$$

3. Procedure for CM-Step 2

The reverberation parameters in the w-th frequency band and their estimates are expressed in vector form as follows.

$$g_w=\begin{bmatrix} g_{1,w} \\ \vdots \\ g_{K_w,w} \end{bmatrix},\ \hat{g}_w=\begin{bmatrix} \hat{g}_{1,w} \\ \vdots \\ \hat{g}_{K_w,w} \end{bmatrix} \tag{43}$$

The reverberation parameters ${}_g\Theta$ and their estimates ${}_g\hat{\Theta}$ are equivalent to the sets of $g_w$ and $\hat{g}_w$, respectively, over the whole frequency bands (0≤w≤N−1).

The reverberation parameters are updated according to Equation (26), which is done by updating the estimate of $g_w$ according to the following equation over the whole frequency bands (0≤w≤N−1).

$$\hat{g}_w^{(i+1)}={}_xR_w^{(i)^{-1}}\,{}_xr_w^{(i)} \tag{44}$$

Here, ${}_xR_w^{(i)}$ and ${}_xr_w^{(i)}$ are defined as follows.

$$ {}_{x}R_{w}^{(i)} = \sum_{t=0}^{T-1} \frac{1}{{}_{s}\lambda_{t}^{(i+1)}(2\pi w/N)} \left( \mu_{t-1:t-K_{w},w}^{(i)} \mu_{t-1:t-K_{w},w}^{(i)H} + \Sigma_{(t-1:t-K_{w},t-1:t-K_{w}),w}^{(i)} \right) \tag{45} $$

$$ {}_{x}r_{w}^{(i)} = \sum_{t=0}^{T-1} \frac{1}{{}_{s}\lambda_{t}^{(i+1)}(2\pi w/N)} \left( \mu_{t-1:t-K_{w},w}^{(i)} \mu_{t,w}^{(i)*} + \Sigma_{(t-1:t-K_{w},t:t),w}^{(i)} \right) \tag{46} $$

As was described earlier, in the parameter estimation unit of this embodiment, the noise reduction (E-step), the source parameter estimate update (CM-step 1), and the reverberation parameter estimate update (CM-step 2) are executed iteratively in a cooperative fashion, and thus the estimates of the source parameters and reverberation parameters are updated. The E-step and CM-step1 correspond to the first updating processing described earlier, and the CM-step2 corresponds to the second updating processing described earlier. Therefore, noise and reverberation contained in a signal observed in a noisy reverberant environment are effectively reduced, and the source signal is enhanced.

<Structure of this Embodiment>

The structure of a signal enhancement device of this embodiment will be described next.

Figure 3:
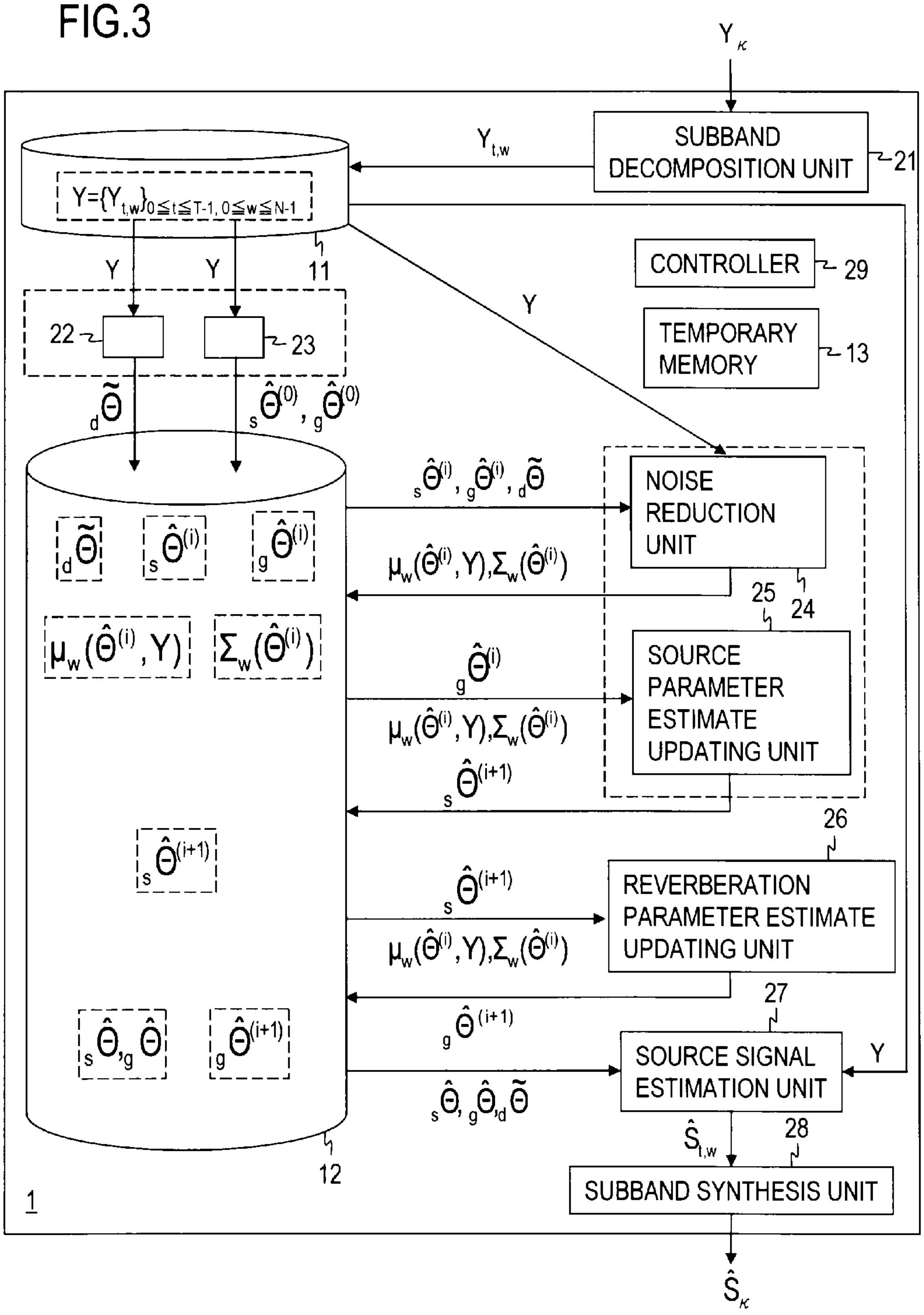
FIG. 3 is a block diagram showing the structure of a signal enhancement device according to the first embodiment.
Figure 4:
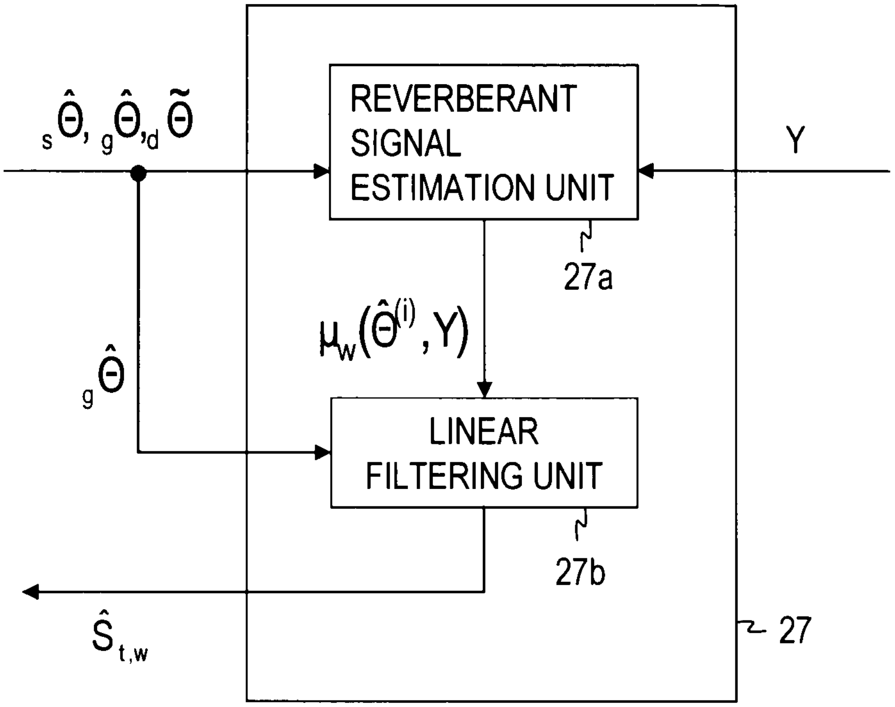
FIG. 4 is a block diagram showing a detailed structure of the source signal estimation unit.

FIG. 3 is a block diagram showing the structure of a signal enhancement device 1 according to the first embodiment. FIG. 4 is a block diagram showing the detailed structure of the source signal estimation unit 27.

As shown in FIG. 3, the signal enhancement device 1 in this embodiment includes an observed signal memory 11, a parameter memory 12, a temporary memory 13, a subband decomposition unit 21, a noise parameter estimation unit 22, an initial parameter setting unit 23, a noise reduction unit 24, a source parameter estimate updating unit 25, a reverberation parameter estimate updating unit 26, a source signal estimation unit 27, a subband synthesis unit 28, and a controller 29. The source signal estimation unit 27 includes a reverberant signal estimation unit 27*a* and a linear filtering unit 27*b*. The noise parameter estimation unit 22 and the initial parameter setting unit 23 correspond to the initialization unit described earlier. The noise reduction unit 24 and the source parameter estimate updating unit 25 correspond to the first updating unit described earlier. The reverberation parameter estimate updating unit 26 corresponds to the second updating unit described earlier.

The signal enhancement device 1 in this embodiment is implemented by a predetermined program loaded onto a computer that includes a central processing unit (CPU), a random access memory (RAM), and other units. More specifically, the observed signal memory 11, the parameter memory 12, and the temporary memory 13 are implemented by using memories composed of a RAM, registers, a cache memory, an auxiliary storage device, or their combination. The subband decomposition unit 21, the noise parameter estimation unit 22, the initial parameter setting unit 23, the noise reduction unit 24, the source parameter estimate updating unit 25, the reverberation parameter estimate updating unit 26, the source signal estimation unit 27, the subband synthesis unit 28, and the controller 29 are special units implemented in this device by a predetermined program read into the CPU. The controller 29 controls each processing part in the signal enhancement device 1.

<Processing in this Embodiment>

Figure 5:
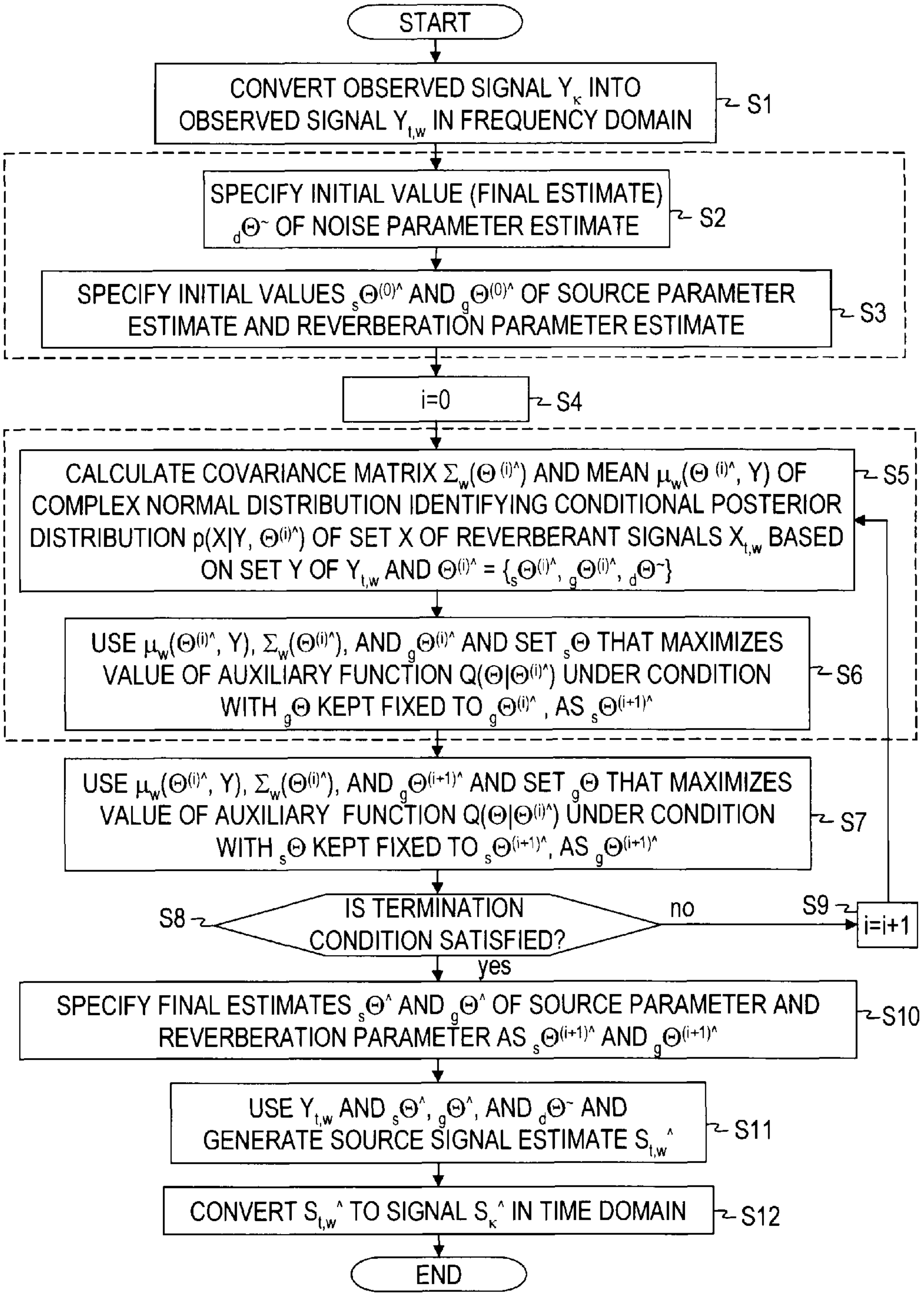
FIG. 5 is a flowchart describing a signal enhancement method according to the first embodiment.

FIG. 5 is a flowchart illustrating a signal enhancement method of the first embodiment. The signal enhancement method of this embodiment will be described with reference to the flowchart.

A time-domain observed signal $Y_{\kappa}$, where κ indicates the discrete time index, is observed in an noisy reverberant environment; it is then sampled at a predetermined sampling frequency, quantized, and fed into the subband decomposition unit 21 of the signal enhancement device 1. The subband decomposition unit 21 decomposes the discrete signal $Y_{\kappa}$ into signals of different frequency bands that have narrower bandwidths by a short time Fourier transform or a similar technique. Thus, time-frequency-domain observed signals $Y_{t,w}$ are generated and stored in the observed signal memory 11 (step S1). As shown in Equation (11), $Y=\{Y_{t,w}\}_{0\le t\le T-1,\,0\le w\le N-1}$ is called a complex spectrogram of the observed signal.

From the observed signal $Y_{t,w}$ stored in the observed signal memory 11, the noise parameter estimation unit 22 uses the part of the signals corresponding to a period in which the source signal is absent, in order to estimate the true values ${}_{d}\Theta^{\hat{}}$ of the noise parameters. As described earlier, the noise parameters ${}_{d}\Theta$ in this embodiment are a noise power spectrum (a variance of the complex normal distribution characterizing the noise probability distribution). This embodiment assumes that the noise is stationary and that its mean is 0. Therefore, the true values ${}_{d}\Theta^{\sim}$ of the noise parameters can be estimated by calculating the average of the squares of the amplitudes of the observed signal $Y_{t,w}$ in the source-absent period. An existing voice activity detection technology may be used to identify the speec-absent period. Alternatively, it is also possible to measure in advance an observed signal $Y_{t,w}$ that does not contain a source signal and use it for the noise parameter estimation. The final estimates ${}_{d}\Theta^{\sim}$ of the estimated noise parameters are stored in the parameter memory 12 (step S2).

The initial parameter setting unit 23 sets the initial values ${}_{s}\Theta^{\hat{}(0)}$ and ${}_{g}\Theta^{\hat{}(0)}$ of the estimates of the source parameters and the reverberation parameters. For example, the initial parameter setting unit 23 reads the observed signal $Y_{t,w}$ from the observed signal memory 11, calculates the linear prediction coefficients and prediction residual powers by applying linear prediction to the read signal, and use them as the initial values ${}_{s}\Theta^{\hat{}(0)}$ of the estimates of the source parameters. On the other hand, ${}_{g}\Theta^{\hat{}(0)}=\{\{g_{k,w}{}^{\hat{}(0)}=0\}_{1\le k\le Kw}\}_{0\le w\le N-1})$ may be used as the initial values ${}_{g}\Theta^{\hat{}(0)}$ of the reverberation parameter estimates. These initial values ${}_{s}\Theta^{\hat{}(0)}$ and ${}_{g}\Theta^{\hat{}(0)}$ of the parameter estimates are stored in the parameter memory 12 (step S3).

The controller 29 sets the iteration index i to 0 and stores it in the temporary memory 13 (step S4).

The observed signal $Y_{t,w}$ read from the observed signal memory 11, the source parameter estimates ${}_{s}\Theta^{\hat{}(i)}$, the final estimates ${}_{d}\Theta^{\sim}$ of the noise parameter read from the parameter memory 12, and the reverberation parameter estimates ${}_{g}\Theta^{\hat{}(i)}$ are input to the noise reduction unit 24. Using these values, the noise reduction unit 24 calculates the covariance matrix $\Sigma_{w}(\Theta^{\hat{}(i)})$ and the mean $\mu_{w}(\Theta^{\hat{}(i)}, Y)$ of the complex normal distribution that defines the posterior distribution $p(X|Y, \Theta^{\hat{}})$ of the set X of the reverberant signals $X_{t,w}$ conditioned on the set Y of the observed signals $Y_{t,w}$ and parameter estimates $\Theta^{\hat{}}$ (step S5). More specifically, the covariance matrix $\Sigma_{w}(\Theta^{\hat{}(i)})$ and the mean $\mu_{w}(\Theta^{\hat{}(i)}, Y)$ of the complex normal distribution are calculated by using Equations (29) to (34) described earlier. The calculated covariance matrix $\Sigma_{w}(\Theta^{\hat{}(i)})$ and the calculated mean $\mu_{w}(\Theta^{\hat{}(i)}, Y)$ of the complex normal distribution are stored in the parameter memory 12.

The reverberation parameter estimates $_g\Theta^{\hat{}}(i)$, the covariance matrix $\Sigma_w(\Theta^{\hat{}(i)})$, and the mean $\mu_w(\Theta^{\hat{}(i)}, Y)$ of the complex normal distribution read from the parameter memory 12 are input to the source parameter estimate updating unit 25. Using these values, the source parameter estimate updating unit 25 updates the source parameter estimates $_s\Theta^{\hat{}(i)}$ so that the auxiliary function $Q(\Theta|\Theta^{\hat{}(i)})$ shown in Equation (24) is maximized under the condition that the reverberation parameters $_g\Theta$ are fixed at $_g\Theta^{\hat{}(i)}$; thus the updated source parameter estimates $_s\Theta^{\hat{}(i+1)}$ (step S6) are obtained. More specifically, the updated source parameter estimates $_s\Theta^{\hat{}(i+1)}$ calculated by using Equations (36) to (42). The updated source parameter estimates $_s\Theta^{\hat{}(i+1)}$ are stored in the parameter memory 12.

The source parameter estimates $_s\Theta^{\hat{}(i+1)}$, the covariance matrix $\Sigma_w(\Theta^{\hat{}(i)})$, and the mean $\mu_w(\Theta^{\hat{}(i)}, Y)$ of the complex normal distribution read from the parameter memory 12 are input to the reverberation parameter estimate updating unit 26. Using these values, the reverberation parameter estimate updating unit 26 obtains updated reverberation parameter estimates $_g\Theta^{\hat{}(i+1)}$ so that the auxiliary function $Q(\Theta|\Theta^{\hat{}(i)})$ shown in Equation (24) is maximized under the condition that the source parameters $_s\Theta$ are fixed at $_s\Theta^{\hat{}(i+1)}$ (step S7). More specifically, the updated reverberation parameter estimates $_g\Theta^{\hat{}(i+1)}$ are calculated by using Equations (44) to (46). The updated reverberation parameter estimates $_g\Theta^{\hat{}(i+1)}$ are stored in the parameter memory 12.

The controller 29 (corresponding to a termination condition check unit) checks if a predetermined termination condition is satisfied (step S8). The predetermined termination condition may be based on whether the variation of the parameter estimates obtained by the update (the distance (cosine distance, Euclidean distance, and the like) between the parameter estimates before and after the update) does not exceed a predetermined threshold or whether the iteration index i is greater than or equal to a predetermined threshold.

If the predetermined termination condition is not satisfied, the controller 29 increments the iteration index i by one, stores the new i value in the temporary memory 13 (step S9), and goes back to step S105.

If the predetermined termination condition is satisfied, the controller 29 regards the source parameter estimates $_s\Theta^{\hat{}(i+1)}$ and the reverberation parameter estimates $_g\Theta^{\hat{}(i+1)}$ at that time as the final source parameter estimates $_s\Theta^{\hat{}}$ and the final reverberation parameter estimates $_g\Theta^{\hat{}}$ and stores them in the parameter memory 12 (step S10).

The observed signal $Y_{t,w}$ and the final parameter estimates $_s\Theta^{\hat{}}$, $_g\Theta^{\hat{}}$, and $_d\Theta^{\tilde{}}$ are input to the source signal estimation unit 27. Using them, the source signal estimation unit 27 generates a source signal estimate $S_{t,w}^{\hat{}}$ (step S11). $S^{\hat{}}=\{S_{t,w}^{\hat{}}\}_{0\le t\le T-1, 0\le w\le N-1}$ is the complex spectrogram of a signal obtained by the signal enhancement.

More specifically, the observed signal $Y_{t,w}$ and the final parameter estimates $_s\Theta^{\hat{}}$, $_g\Theta^{\hat{}}$, and $_d\Theta^{\tilde{}}$ are input to the reverberant signal estimation unit 27*a* (FIG. 4) of the source signal estimation unit 27. Using them, the reverberant signal estimation unit 27*a* calculates the mean $\mu_w(\Theta^{\hat{}(i)}, Y)$ ($0\le w\le N-1$) of the posterior distribution $p(X|Y, \Theta^{\hat{}})$ of the reverberant signal $X_{t,w}$ conditioned on the observed signal $Y_{t,w}$ and the parameter estimates $\Theta^{\hat{}}$ and uses it as the reverberant signal estimate (corresponding to the final estimate of the reverberant signal). More specifically, the mean $\mu_w(\Theta^{\hat{}}, Y)$ is calculated by the equations that are obtained by replacing $\Theta^{\hat{}(i)}$ with $\Theta^{\hat{}}$ in Equations (29) to (34). The calculated estimate $\mu_w(\Theta^{\hat{}}, Y)$ of the reverberant signal is sent to the linear filtering unit 27*b*. The linear filtering unit 27*b* receives the calculated estimate $\mu_w(\Theta^{\hat{}}, Y)$ of the reverberant signal and the final estimates $_g\Theta^{\hat{}}$ of the reverberation parameters. The linear filtering unit 27*b* applies a linear filter defined by the input reverberation parameter estimates $_g\Theta^{\hat{}}$ to the reverberant signal estimate $\mu_w(\Theta^{\hat{}}, Y)$ and generates a source signal estimate $S_{t,w}^{\hat{}}$ (corresponding to the final source signal estimate). More specifically, the linear filtering unit 27*b* calculates the source signal estimate $S_{t,w}^{\hat{}}$ according to the following equation, where $\mu_{t,w}$ is the T–t-th element of the reverberant signal estimate $\mu_w(\Theta^{\hat{}}, Y)$.

$$\hat{S}_{t,w} = \mu_{t,w} - \sum_{k=1}^{K_w} \hat{g}_{k,w}^{*}\mu_{t-k,w} \tag{47}$$

The calculated source signal estimate $S_{t,w}^{\hat{}}$ is stored in the parameter memory 12.

Then, the source signal estimates $S_{t,w}^{\hat{}}$ are input to the subband synthesis unit 28, and the subband synthesis unit 28 converts the estimates to a time-domain source signal estimate $S_{\kappa}^{\hat{}}$ by using a inverse short time Fourier transform or similar techniques, and outputs the result (step S12).

<Result of Experiment>

An experiment was conducted to confirm the effect provided by this embodiment. Utterances of ten speakers (five male and five female) extracted from the ASJ-JNAS database were used. Each utterance duration was set to three seconds. The sampling frequency was 8 kHz, and the quantization bit rate was 16. Reverberant signals were synthesized by convolving the source signals with an impulse response recorded in a room with a reverberation time of about 0.5 seconds. Stationary white noise synthesized on a computer was added to the reverberant signals at a signal to noise ratio (SNR) of 10 dB to produce noisy reverberant signals.

The parameters used in the signal enhancement device of this embodiment were set as follows: the short time Fourier transform frame length was 256 samples, the shift width was 128 samples, the Hanning window was used, the order of autoregression representing the room transfer system was $K_w$=30 for all frequency bands, and the linear prediction order of a source signal was P=12. The ECM algorithm was terminated when an iteration index i exceeded 5.

The quality of the enhanced source signal was evaluated by using the segmental amplitude signal to noise ratio (SASNR) defined by the following equation.

$$SASNR = \frac{1}{T}\sum_{t=0}^{T-1} 10\log_{10}\frac{\sum_{w=0}^{N-1}|S_{t,w}|^2}{\sum_{w=0}^{N-1}\left||S_{t,w}|-|\hat{S}_{t,w}|\right|^2} \tag{48}$$

Table 1 lists the improved SASNR values by gender of the speakers.

| | | | |
|---|---|---|---|
| Noise reduction | ○ | X | ○ |
| Reverberation reduction | X | ○ | ○ |
| Male speaker (mean) [dB] | 4.25 | 1.80 | 7.77 |
| Female speaker (mean) [dB] | 4.67 | 1.17 | 7.67 |
| Mean [dB] | 4.46 | 1.49 | 7.72 |

Condition (○: Used, X: Not Used)

As listed in table 1, the SASNR values were improved by 7.72 dB on average by this embodiment. The average SASNR improvement obtained by performing only noise reduction was 4.26 dB. The average SASNR improvement obtained by performing only dereverberation was 1.49 dB. This experimental result demonstrates that the source signal can be enhanced effectively by performing noise reduction and dereverberation cooperatively by using the method of this embodiment.

Second Embodiment

The second embodiment of the present invention will be described next. Although the number of sensors for capturing a signal is limited to one in the first embodiment, the number of sensors for capturing a signal is not limited in this embodiment. The number of sensors, which is denoted by M, may be any integer satisfying M≥1. Therefore, the regression matrices included in the reverberation parameters are M×M square matrices. The rest of the outline of the parameter estimation processing of this embodiment is the same as the outline of the parameter estimation processing of the first embodiment. The value of M can be M=1 or M≥2. If M=1, this embodiment is equivalent to the first embodiment.

<Outline of Parameter Estimation Processing of this Embodiment>

In this embodiment, a first updating unit updates the parameter estimates of the second parameter group, and a second updating unit updates the parameter estimates of the first parameter group.

[Observed Signal Storage Stage]

First, in the observed signal storage stage, observed signals are stored in a memory.

[Initialization Processing Stage]

Next, in the initialization processing stage, the estimates of the parameters of the first parameter group and the estimates of the parameters of the second parameter group are initialized.

[First Update Processing Stage]

In the first update processing stage in this embodiment, the parameter estimates of the second parameter group, which includes the source parameter estimates, are updated while the parameter estimates of the first parameter group, which includes the reverberation parameter estimates, are kept fixed. More specifically, the first update processing stage of this embodiment performs noise reduction and update of source parameters.

<<Noise Reduction>>

In the noise reduction, the observed signals and parameter estimates are used to calculate the covariance matrix and mean of a complex normal distribution characterizing the conditional posterior distribution of reverberant signals, p(reverberant signals observed signals, parameter estimates).

This processing may be regarded as reducing noise contained in the observed signals in the sense that the conditional posterior distribution of the reverberant signals, which do not contain noise, is obtained based on the observed signals. Note that this noise reduction is executed by using the reverberation parameter estimates and the source parameter estimates. This means that the noise reduction is done by taking account of the reverberation characteristics. Accordingly, accurate noise reduction would be performed even in reverberant environments.

<<Update of Source Parameter Estimates>>

The source parameter estimate update part updates the source parameter estimates by using the reverberation parameter estimates and the covariance matrix and the mean of the conditional posterior distribution of the reverberant signals. The source parameter estimates are updated so that an auxiliary function of the source parameters is maximized.

The auxiliary function is defined as follows: Consider a logarithmic function of the parameter estimates that is defined based on the observed signals and reverberant signals. By weighting this logarithmic likelihood function by the conditional posterior distribution of the reverberant signals, p(reverberant signals|observed signals, parameter estimates), and integrating it over the reverberant signals, the auxiliary function is derived. The weighted integration makes it possible to update the source parameter estimates by taking account of the uncertainty of the reverberant signals calculated by the noise reduction processing stage.

[Second Update Processing Stage]

In the second update processing stage of this embodiment, the parameter estimates of the first parameter group, which includes the reverberation parameters, are updated while the parameter estimates of the second parameter group, which includes the source parameters, are kept fixed. The reverberation parameter estimates are updated so that the auxiliary function of the parameters is maximized.

[Termination Condition Check Stage]

The termination condition check stage, checks if a predetermined termination condition is satisfied. If the termination condition is not satisfied, the processing returns to the first update processing stage. If the termination condition is satisfied, the parameter estimates at that time are output.

In the processing described above, the scale of the covariance matrix of the conditional posterior distribution of the reverberant signals increases monotonically with the scale of the noise covariance matrix. In other words, as the noise level increases, the scale of the covariance matrix of the conditional posterior distribution of the reverberant signals increases. This indicates that the way for evaluating the uncertainty of the reverberant signals estimated by the noise reduction processing stage in this embodiment is reasonable.

<Principle of this Embodiment>

The principle of this embodiment will be described next. Main differences from the first embodiment will be described below, and the description of the same things as the first embodiment will be omitted. The signal dealt with in this embodiment is not limited to an acoustic signal such as a speech signal.

<Principle of this Embodiment>

The principle of this embodiment will be described next. The ECM algorithm is applied in this embodiment, too. The set of the noisy reverberant signals (i.e., the observed signals) Y is used and the following steps are iteratively executed in turn to update the parameter estimates: E-step, which calculates the conditional posterior distribution $p(x|y, \hat{\Theta})$ of a set x of reverberant signals conditioned on the noisy reverberant signal set y and the parameter estimates $\hat{\Theta}$; CM-step1, which calculates the source parameter estimates ${}_s\hat{\Theta}$; and CM-step2, which calculates the reverberation parameters ${}_g\Theta$. The parameter estimates at the time when a predetermined termination condition is satisfied are regarded as the estimates of the true values (final estimates). The E-step and CM-step 1 correspond to the first update processing stage described earlier, and the CM-step 2 corresponds to the second update processing stage described earlier.

The reverberant signal set x in this embodiment is a set of complex spectrograms of the reverberant signals for the sensors. The noisy reverberant signal set y in this embodiment is a set of complex spectrograms of noisy reverberant signals observed by the sensors.

[Statistical Model of Observed Signal (Noisy Reverberant Signal)]

What should be done first in this embodiment is also to define the probability density function $p(y|\Theta)$ of the noisy reverberant signal set y conditioned on parameters $\Theta$. For this purpose, a statistical model of the observed signal (noisy reverberant signal) set y is assumed. This embodiment uses an all pole model of the source signal, a multi-channel autoregressive model of the room transfer system, and a noise model as described later.

<<Model of Source Signal>>

The all pole model of the source signal in this embodiment will be described first. Let $S_{t,w}$ be the discrete Fourier transform coefficient (complex number) of the source signal in the t-th frame ($0 \le t \le T-1$) and the w-th frequency band ($0 \le w \le N-1$). Let $S_{t,w}^{(m)}$ be the discrete Fourier transform coefficient of a source signal that would be observed by an m-th sensor ($1 \le m \le M$) if there were no noise nor reverberation. An M-dimensional source signal vector containing elements given by $S_{t,w}^{(m)}$ is defined as follows, where $\alpha^\tau$ represents the non-conjugate transpose of $\alpha$.

$$s_{t,w}=[S_{t,w}^{(1)}, \ldots, S_{t,w}^{(M)}]^\tau \quad (49)$$

It is assumed that the vector $s_{t,w}$ satisfies the following conditions:

1. Let us denote an angular frequency by $\omega \in \{-\pi, \pi\}$. The power spectral density ${}_s\lambda_t(\omega)$ of the source signal in the t-th frame is expressed by an all pole spectral density as given by Equations (1) and (2). Therefore, the source parameters ${}_s\Theta$ are defined as ${}_s\Theta=\{a_{t,1}, \ldots, a_{t,p}, {}_s\sigma_t^2\}_{0 \le t \le T-1}$, where $\{m_\alpha\}_{0 \le \alpha \le M-1}$ is a set of M elements, $m_0, m_1, \ldots, m_{M-1}$.
2. The vector $s_{t,w}$ is distributed according to an M-dimensional complex normal distribution whose mean is $O_M$ and whose covariance matrix is ${}_s\lambda_t(2\pi w/N)I_M$.

$$p(s_{t,w}|{}_s\Theta)=N_C\{s_{t,w};0_M,{}_s\lambda_t(2\pi w/N)I_M\} \quad (50)$$

Here, $N_c\{x; \mu,\Sigma\}$ is the probability density function of the complex normal distribution defined by Equation (4), and $O_M$ and $I_M$ represent an M-dimensional zero vector and an M-dimensional identity matrix, respectively.

By substituting Equation (4) into Equation (50) with $\zeta=M$, the probability density function of $s_{t,w}$ is represented as follows.

$$p(s_{t,w} \mid {}_s\Theta) = \frac{1}{\pi^M {}_s\lambda_t(2\pi w/N)^M} \exp\left\{-\frac{\|s_{t,w}\|^2}{{}_s\lambda_t(2\pi w/N)}\right\} \quad (51)$$

Here, $\|\alpha\|^2$ of a complex vector $\alpha$ is defined as:

$$\|\alpha\|^2=\alpha^H \cdot \alpha \quad (52)$$

3. If $(t, w) \neq (t', w')$, then $s_{t,w}$ and $s_{t',w'}$ are statistically independent.

<<Model of Room Transfer System>>

The model of the room transfer system in this embodiment will be described next. Let $X_{t,w}^{(m)}$ be the discrete Fourier transform coefficient of the reverberant signal of the m-th sensor ($1 \le m \le M$) in the t-th frame ($0 \le t \le T-1$) and the w-th frequency band ($0 \le w \le N-1$). Let us define an M-dimensional reverberant signal vector consisting of $X_{t,w}^{(m)}$ as:

$$x_{t,w}=[X_{t,w}^{(1)}, \ldots, X_{t,w}^{(M)}]^\tau \quad (53)$$

This embodiment assumes that the room transfer system can be represented as an M-channel autoregressive system in each frequency band. Suppose that the regression matrices of the autoregressive system in the w-th frequency band are expressed as follows.

$$G_{1,w}, \ldots, G_{K_w,w}$$

Then, the reverberant signal vector $x_{t,w}$ consisting of the reverberant signals is generated according to the following equation.

$$x_{t,w} = \sum_{k=1}^{K_w} G_{k,w}^H \cdot x_{t-k,w} + s_{t,w} \quad (54)$$

The regression matrix $G_{k,w}$ is an M×M matrix containing the regression coefficients $g_{k,w}^{(1,1)}, \ldots, g_{k,w}^{(M,M)}$ of the autoregressive system as elements, where $K_w$ indicates the order of the M-channel autoregressive system.

$$G_{k,w} = \begin{bmatrix} g_{k,w}^{(1,1)} & \cdots & g_{k,w}^{(1,M)} \\ \vdots & \ddots & \vdots \\ g_{k,w}^{(M,1)} & \cdots & g_{k,w}^{(M,M)} \end{bmatrix} \quad (55)$$

By using Equation (55), Equation (54) can be expressed as follows.

$$\begin{bmatrix} X_{t,w}^{(1)} \\ \vdots \\ X_{t,w}^{(M)} \end{bmatrix} = \sum_{k=1}^{K_w} \begin{bmatrix} g_{k,w}^{(1,1)*} & \cdots & g_{k,w}^{(M,1)*} \\ \vdots & \ddots & \vdots \\ g_{k,w}^{(1,M)*} & \cdots & g_{k,w}^{(M,M)*} \end{bmatrix} \cdot \begin{bmatrix} X_{t-k,w}^{(1)} \\ \vdots \\ X_{t-k,w}^{(M)} \end{bmatrix} + \begin{bmatrix} S_{t,w}^{(1)} \\ \vdots \\ S_{t,w}^{(M)} \end{bmatrix} \quad (56)$$

In this embodiment, the reverberation parameters ${}_g\Theta$ are defined as ${}_g\Theta=\{\{G_{k,w}\}_{1 \le k \le K_w}\}_{0 \le w \le N-1}$. These reverberation parameters ${}_g\Theta$ are applied to the reverberant signals, in which only reverberation is superimposed onto the source signal, to extract the source signal at the positions of individual sensors as shown below.

$$s_{t,w} = x_{t,w} - \sum_{k=1}^{K_w} G_{k,w}^H \cdot x_{t-k,w} \quad (57)$$

<<Noise Model>>

A noise model will be described next. In this embodiment, let $D_{t,w}^{(m)}$ and $Y_{t,w}^{(m)}$ be the discrete Fourier transform coefficients of noise and of the noisy reverberant signal, respectively, of the m-th sensor ($1 \le m \le M$) in the t-th frame ($0 \le t \le T-1$) and the w-th frequency band ($0 \le w \le N-1$). An M-dimensional noise vector consisting of $D_{t,w}^{(m)}$ is defined as follows.

$$d_{t,w}=[D_{t,w}^{(1)}, \ldots, D_{t,w}^{(M)}]^\tau \quad (58)$$

An M-dimensional noisy reverberant signal (observed signal) vector consisting of $Y_{t,w}^{(m)}$ is defined as follows.

$$y_{t,w}=[Y_{t,w}^{(1)}, \ldots, Y_{t,w}^{(M)}]^\tau \quad (59)$$

The noisy reverberant signal vector $y_{t,w}$ is obtained by adding a noise vector $d_{t,w}$ with the reverberant signal vector $x_{t,w}$.

$$y_{t,w}=x_{t,w}+d_{t,w} \quad (60)$$

It is assumed that $d_{t,w}$ satisfies the following conditions:

1. Noise is stationary, and its cross-power spectral density is given by ${}_d\Lambda(\omega)$ (independent of the frame number t because of the stationary). The vector $d_{t,w}$ is distributed according to a complex normal distribution whose mean is $O_M$ and whose covariance matrix is ${}_d\Lambda(2\pi w/N)$. The m-th diagonal element of the covariance matrix ${}_d\Lambda(2\pi w/N)$ is the noise power spectrum ${}_d\Lambda^{(m)}(2\pi w/N)$ of the w-th sensor.

$$p(d_{t,w} \mid_d \Theta) = N_C\{d_{t,w};\ 0_{M,d}\Lambda(2\pi w/N)\} \qquad (61)$$

$$= \frac{1}{\pi^M |{}_d\Lambda(2\pi w/N)|}\exp\{-d_{t,w}^H \cdot {}_d\Lambda(2\pi w/N)^{-1} \cdot d_{t,w}\}$$

The noise parameters ${}_d\Theta$, which characterize noise, in this embodiment are defined as ${}_d\Theta=\{{}_d\Lambda(2\pi w/N)\}_{0\le w\le N-1}$.

2. If (t, w)≠(t', w'), then $d_{t,w}$ and $d_{t',w'}$ are statistically independent.

3. For all (t, w, t', w'), $s_{t,w}$ and $d_{t,w}$ are statistically independent.

<<Probability Density Function of Noisy Reverberant Signals>>

On the basis of the above assumptions, the probability density function of the noisy reverberant signals is formulated here.

In this embodiment, a set of complex spectrograms of source signals at sensor positions (corresponding to a set of source signal vectors) is expressed as s. A set of complex spectrograms of reverberant signals obtained at the sensor positions (corresponding to a set of reverberant signal vectors) is expressed as x. A set of complex spectrograms of noisy reverberant signals (corresponding to a set of noisy reverberant signal vectors) is expressed as y.

$$s=\{s_{t,w}\}_{0\le t\le T-1,0\le w\le N-1} \qquad (62)$$

$$x=\{x_{t,w}\}_{0\le t\le T-1,0\le w\le N-1} \qquad (63)$$

$$y=\{y_{t,w}\}_{0\le t\le T-1,0\le w\le N-1} \qquad (64)$$

More specifically, the probability density function of the noisy reverberant signal vector set y (corresponding to the likelihood function of the parameters Θ based on the observed signal vector set y) can be expressed as follows.

$$p(y|\Theta)=\int p(Y,x|\Theta)dx \qquad (65)$$

On the basis of the above assumptions, p(y, xΘΘ) can be expressed as follows.

$$p(y, x \mid \Theta) \propto \left(\prod_{w=0}^{N-1} |{}_d\Lambda(2\pi w/N)|^{-T}\right)\left(\prod_{t=0}^{T-1} ({}_s\sigma_t^2)^{-M\cdot N}\right) \times \exp\left\{-\sum_{t=0}^{T-1}\sum_{w=0}^{N-1}\left(\begin{array}{c}(y_{t,w}-x_{t,w})^H \cdot {}_d\Lambda(2\pi w/N)^{-1} \cdot (y_{t,w}-x_{t,w}) + \\ \dfrac{|A_t(e^{j2\pi w/N})|^2 \left\| x_{t,w} - \sum_{k=1}^{K_w} G_{k,w}^H \cdot x_{t-k,w}\right\|^2}{{}_s\sigma_t^2}\end{array}\right)\right\} \qquad (66)$$

Now, the probability density function p(y|Θ) of the noisy reverberant signal set is formulated by using the parameters $\Theta=\{{}_s\Theta, {}_g\Theta, {}_d\Theta\}$.

[Maximum Likelihood Estimation of Source Parameters and Reverberation Parameters]

In this embodiment, the true values Θ˜ of the unknown parameters are estimated from the set y of the observed noisy reverberant signals by maximum likelihood estimation, as described above. The Θ values that maximize the likelihood function p(y|Θ) based on the noisy reverberant signal y, where the parameters Θ are regarded as variables, are assumed to be the estimates of the true values Θ˜. In this embodiment, however, the true values ${}_d\Theta^{\sim}$ of the noise parameters are estimated separately in advance from the period in which the source signal is absent. Since the true values of ${}_d\Theta^{\sim}$ of the noise parameters are known and $\Theta^{\hat{}}=\{{}_s\Theta^{\hat{}}, {}_g\Theta^{\hat{}}, {}_d\Theta^{\sim}\}$, only ${}_s\Theta^{\hat{}}$ and ${}_g\Theta^{\hat{}}$ are calculated in this embodiment.

Because ${}_s\Theta^{\hat{}}$ and ${}_g\Theta^{\hat{}}$ that maximize the likelihood function p(y|Θ) cannot be obtained directly at the same time, they are calculated by using the ECM algorithm. The processing flow in the ECM algorithm will be described below. In the processing, three steps, E-Step, CM-step1 and CM-step2, are executed iteratively in turn. The parameters in the i-th iteration are indicated by superscript (i). For the sake of clarification, $\Theta^{\sim}$, $\Theta^{\hat{}}$, and $\Theta^{\hat{}(i)}$ are defined as follows.

$$\tilde{\Theta}=\{{}_s\tilde{\Theta},{}_g\tilde{\Theta},{}_d\tilde{\Theta}\} \qquad (67)$$

$${}_s\tilde{\Theta}=\{\tilde{a}_{t,1}, \ldots ,\tilde{a}_{t,P},{}_s\tilde{\sigma}_t^2\}_{0\le t\le T-1} \qquad (68)$$

$${}_g\tilde{\Theta}=\{\{\tilde{G}_{k,w}\}_{1\le k\le K_w}\}_{0\le w\le N-1} \qquad (69)$$

$${}_d\tilde{\Theta}=\{{}_d\tilde{\Lambda}(2\pi w/N)\}_{0\le w\le N-1} \qquad (70)$$

$$\hat{\Theta}=\{{}_s\hat{\Theta},{}_g\hat{\Theta},{}_d\tilde{\Theta}\} \qquad (71)$$

$${}_s\hat{\Theta}=\{\hat{a}_{t,1}, \ldots ,\hat{a}_{t,P},{}_s\hat{\sigma}_t^2\}_{0\le t\le T-1} \qquad (72)$$

$${}_g\hat{\Theta}=\{\{\hat{G}_{k,w}\}_{1\le k\le K_w}\}_{0\le w\le N-1} \qquad (73)$$

$$\hat{\Theta}^{(i)}=\{{}_s\hat{\Theta}^{(i)},{}^g\hat{\Theta}^{(i)},{}^d\tilde{\Theta}\} \qquad (74)$$

$${}_s\hat{\Theta}^{(i)}=\{\hat{a}_{t,1}{}^{(i)}, \ldots ,\hat{a}_{t,P}{}^{(i)},{}^s\hat{\sigma}_t{}^{2(i)}\}_{0\le t\le T-1} \qquad (75)$$

$${}_g\hat{\Theta}^{(i)}=\{\{\hat{G}_{k,w}{}^{(i)}\}_{1\le k\le K_w}\}_{0\le w\le N-1} \qquad (76)$$

<<ECM Algorithm>>

1. The initial values $\Theta^{\hat{}(0)}$ of the parameter estimates are determined. An index i indicating the iteration count is set to 0.

2. E-step (Noise Reduction)

The conditional posterior distribution $p(x|y, \Theta^{\hat{}(i)})$ of the reverberant signals is calculated.

3. CM-step 1 (Update of Source parameter Estimates)

An auxiliary function $Q(\Theta|\Theta^{\hat{}(i)})$ is defined as follows.

$$Q(\Theta|\hat{\Theta}^{(i)})=\int p(x|y,\hat{\Theta}^{(i)})\log p(y,x|\Theta)dx \qquad (77)$$

Now, the source parameter estimates are updated from ${}_s\Theta^{\hat{}(i)}$ to ${}_s\Theta^{\hat{}(i+1)}$ as follows.

$${}_s\hat{\Theta}^{(i+1)} = \underset{{}_s\Theta}{\text{argmax}}\,Q(\Theta \mid \hat{\Theta}^{(i)}) \text{ under condition } {}_g\Theta = {}_g\hat{\Theta}^{(i)} \qquad (78)$$

Therefore, ${}_s\Theta^{\hat{}(i+1)}$ that maximize the auxiliary function $Q(\Theta|\Theta^{\hat{}(i)})$ for the fixed reverberation parameter estimates ${}_g\Theta^{\hat{}(i)}$ are the updated source parameter estimates.

4. CM-step 2 (Update of Reverberation Parameter Estimates)

The reverberation parameter estimates are updated as follows.

$${}_g\hat{\Theta}^{(i+1)} = \underset{{}_g\Theta}{\text{argmax}}\,Q(\Theta \mid \hat{\Theta}^{(i)}) \text{ under condition } {}_s\Theta = {}_s\hat{\Theta}^{(i+1)} \qquad (79)$$

Therefore, ${}_g\Theta^{\hat{}(i+1)}$ that maximize the auxiliary function $Q(\Theta|\Theta^{\hat{}(i)})$ for the fixed source parameter estimates ${}_s\Theta^{\hat{}(i+1)}$ are the updated reverberation parameter estimates.

5. Termination condition check

If a predetermined termination condition is satisfied, the processing is terminated with ${}_s\hat{\Theta}={}_s\hat{\Theta}^{(i+1)}$ and ${}_g\hat{\Theta}={}_g\hat{\Theta}^{(i+1)}$. Otherwise, the processing returns to the E-step while incrementing i by one.

<<Procedures for Each Step>>

The procedures for the E-step, CM-step 1, and CM-step 2 will be described next.

1. Procedure for E-step

The discrete Fourier transform coefficient series of the source signal, those of the reverberant signals, and those of the noisy reverberant signals obtained by all the sensors in the w-th frequency band is expressed as follows.

$$s_w = \begin{bmatrix} s_{T-1,w} \\ s_{T-2,w} \\ \vdots \\ s_{0,w} \end{bmatrix},\quad x_w = \begin{bmatrix} x_{T-1,w} \\ x_{T-2,w} \\ \vdots \\ x_{0,w} \end{bmatrix},\quad y_w = \begin{bmatrix} y_{T-1,w} \\ y_{T-2,w} \\ \vdots \\ y_{0,w} \end{bmatrix} \tag{80}$$

The source signal vector set s, the reverberant signal vector set x, and the noise reverberant signal vector set y are equivalent to the sets of $s_w$, $x_w$, and $y_w$, respectively, over the whole frequency bands ($0 \le w \le N-1$).

The conditional posterior distribution $p(x|y, \hat{\Theta}^{(i)})$ of the reverberant signals in Equation (77) can be expressed by a plurality of independent complex normal distributions for individual frequency bands w, as shownbelow.

$$p(x \mid y, \hat{\Theta}^{(i)}) = \prod_{w=0}^{N-1} N_C\{x_w;\, \mu_w(\hat{\Theta}^{(i)}, y), \Sigma_w(\hat{\Theta}^{(i)})\} \tag{81}$$

The mean $\mu_w(\hat{\Theta}^{(i)}, y)$ and the covariance matrix $\Sigma_w(\hat{\Theta}^{(i)})$ are calculated as follows. The mean $\mu_w(\hat{\Theta}^{(i)}, y)$ is an M-dimensional vector.

$$\mu_w(\hat{\Theta}^{(i)}, y) = (BV_w \cdot BV_w^H + GV_w^{(i)} \cdot AV_w^{(i)} \cdot AV_w^{(i)H} \cdot GV_w^{(i)H})^{-1} \times (BV_w \cdot BV_w^H) \cdot y_w \tag{82}$$

$$\Sigma_w(\hat{\Theta}^{(i)}) = (BV_w \cdot BV_w^H + GV_w^{(i)} \cdot AV_w^{(i)} \cdot AV_w^{(i)H} \cdot GV_w^{(i)H})^{-1} \tag{83}$$

The variables included in Equations (82) and (83) are defined as follows. The elements in blank spaces in Equation (84) are 0.

$$GV_w^{(i)} = \begin{bmatrix} I_M & & & & & & \\ -\hat{G}_{1,w}^{(i)} & I_M & & & & & \\ -\hat{G}_{2,w}^{(i)} & -\hat{G}_{1,w}^{(i)} & \ddots & & & & \\ \vdots & -\hat{G}_{2,w}^{(i)} & \ddots & I_M & & & \\ -\hat{G}_{K_w,w}^{(i)} & \vdots & \ddots & -\hat{G}_{1,w}^{(i)} & I_M & & \\ & -\hat{G}_{K_w,w}^{(i)} & & -\hat{G}_{2,w}^{(i)} & -\hat{G}_{1,w}^{(i)} & I_M & \\ & & \ddots & \vdots & \vdots & \vdots & \ddots \\ & & & -\hat{G}_{K_w,w}^{(i)} & -\hat{G}_{K_w-1,w}^{(i)} & -\hat{G}_{K_w-2,w}^{(i)} & \cdots\ I_M \end{bmatrix} \tag{84}$$

-continued $$AV_w^{(i)} = b\text{diag}\left\{I_M\sqrt{{}_s\lambda_{T-1}^{(i)}(2\pi w/N)},\ {}_sI_M\sqrt{{}_s\lambda_{T-s}^{(i)}(2\pi w/N)},\ \ldots\ ,\ I_M\sqrt{{}_s\lambda_0^{(i)}(2\pi w/N)}\right\} \tag{85}$$

$${}_s\lambda_t^{(i)}(\omega) = \frac{{}_s\hat{\sigma}_t^{2(i)}}{|1 - \hat{a}_{t,1}^{(i)}e^{-j\omega} - \ldots - \hat{a}_{t,P}^{(i)}e^{-j\omega P}|^2} \tag{86}$$

$$BV_w \cdot BV_w^H = b\text{diag}\{{}_d\tilde{\Lambda}_{T-1}(2\pi w/N),\ {}_d\tilde{\Lambda}_{T-2}(2\pi w/N),\ \ldots\ ,\ {}_d\tilde{\Lambda}_0(2\pi w/N)\} \tag{87}$$

As defined below, bdiag $\{\Omega_1, \ldots, \Omega_\alpha\}$ is a block diagonal matrix that consists of given square matrices $\Omega_1, \ldots, \Omega_\alpha$.

$$\begin{bmatrix} \Omega_1 & & 0 \\ & \ddots & \\ 0 & & \Omega_\alpha \end{bmatrix} \tag{88}$$

Because of the assumed noise stationarity described above, the following relation holds:

$${}_d\Lambda_{T-1}^{\tilde{}}(2\pi w/N) = {}_d\Lambda_{T-2}^{\tilde{}}(2\pi w/N) = \ldots = {}_d\Lambda_0^{\tilde{}}(2\pi w/N) = {}_d\Lambda^{\tilde{}}(2\pi w/N) \tag{89}$$

In the following, let $\mu v_{m,w}^{(i)}$ be a partial vector containing the M(T−m−1)+1-th to M(T−m)-th elements of the mean $\mu_w(\hat{\Theta}^{(i)}, y)$, and let $\mu v_{m:n,w}^{(i)}$ ($m \ge n$) be a partial vector containing the M(T−m−1)+1-th to M(T−m)-th elements of the mean $\mu_w(\hat{\Theta}^{(i)}, y)$. Let $\Sigma V_{(m1:n1,\, m2:n2),w}^{(i)}$ be a submatrix containing the (M(T−m1−1)+1, M(T−m2−1)+1)-th to (M(T−n1), M(T−n2))-th elements of the covariance matrix $\Sigma_w(\hat{\Theta}^{(i)})$.

2. Procedure for CM-step1

The linear prediction coefficients of the source signal in the t-th frame and their estimates are expressed in vector form as shown in Equation (35).

The source parameters ${}_s\Theta$ and their estimates ${}_s\hat{\Theta}$ are respectively equivalent to the sets of $\{a_t, {}_s\sigma_t^2\}$ and $\{\hat{a}_t, {}_s\hat{\sigma}_t^2\}$ for all frames ($0 \le t \le T-1$).

The source parameters are updated according to Equation (78) by updating the estimates of $a_t$ and ${}_s\sigma_t^2$, which are given by Equations (36) and (37), for all frames ($0 \le t \le T-1$). In this embodiment, $V_{t,w}^{(i)}$ is calculated according to the following equations instead of Equations (41) and (42).

$$V_{t,w}^{(i)} = davg\left[I_M - \hat{G}_w^{(i)H}\right]\left(\mu v_{t:t-K_w,w}^{(i)} \cdot \mu v_{t:t-K_w,w}^{(i)H} + \Sigma V_{(t:t-K_w,t:t-K_w),w}^{(i)}\right)\begin{bmatrix} I_M \\ -\hat{G}_w^{(i)} \end{bmatrix} \tag{90}$$

$$\hat{G}_w^{(i)} = \begin{bmatrix} \hat{G}_{1,w}^{(i)} \\ \vdots \\ \hat{G}_{K_w,w}^{(i)} \end{bmatrix} \tag{91}$$

By calculating Equations (36) to (40), the estimates of $a_t$ and ${}_s\sigma_t^2$ are updated. Here, for square matrix A, davg(A) appearing in Equation (90) denotes the average of the diagonal elements of the square matrix A.

3. Procedure for CM-Step2

The reverberation parameters in the w-th frequency band and their estimates are expressed by the following vectors.

$$G_w = \begin{bmatrix} G_{1,w} \\ \vdots \\ G_{K_w,w} \end{bmatrix},\quad \hat{G}_w = \begin{bmatrix} \hat{G}_{1,w} \\ \vdots \\ \hat{G}_{K_w,w} \end{bmatrix} \tag{92}$$

The reverberation parameters ${}_g\Theta$ and their estimates ${}_g\Theta\hat{}$ are equivalent to the sets of $G_w$ and $G_w\hat{}$, respectively, over the whole frequency bands ($0 \le w \le N-1$).

The reverberation parameters are updated according to Equation (78), which is done by updating the estimate of $G_w$ according to the following equation for the whole frequency bands ($0 \le w \le N-1$).

$$\hat{G}_w^{(i+1)} = {}_xRV_w^{(i)^{-1}} \cdot {}_xrv_w^{(i)} \tag{93}$$

Here, ${}_xRV_w^{(i)}$ and ${}_xrv_w^{(i)}$ are defined as follows.

$${}_xRV_w^{(i)} = \sum_{t=0}^{T-1} \frac{1}{{}_s\lambda_t^{(i+1)}(2\pi w/N)} \left(\mu v_{t-1:t-K_w,w}^{(i)} \cdot \mu v_{t-1:t-K_w,w}^{(i)H} + \Sigma V_{(t-t:t-K_w,t-1:t-K_w),w}^{(i)}\right) \tag{94}$$

$${}_xrv_w^{(i)} = \sum_{t=0}^{T-1} \frac{1}{{}_s\lambda_t^{(i+1)}(2\pi w/N)} \left(\mu v_{t-1:t-K_w,w}^{(i)} \cdot \mu v_{t,w}^{(i)H} + \Sigma_{(t-1:t-K_w,t:t),w}^{(i)}\right) \tag{95}$$

As was described earlier, in this embodiment, the noise reduction (E-step), the source parameter estimate update (CM-step 1), and the reverberation parameter estimate update (CM-step 2) are performed iteratively in a cooperative fashion, and thus the estimates of the source parameters and reverberation parameters are updated. Therefore, noise and reverberation contained in the signal observed in noisy reverberant environments are accurately reduced, and thus the source signal is enhanced.

<Structure of this Embodiment>

The structure of a signal enhancement device of this embodiment will be described next.

Figure 6:
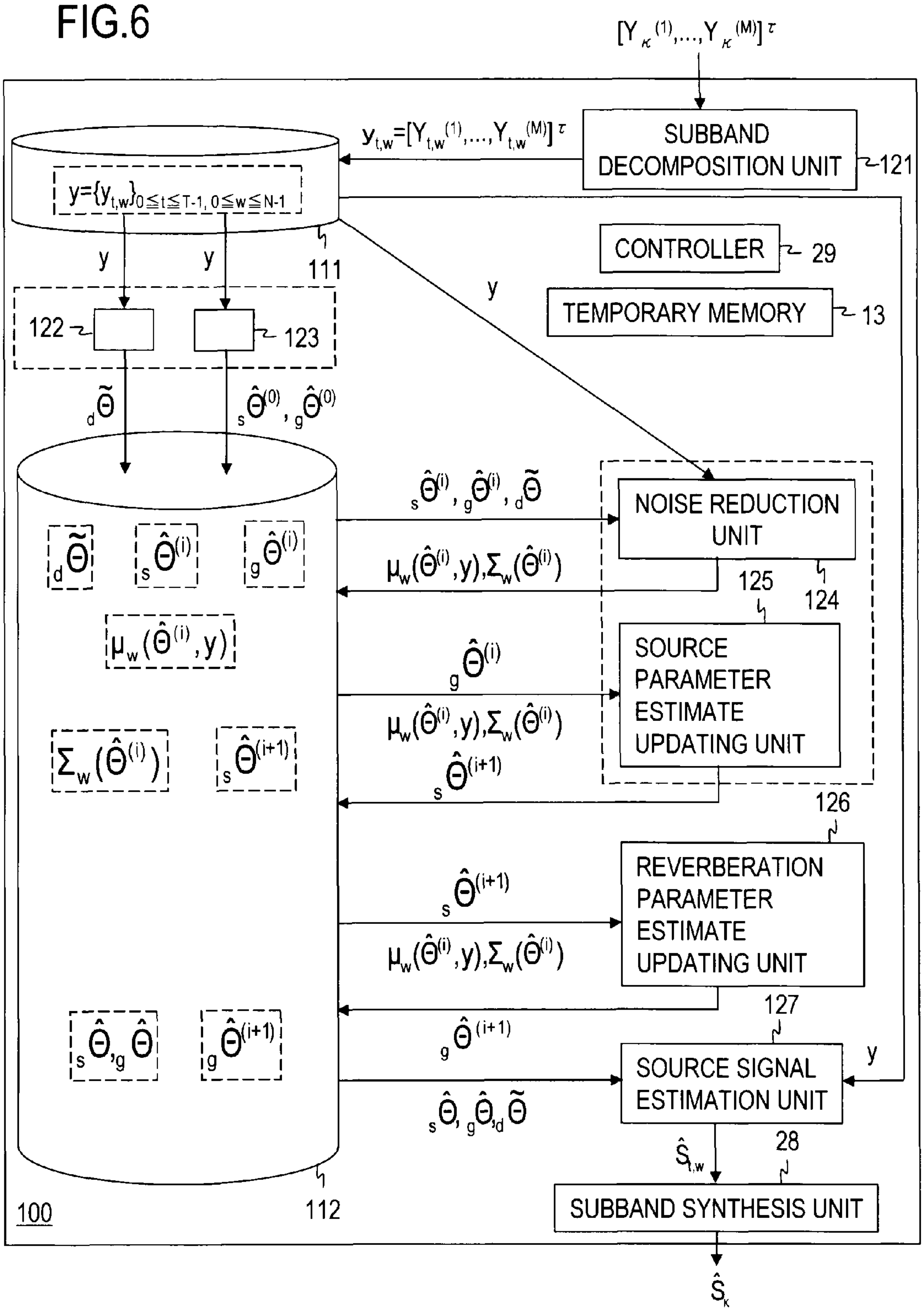
FIG. 6 is a block diagram showing the structure of a signal enhancement device according to the second embodiment.
Figure 7:
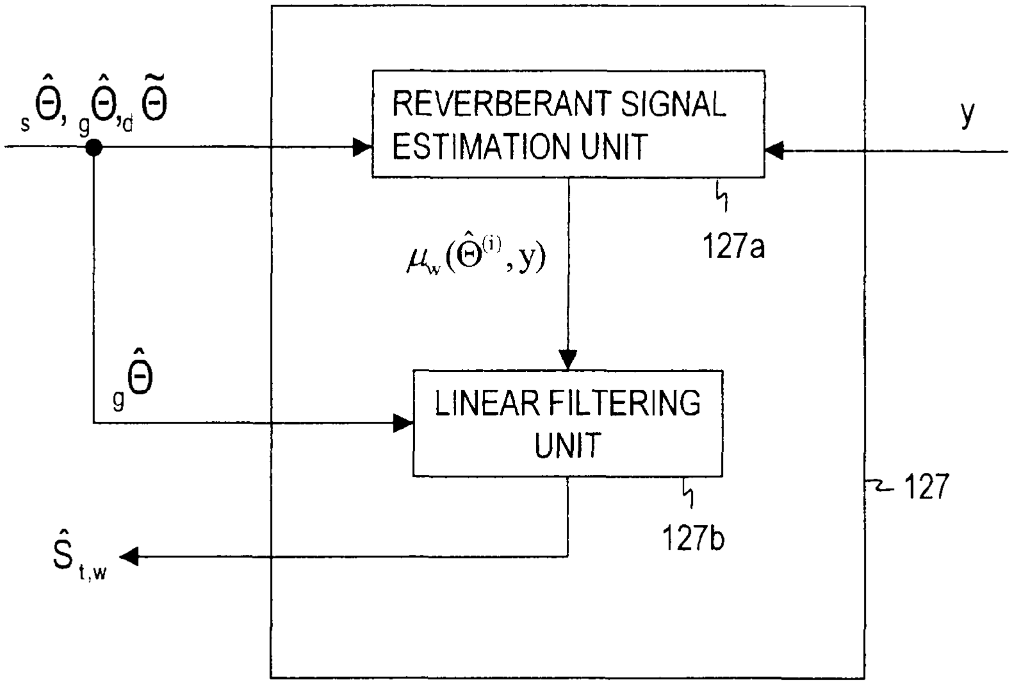
FIG. 7 is a block diagram showing a detailed structure of the source signal estimation unit.

FIG. 6 is a block diagram showing the structure of a signal enhancement device 100 according to the second embodiment. FIG. 7 is a block diagram showing a detailed structure of a source signal estimation unit 127.

As shown in FIG. 6, the signal enhancement device 100 in this embodiment includes an observed signal memory 111, a parameter memory 112, a temporary memory 13, a subband decomposition unit 121, a noise parameter estimation unit 122, an initial parameter setting unit 123, a noise reduction unit 124, a source parameter estimate updating unit 125, a reverberation parameter estimate updating unit 126, a source signal estimation unit 127, a subband synthesis unit 28, and a controller 29. The source signal estimation unit 127 includes a reverberant signal estimation unit 127*a* and a linear filtering unit 127*b*. The noise parameter estimation unit 122 and the initial parameter setting unit 123 correspond to the initialization unit described earlier. The noise reduction processor 124 and the source parameter estimate updating unit 125 correspond to the first updating unit described earlier. The reverberation parameter estimate updating unit 126 corresponds to the second updating unit described earlier.

The signal enhancement device 100 in this embodiment is implemented by a predetermined program loaded onto a computer that includes a CPU, a RAM, and other units. More specifically, the observed signal memory 111, the parameter memory 112, and the temporary memory 13 may be implemented by using memories composed of a RAM, registers, a cache memory, an auxiliary storage device, or their combination. The subband decomposition unit 121, the noise parameter estimation unit 122, the initial parameter setting unit 123, the noise reduction unit 124, the source parameter estimate updating unit 125, the reverberation parameter estimate updating unit 126, the source signal estimation unit 127, the subband synthesis unit 28, and the controller 29 are special units implemented in this device by a predetermined program read into the CPU. The controller 29 controls each processing part of the signal enhancement device 100.

<Processing in this Embodiment>

Figure 8:
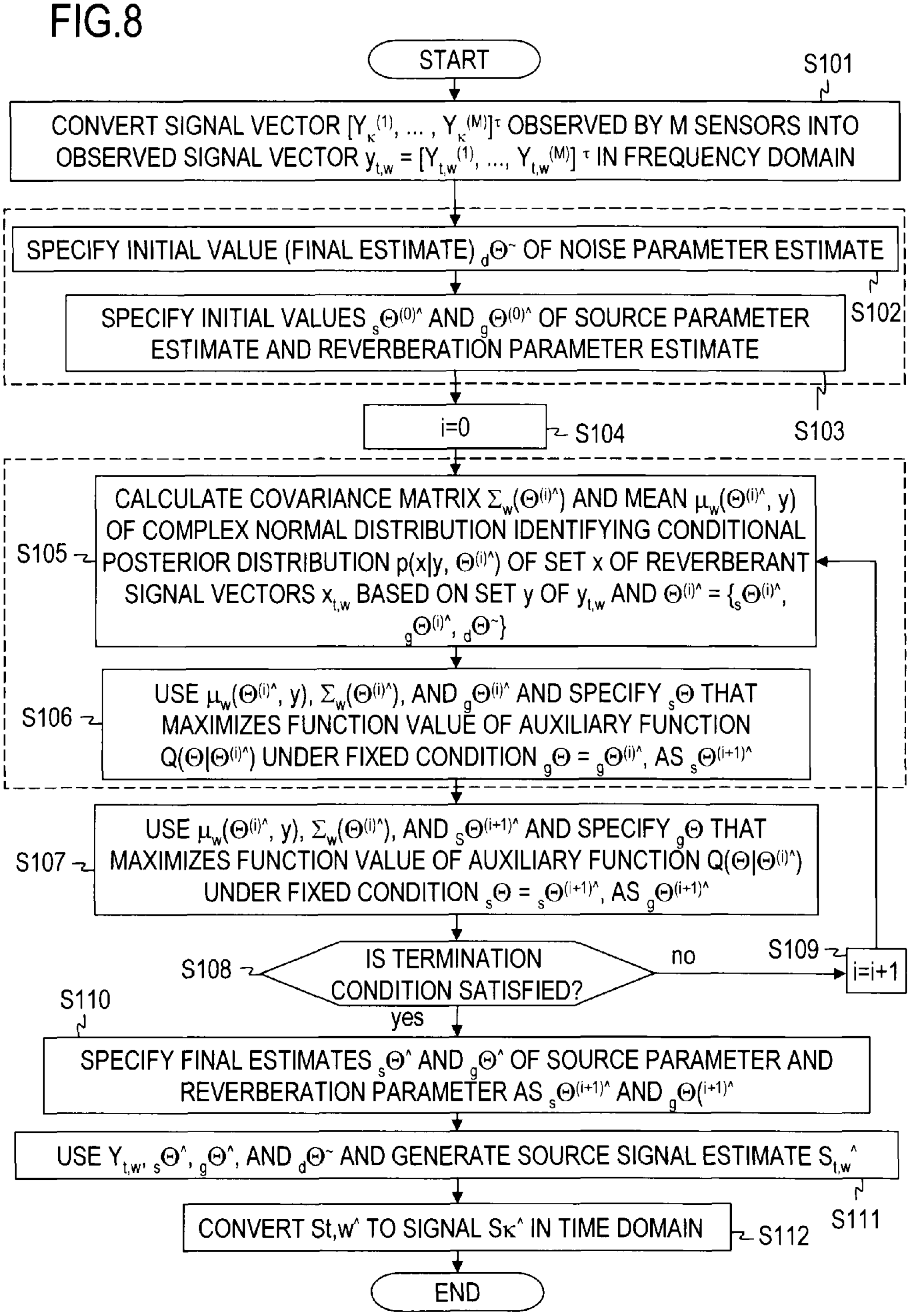
FIG. 8 is a flowchart for describing a signal enhancement method according to the second embodiment.

FIG. 8 is a flowchart illustrating a signal enhancement method of the second embodiment. The signal enhancement method of this embodiment will be described with reference to the flowchart.

An observed signal vector $[Y_\kappa^{(1)}, \ldots Y_\kappa^{(m)}]^\tau$ containing time-domain observed signals $Y_\kappa^{(m)}$ ($1 \le m \le M$), which are observed by M sensors and quantized, is input to the subband decomposition unit 121 of the signal enhancement device 100. The subband decomposition unit 121 converts the observed signal vector $[Y_\kappa^{(1)}, \ldots, Y_\kappa^{(M)}]^\tau$ into an time-frequency-domain observed signal vector $y_{t,w} = [y_{t,w}^{(1)}, \ldots, y_{t,w}^{(M)}]^\tau$ with a short time Fourier transform or the same kind of techniques and stores the vector in the observed signal memory 111 (step S101).

Among the observed signal vectors $y_{t,w}$ stored in the observed signal memory 111, the noise parameter estimation unit 122 uses the vectors corresponding to a period in which the source signal is absent in order to estimate the true values ${}_d\Theta\tilde{}$ of the noise parameters. As described earlier, the noise parameters ${}_d\Theta$ in this embodiment are a noise cross-power spectrum matrix (i.e., covariance matrix of an M-dimensional complex normal distribution characterizing the probability distribution of the noise). This embodiment assumes that the noise is stationary and that its mean is $O_M$. Therefore, the true values ${}_d\Theta\tilde{}$ of the noise parameters can be estimated by using the observed signal vectors $y_{t,w}$ in a period in which the source signal is absent; this is done by the following equation:

$${}_d\tilde{\Lambda}(2\pi w/N) = \frac{1}{|\eta|} \sum_{t \in \eta} y_{t,w} \cdot y_{t,w}^H \tag{96}$$

Here, $\eta$ is a set of the frame indices in a period in which the source signal is absent, and $|\eta|$ is the number of frames in the source-absent period. For example, an existing voice activity detection technology may be used to identify the speech-absent period. Alternatively, it may be possible to measure in advance observed signals $Y_{t,w}$ that do not contain the source signal and use them for the noise parameter estimation. The estimated true values ${}_d\Theta\tilde{}$ of the noise parameters are stored in the parameter memory 112 (step S102).

The initial parameter setting unit 123 sets the initial values)${}_5\Theta\hat{}^{(0)}$ and ${}_g\Theta\hat{}^{(0)}$ of the estimates of the source parameters and reverberation parameters. For example, the initial parameter setting unit 123 reads the observed signal vectors $y_{t,w}$ from the observed signal memory 111, calculates the linear prediction coefficients and the prediction residual powers calculated by applying linear prediction to the first vector elements (which corresponds to the signal observed by the first sensor), and sets them as the initial values) ${}_s\Theta\hat{}^{(0)}$ of the source parameter estimates. On the other hand, ${}_g\Theta\hat{}^{(0)} = \{\{G_{k,w}\hat{}^{(0)} = O_M\}_{1 \le k \le Kw}\}_{0 \le w \le N-1}$ may be used as the initial values ${}_g\hat{\Theta}^{(0)}$ of the reverberation parameter estimates, where $O_M$ is an M-dimensional zero matrix. The initial values ${}_s\hat{\Theta}^{(0)}$ and ${}_g\hat{\Theta}^{(0)}$ of the parameter estimates are stored in the parameter memory 112 (step S103).

The controller 29 sets the index i indicating the iteration count to 0 and stores it in the temporary memory 13 (step S104).

The observed signal vectors $y_{t,w}$ read from the observed signal memory 111, the source parameter estimates ${}_s\hat{\Theta}^{(i)}$, the true values ${}_d\tilde{\Theta}$ of the noise parameters read from the parameter memory 112, and the reverberation parameter estimates ${}_g\hat{\Theta}^{(i)}$ are input to the noise reduction unit 124. Using these values, the noise reduction unit 124 calculates the covariance matrix $\Sigma_w(\hat{\Theta}^{(i)})$ and the mean $\mu_w(\hat{\Theta}^{(i)}, Y)$ of the complex normal distribution characterizing the posterior distribution $p(x|y, \hat{\Theta})$ of the set x of the reverberant signal vectors $x_{t,w}$ conditioned on the set y of observed signal vectors $y_{t,w}$ and the parameter estimates $\hat{\Theta}$ (step S105). More specifically, the covariance matrix $\Sigma_w(\hat{\Theta}^{(i)})$ and the mean $\mu_w(\hat{\Theta}^{(i)}, y)$ of the complex normal distribution are calculated by using Equations (82) to (87) shown earlier. The calculated covariance matrix $\Sigma_w(\hat{\Theta}^{(i)})$ and the calculated mean $\mu_w(\hat{\Theta}^{(i)}, y)$ of the complex normal distribution are stored in the parameter memory 112.

The reverberation parameter estimates ${}_g\hat{\Theta}^{(i)}$, the covariance matrices $\Sigma_w(\hat{\Theta}^{(i)})$, and the means $\mu_w(\hat{\Theta}^{(i)}, y)$ of the complex normal distributions read from the parameter memory 112 are input to the source parameter estimate updating unit 125. Using these values, the source parameter estimate updating unit 125 updates the source parameter estimates ${}_s\hat{\Theta}^{(i)}$ so that the auxiliary function $Q(\Theta|\hat{\Theta}^{(i)})$ shown in Equation (77) is maximized while the reverberation parameters ${}_g\Theta$ are fixed at ${}_g\hat{\Theta}^{(i)}$, and thus the updated source parameter estimates ${}_s\hat{\Theta}^{(i+1)}$ (step S106) are obtained. More specifically, the updated source parameter estimates ${}_s\hat{\Theta}^{(i+1)}$ are calculated by using Equations (36) to (40), (90), and (91). The updated source parameter estimates ${}_s\hat{\Theta}^{(i+1)}$ are stored in the parameter memory 112.

The source parameter estimates ${}_s\hat{\Theta}^{(i+1)}$, the covariance matrices $\Sigma_w(\hat{\Theta}^{(i)})$, and the means $\mu_w(\hat{\Theta}^{(i)}, y)$ of the complex normal distributions read from the parameter memory 112 are input to the reverberation parameter estimate updating unit 126. Using these values, the reverberation parameter estimate updating unit 126 obtains updated reverberation parameter estimates ${}_g\hat{\Theta}^{(i+1)}$ so that the auxiliary function $Q(\Theta|\hat{\Theta}^{(i)})$ shown in Equation (77) is maximized while the source parameters ${}_s\Theta$ are fixed at ${}_s\hat{\Theta}^{(i+1)}$ (step S107). More specifically, the reverberation parameter estimates ${}_g\hat{\Theta}^{(i+1)}$ are calculated by using Equations (93) to (95). The updated reverberation parameter estimates ${}_g\hat{\Theta}^{(i+1)}$ are stored in the parameter memory 112.

The controller 29 (corresponding to the termination condition check unit) determines whether a predetermined termination condition is satisfied (step S108). The predetermined termination condition may check whether the variation of the parameter estimates obtained by the update (the distance (cosine distance, Euclidean distance, or the like) between the parameter estimates before and after the update) does not exceed a predetermined threshold or whether the iteration index i is greater than or equal to a predetermined threshold.

If the predetermined termination condition is not satisfied, the controller 29 increments the iteration index i by 1, stores the new index i value in the temporary memory 13 (step S109), and returns to step S105.

If the predetermined termination condition is satisfied, the controller 29 regards the source parameter estimates ${}_s\hat{\Theta}^{(i+1)}$ and the reverberation parameter estimates ${}_g\hat{\Theta}^{(i+1)}$ at that time as the final source parameter estimates ${}_s\hat{\Theta}$ and the final reverberation parameter estimates ${}_g\hat{\Theta}'$, respectively, and stores them in the parameter memory 112 (step S110).

The observed signals $Y_{t,w}$ and the final parameter estimates ${}_s\hat{\Theta}$, ${}_g\hat{\Theta}$, and ${}_d\tilde{\Theta}$ are input to the source signal estimation unit 127. Using them, the source signal estimation unit 127 generates a source signal estimate $\hat{S}_{t,w}$ (step S111). $\hat{S} = \{\hat{S}_{t,w}\}_{0 \le t \le T-1,\ 0 \le w \le N-1}$ is the complex spectrogram of a signal obtained by the signal enhancement.

More specifically, the observed signal vectors $y_{t,w}$ and the final parameter estimates ${}_s\hat{\Theta}$, ${}_g\hat{\Theta}$, and ${}_d\tilde{\Theta}$ are input to the reverberant signal estimation unit 127*a* (FIG. 7) of the source signal estimation unit 127. Using them, the reverberant signal estimation unit 127*a* calculates the mean $\mu_w(\hat{\Theta}, y)$ $(0 \le w \le N-1)$ of the posterior distribution $p(x|y, \hat{\Theta})$ of the reverberant signal vector $x_{t,w}$ conditioned on the observed signal vectors $y_{t,w}$ and the parameter estimates $\hat{\Theta}$ and uses it for obtaining the estimates (corresponding to the final reverberant signal estimate) of the reverberant signal vectors $x_{t,w}$. More specifically, the mean $\mu_w(\hat{\Theta}, y)$ is calculated by the equations that are obtained by replacing $\hat{\Theta}^{(i)}$ with $\hat{\Theta}$ in Equations (82) to (87) described earlier. The calculated estimate $\mu_w(\hat{\Theta}, y)$ of the reverberant signal vector $x_{t,w}$ is sent to the linear filtering unit 127*b*.

The linear filtering unit 127*b* receives the calculated estimates $\mu_w(\hat{\Theta}, y)$ of the reverberant signal vectors $x_{t,w}$ and the final reverberation parameter estimates ${}_g\hat{\Theta}$. The linear filtering unit 127*b* applies the linear filter given by the input reverberation parameter estimates ${}_g\hat{\Theta}$ to the estimates $\mu_w(\hat{\Theta}, y)$ of the reverberant signal vectors $x_{t,w}$ and generates estimates $\hat{s}_{t,w}$ of the source signal vectors. Then, the linear filtering unit 127*b* takes the average of the elements of each source signal vector estimate $\hat{s}_{t,w}$ and outputs the average as the source signal estimate $\hat{S}_{t,w}$ (corresponding to the final source signal estimate), for example. More specifically, the linear filtering unit 127*b* calculates the source signal estimate $\hat{S}_{t,w}$ as shown below, where $\mu v_{t,w}$ is the partial vector formed of the M(T−t−1)+1-th to M(T−t)-th elements of the estimates $\mu_w(\hat{\Theta}, y)$ of the reverberant signal vectors $x_{t,w}$.

$$\hat{S}_{t,w} = avg\left(\mu v_{t,w} - \sum_{k=1}^{K_w} \hat{G}_{k,w}^{H} \cdot \mu v_{t-k,w}\right) \tag{97}$$

Here, avg(α) for vector α represents the average of all the elements of the vector α.

$$\mu v_{t,w} - \sum_{k=1}^{K_w} \hat{G}_{k,w}^{H} \cdot \mu v_{t-k,w}$$

Although this embodiment assumed that the average of the elements of the vector described immediately above is a source signal estimate $\hat{S}_{t,w}$, it is also possible to use one of the vector elements as the source signal estimate $\hat{S}_{t,w}$.

The calculated source signal estimate $\hat{S}_{t,w}$ is stored in the parameter memory 112.

Then, the source signal estimate $\hat{S}_{t,w}$ is input to the subband synthesis unit 28, and the subband synthesis unit 28 calculates a source signal estimate $\hat{S}_\kappa$ using short time Fourier transform or similar techniques, and outputs the result (step S112).

<Experimental Result>

An experiment was conducted to confirm the effect provided by this embodiment. Utterances of two male and two female speakers were prepared. Reverberant speech signals were synthesized by convolving the acoustic signals of the utterances with impulse responses recorded by two microphones in a room with a reverberation time of about 0.5 seconds. By adding white noise to them at an SNR of 15 dB, noisy reverberation speech signals were simulated.

The parameters needed to implement this embodiment were set as follows: the short time Fourier transform frame length was 256 samples; the shift width was 128 samples; the Hanning window was used, the order of a room transfer system was 25; and the linear prediction order for speech signals was 12. The ECM algorithm was terminated when the iteration count exceeds 3. Cepstrum distortion was used as a measure for evaluating the quality of the enhanced speech signal.

Before the processing of this embodiment was performed, the average of the cepstrum distortions of the signals (noisy reverberation signals) was 6.99 dB. After the processing of this embodiment was performed, the average of the cepstrum distortions of the signals was 5.15 dB, indicating an improvement by 1.84 dB. For reference, when a single microphone was used, the average of the cepstrum distortions was 5.61 dB. From these results, the effectiveness of this embodiment was confirmed.

Third Embodiment

The third embodiment will be described next.

<Outline of Parameter Estimation Processing in this Embodiment>

Processing of a parameter estimation unit in this embodiment will be outlined below. In this embodiment, the second parameter group includes at least steering vectors in addition to source parameters. In this embodiment, a first updating unit updates estimates of the parameters of the second parameter group, and a second updating unit updates estimates of the parameters of the first parameter group.

[Observed Signal Storage Stage]

First, in the observed signal storage stage, observed signals are stored in a memory.

[Initialization Processing Stage]

Next, in the initialization processing stage, the estimates of the parameters of the first parameter group and the estimates of the parameters of the second parameter group are initialized.

[First Update Processing Stage]

In the first update processing stage of this embodiment, the parameter estimates of the second parameter group, which includes the source parameters, are updated while the parameter estimates of the first parameter group, which includes reverberation parameters, are kept fixed. More specifically, the first update processing stage of this embodiment performs update of a source signal estimate, update of steering vector estimates, and update of source parameter estimates.

<<Update of Source Signal Estimates>>

In the update of the source signal estimates, observed signals and reverberation parameter estimates are used to calculate an estimate of a noisy signal. This processing can be regarded as performing reverberation reduction in the sense that its input and output are a noisy reverberant signal and a noisy signal, respectively.

The calculated noisy signal estimate and the parameter estimates are used to calculate the mean and variance of a complex normal distribution characterizing the conditional posterior distribution of a source signal, p(source signal|noisy signal estimate, parameter estimates). The mean and variance are the estimate of the source signal and its associated error variance, respectively.

<<Update of Steering Vector Estimates>>

In the update of the steering vector estimates, the noisy signal estimate and the source signal estimate are used to update estimates of the steering vectors. The steering vector estimates are updated so that the logarithmic likelihood function of the parameter estimates is increased.

<<Update of Source Parameter Estimates>>

In the update of the source parameter estimates, estimates of the power spectra of the source signal are calculated from the estimate and error variance of the source signal. On the basis of these power spectrum estimates, the source parameter estimates are updated. This update is done so that the logarithmic likelihood function of the parameter estimates is increased.

[Second Update Processing Stage]

In the second update processing stage of this embodiment, the parameter estimates of the first parameter group, which includes the reverberation parameters, are updated while the parameter estimates of the second parameter group, which includes the source parameters, the noise parameters, and the steering vectors, are kept fixed. More specifically, the second update processing stage of this embodiment performs update of estimates of the short-term power spectra of the source signal, update of the reverberation parameter estimates, and update of the noise parameter estimates.

<<Update of Short-Term Power Spectrum Estimates of Source Signal>>

In the update of the short-term power spectrum estimates of the source signal, the source parameter estimates are used to update the power spectrum estimate of the source signal.

<<Update of Noise Parameter Estimates>>

In the update of the noise parameter estimates, the noisy signal estimate, the source signal estimate, and the steering vector estimates are used to update the noise parameter estimates. The update is done so that the logarithmic likelihood function of the parameter estimates is increased.

<<Update of Reverberation Parameter Estimates>>

In the update of the reverberation parameter estimates, the observed signal, the updated source signal power spectrum estimates, and the noise parameter estimates are used to update the reverberation parameter estimates. The reverberation parameter estimates are updated so as to maximize the logarithmic likelihood function of the parameters for the fixed source parameter estimates, the fixed noise parameter estimates, and the fixed steering vector estimates.

[Termination Condition Check Stage]

The termination condition check stage checks if a predetermined termination condition is satisfied. If the termination condition is not satisfied, the processing returns to the first update processing stage. If the termination condition is satisfied, the parameter estimates at that time are output.

[Principle]

The principle of this embodiment will be described next.

A source signal estimation unit of a signal enhancement device according to this embodiment estimates a noisy signal by reducing reverberation from an observed signal by linear filtering. Then, it reduces the noise from the noisy signal by nonlinear filtering such as Wiener filtering. For implementing this procedure, the parameters generated by the parameter estimation unit of this embodiment differ from those in the first and second embodiments.

Figure 2:
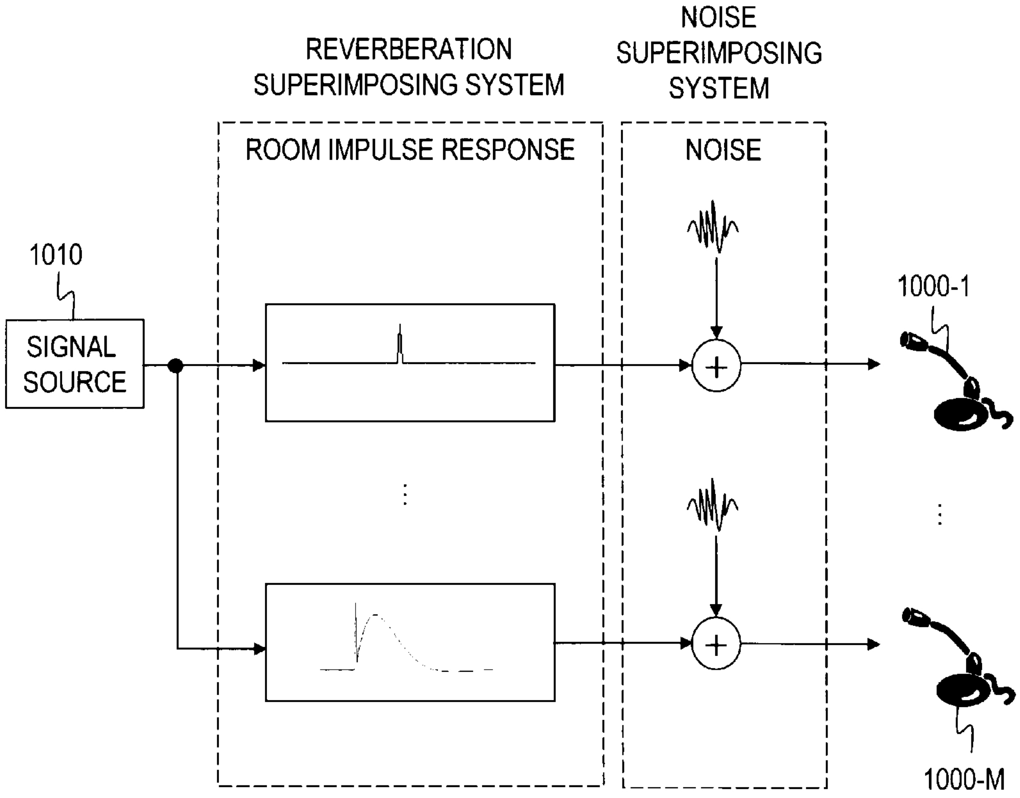
FIG. 2 is a diagram showing a system where noise and reverberation are imposed on a source signal.

As illustrated in FIG. 2, a system for generating a time-domain observed signal a plurality of reverberating systems (room transfer systems) that convolve room impulse responses and noise superimposing systems that impose stationary noise to the outputs of individual reverberating systems. By being contaminated by reverberation and noise with those systems, the source signal is transformed to a time-domain observed signal. The relationship between the time-frequency-domain observed signal vector, which will be denoted by $y_{t,w}$ and the source signal, which will be denoted by $S_{t,w}$, can be described as shown in Equation (98).

$$y_{t,w} = \sum_{k=1}^{K_w} G_{k,w}^H (y_{t-k,w} - d_{t-k,w}) + b_w S_{t,w} + d_{t,w} \tag{98}$$

Here, $d_{t,w}=[D_{t,w}^{(1)}, \ldots, D_{t,w(M)}]^\tau$ represents a noise vector; $b_w$ represents an M-dimensional steering vector; $G_{k,w}$ represents the k-th regression matrix of the room transfer systems; H represents the conjugate transpose; and $\tau$ represents the non-conjugate transpose. Equation (98) indicates that, in the w-th frequency band, the room transfer systems can be expressed by an M-channel autoregressive system of order $K_w$, where its k-th regression matrix is given by $G_{k,w}$. Equation (98) can be converted equivalently to Equation (99) to Equation (101).

$$y_{t,w} = \sum_{k=1}^{K_w} G_{k,w}^H y_{t-k,w} + \phi_{t,w} \tag{99}$$

$$\phi_{t,w} = b_w S_{t,w} + v_{t,w} \tag{100}$$

$$v_{t,w} = d_{t,w} - \sum_{k=1}^{K_w} G_{k,w}^H d_{t-k,w} \tag{101}$$

As indicated by Equation (101), $v_{t,w}$ is each of the output signals of an M-input M-output linear filter excited by the noise vector $d_{t,w}$, where the 0-th tap weight matrix of the linear filter is a unit matrix and the k-th tap weight matrix ($k \geq 1$) is $-G_{k,w}$. That is, $v_{t,w}$ is a filtered version of the noise and includes no components originating in the source signal. This embodiment simply refers to it as noise. As indicated in Equation (100), $\phi_{t,w}$ is the sum of the noise vector $v_{t,w}$ and the product of the source signal $S_{t,w}$ and the M-dimensional steering vector $b_w$. Hereafter, $\phi_{t,w}$ will be referred to as a noisy signal vector. Equation (99) shows that the observed signal vector $y_{t,w}$ is the signal that is obtained by reverberating the noisy signal $\phi_{t,w}$ with the autoregressive system whose k-th regression matrix is $G_{k,w}$.

In this embodiment, the reverberation parameters ${}_g\Theta$ are defined as ${}_g\Theta=\{\{G_{k,w}\}_{1 \leq k \leq Kw}\}_{0 \leq w \leq N-1}$. A steering vector set ${}_b\Theta=\{b_w\}_{0 \leq w \leq N-1}$ is a part of the parameters in this embodiment. The following conditions are assumed concerning the source signal and noise just as in the first and second embodiments.

<<Source Signal Model>>

The short-term power spectral density of the source signal is represented by an all pole model of order P. That is, the power spectral density of the source signal in the t-th frame is given by Equation (102).

$${}_s\lambda_t(\omega) = \frac{{}_s\sigma_t^2}{|A_t(e^{j\omega})|^2} \tag{102}$$

-continued $$A_t(z) = 1 - a_{t,1}z^{-1} - \ldots - a_{t,P}z^{-P} \tag{103}$$

Here, $\omega \in \{-\pi, \pi\}$ is an angular frequency; $a_{t,k}$ is a linear prediction coefficient; and ${}_s\sigma_t^2$ is a prediction residual power. With these source parameters, the short-term power spectrum ${}_s\lambda_{t,w}$ of the source signal in the t-th frame and the frequency band w can be given by Equation (104).

$${}_s\lambda_{t,w} = {}_s\lambda_t(2\pi w/N) \tag{104}$$

If $(t_1, w_1) \neq (t_2, w_2)$, then $S_{t1,w2}$ and $S_{t2,w2}$ are statistically independent. The source signal $S_{t,w}$ is distributed according to the zero-mean complex normal distribution whose variance is the source signal short-term power spectrum ${}_s\lambda_{t,w}$. The probability density function of the source signal $S_{t,w}$ is given by Equation (105).

$$p(S_{t,w};{}_s\Theta) = N\{S_{t,w};0,{}_s\lambda_{t,w}\} \tag{105}$$

Here, ${}_s\Theta$ denotes the source parameters defined as ${}_s\Theta=\{a_{t,1}, \ldots, a_{t,P}, {}_s\sigma_t^2\}_{0 \leq t \leq T-1}$. $N\{x;\mu, \Sigma\}$ is the probability density function of the complex normal distribution, which is defined by Equation (4).

<<Noise Model>>

Assuming the stationarity of noise, the short-term power spectral density and the short-term cross spectral density of noise are time-invariant. That is, they do not depend on the frame number t. Now, they are expressed by the matrix shown in Equation (106).

$${}_v\Lambda(\omega) = \begin{bmatrix} {}_v\lambda^{(1,1)}(\omega) & \cdots & {}_v\lambda^{(1,M)}(\omega) \\ \vdots & \ddots & \vdots \\ {}_v\lambda^{(M,1)}(\omega) & \cdots & {}_v\lambda^{(M,M)}(\omega) \end{bmatrix} \tag{106}$$

Here, ${}_v\lambda^{(m,m)}(\omega)$ is the short-term power spectral density of the m-th microphone's noise while ${}_v\lambda^{(m1,m2)}(\omega)$ is the cross spectral density between the noises of the $m_1$-th and $m_2$-th microphones. The noise short-term cross-power spectral matrix ${}_v\Lambda_w$ in the w-th frequency band is given by Equation (107).

$${}_v\Lambda_w = {}_v\Lambda(2\pi w/N) \tag{107}$$

If $(t_1, w_1) \neq (t_2, w_2)$, then $v_{t1w1}$ and $v_{t2,w2}$ are statistically independent. For all $(t_1, w_1, t_2, w_2)$, the source signal $S_{t1,w1}$ and the noise vector $v_{t2,w2}$ are statistically independent.

The noise vector $v_{t,w}$ is distributed according to the M-dimensional complex normal distribution whose mean is $O_M=[0, \ldots, 0]^\tau$ and whose covariance matrix is the noise short-term cross-power spectral matrix ${}_v\Lambda_w$. The probability density function of the noise vector $v_{t,w}$ is given by Equation (108).

$$p(v_{t,w};{}_v\Theta) = N\{v_{t,w};O_M,{}_v\Lambda_w\} \tag{108}$$

Here, ${}_v\Theta$ denotes the noise parameters defined as ${}_v\Theta=\{{}_v\Lambda_w\}_{0 \leq w \leq N-1}$. Therefore, the parameters $\Theta$ in this embodiment can be defined as shown in Equations (109) to (113).

$$\Theta=\{{}_g\Theta,{}_b\Theta,{}_s\Theta,{}_v\Theta\} \tag{109}$$

$${}_g\Theta=\{\{G_{k,w}\}_{1 \leq k \leq K_w}\}_{0 \leq w \leq N-1} \tag{110}$$

$${}_b\Theta=\{b_w\}_{0 \leq w \leq N-1} \tag{111}$$

$${}_s\eta=\{a_{t,1}, \ldots, a_{t,P},{}_s\sigma_t^2\}_{0 \leq t \leq T-1} \tag{112}$$

$${}_v\Theta=\{{}_v\Lambda_w\}_{0 \leq w \leq N-1} \tag{113}$$

Given an observed noisy reverberant signal, the parameter estimation unit of this embodiment estimates the parameters Θ by maximum likelihood estimation. In accordance with Equations (102), (103), and (104), the source signal power spectrum estimates are also calculated from the source parameter estimates. These estimates are supplied to the source signal estimation unit.

Let the regression matrix estimate be $\hat{G}_{k,w}$, the steering vector estimate be $\hat{b}_w$, the linear prediction coefficient estimate be $\hat{a}_{t,k}$, the prediction residual power estimate be ${}_s\hat{\sigma}_t^2$, the source-signal short-term power spectrum estimate be ${}_s\hat{\lambda}_{t,w}$, and the noise short-term cross-power spectral matrix estimate be ${}_v\hat{\Lambda}_w$.

The source signal estimation unit of this embodiment obtains the noisy signal vector estimate (i.e., a dereverberated signal) $\hat{\phi}_{t,w}$ by reducing reverberation from the observed signal vector $y_{t,w}$, as shown in Equation (114).

$$\hat{\phi}_{t,w} = y_{t,w} - \sum_{k=1}^{K_w} \hat{G}_{k,w}^H \cdot y_{t-k,w} \tag{114}$$

The source signal estimation unit then calculates the minimum mean square error (MMSE) estimate of the source signal $S_{t,w}$, by applying a multi-channel Wiener filter to the dereverberated signal $\hat{\phi}_{t,w}$, as shown in Equation (115).

$$\hat{S}_{t,w} = F(\hat{b}_w, {}_s\hat{\lambda}_{t,w}, {}_v\hat{\Lambda}_w) \cdot \hat{\phi}_{t,w} \tag{115}$$

$$F(b_w, {}_s\lambda_{t,w}, {}_v\Lambda_w) = \frac{b_w^{\tau}{}_v\Lambda_w^{-1}}{{}_s\lambda_{t,w}^{-1} + b_w^{\tau}{}_v\Lambda_w^{-1} b_w} \tag{116}$$

Here, F(•) represents the gain vector of the multi-channel Wiener filter.

<<Logarithmic Likelihood Function of Parameters>>

Based on the source signal and noise, the generation model equation (99) of the observed signal vector, and Equation (100), a logarithmic likelihood function of the parameters Θ

$$L(Y;\Theta) = \log p(y|\Theta) \tag{117}$$

can be described as Equation (118).

$$L(\Theta; y) \overset{c}{=} \sum_{w=0}^{N-1} \sum_{t=0}^{T-1} \left\{ -\log|{}_\phi\Lambda_{t,w}| - \left(y_{t,w} - \sum_{k=1}^{K_w} G_{k,w}^H y_{t-k,w}\right)^H \times {}_\phi\Lambda_{t,w}^{-1}\left(y_{t,w} - \sum_{k=1}^{K_w} G_{k,w}^H y_{t-k,w}\right) \right\} \tag{118}$$

Here, ${}_\phi\Lambda_{t,w}$ represents the covariance matrix of the noisy signal $\phi_{t,w}$ and is given by Equation (119).

$${}_\phi\Lambda_{t,w} = {}_s\lambda_{t,w} b_w b_w^H + {}_v\Lambda_w \tag{119}$$

The derivation of Equation (118) will now be described. As described by Nobutaka Ito, et al. in "Diffuse Noise Suppression by Crystal-Array-Based Post-Filter Design," IEICE EA2008-13, pp. 43-46, 2008, the covariance matrix of the noisy signal $\phi_{t,w}$ is given by Equation (119).

This fact and Equation (99) indicate that the probability density function of the observed signal vector $y_{t,w}$ conditioned on the past observed signal vectors is given by Equation (120).

$$p(y_{t,w} \mid y_{t-1,w}, \ldots, y_{t-K_w,w}; \Theta) = N\left\{y_{t,w}; \sum_{k=1}^{K_w} G_{k,w}^H y_{t-k,w}, {}_x\Lambda_{t,w}\right\} \propto |{}_\phi\Lambda_{t,w}|^{-1} \exp\left\{ -\left(y_{t,w} - \sum_{k=1}^{K_w} G_{k,w}^H y_{t-k,w}\right)^H \times {}_\phi\Lambda_{t,w}^{-1}\left(y_{t,w} - \sum_{k=1}^{K_w} G_{k,w}^H y_{t-k,w}\right) \right\} \tag{120}$$

Therefore, the probability density function for the set y of all observed signal vectors is given by Equation (121), where $y = \{y_{t,w}\}_{0 \le t \le T-1,\, 0 \le w \le N-1}$.

$$p(y \mid \Theta) = \prod_{p=0}^{N-1} \prod_{t=0}^{T-1} p(y_{t,w} \mid y_{t-1,w}, \ldots, y_{t-K_w,w}\Theta) = \prod_{w=0}^{N-1} \prod_{t=0}^{T-1} |{}_\phi\Lambda_{t,w}|^{-1} \times \exp\left\{ -\left(y_{t,w} - \sum_{k=1}^{K_w} G_{k,w}^H y_{t-k,w}\right)^H \times {}_\phi\Lambda_{t,w}^{-1}\left(y_{t,w} - \sum_{k=1}^{K_w} G_{k,w}^H y_{t-k,w}\right) \right\} \tag{121}$$

By taking the logarithm of both sides of Equation (121), Equation (118), which is the logarithmic likelihood function, is derived.

<Structure and Processing in this Embodiment>

Figure 9:
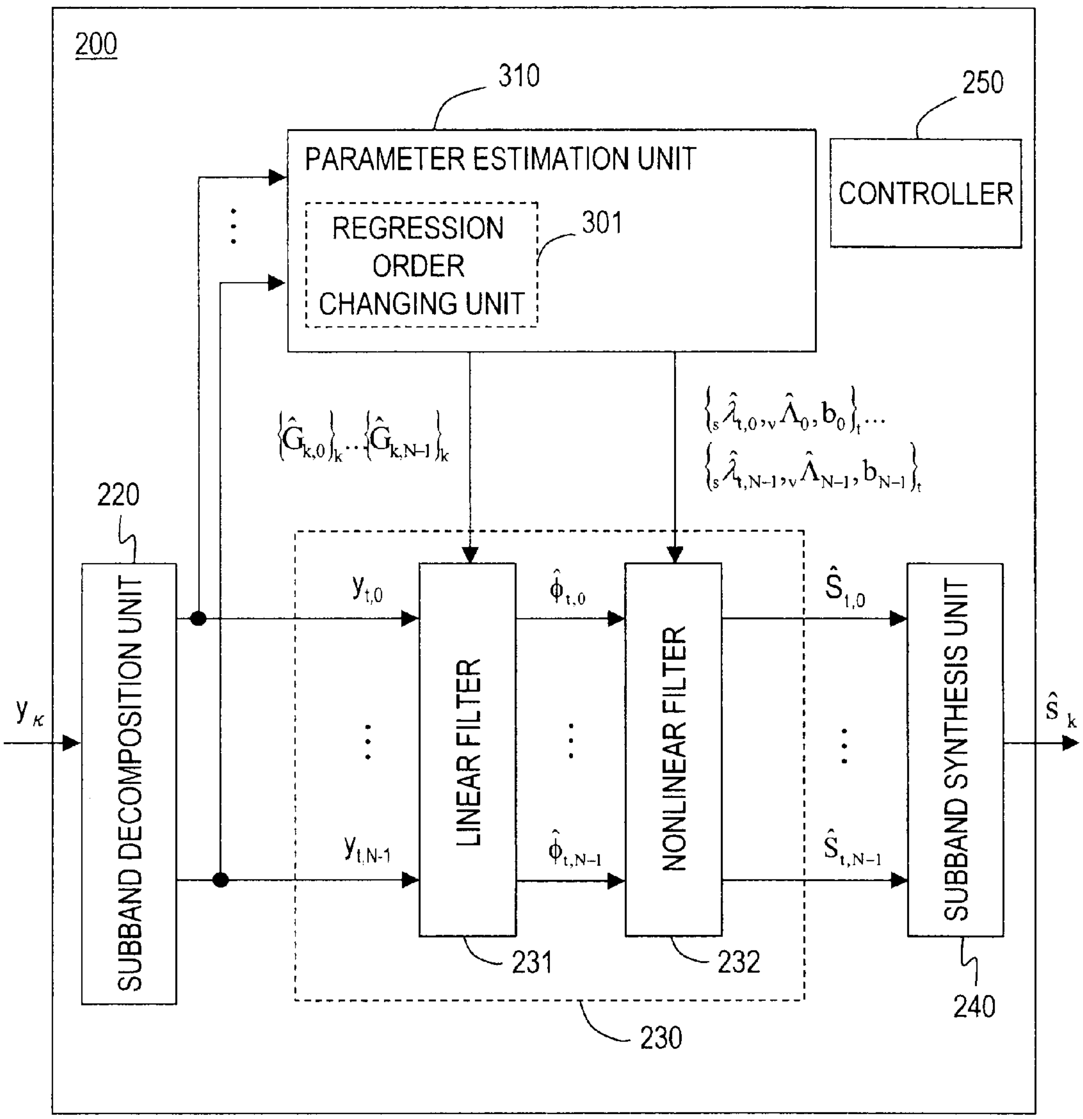
FIG. 9 is a block diagram showing an example functional structure of a signal enhancement device according to the third embodiment.
Figure 10:
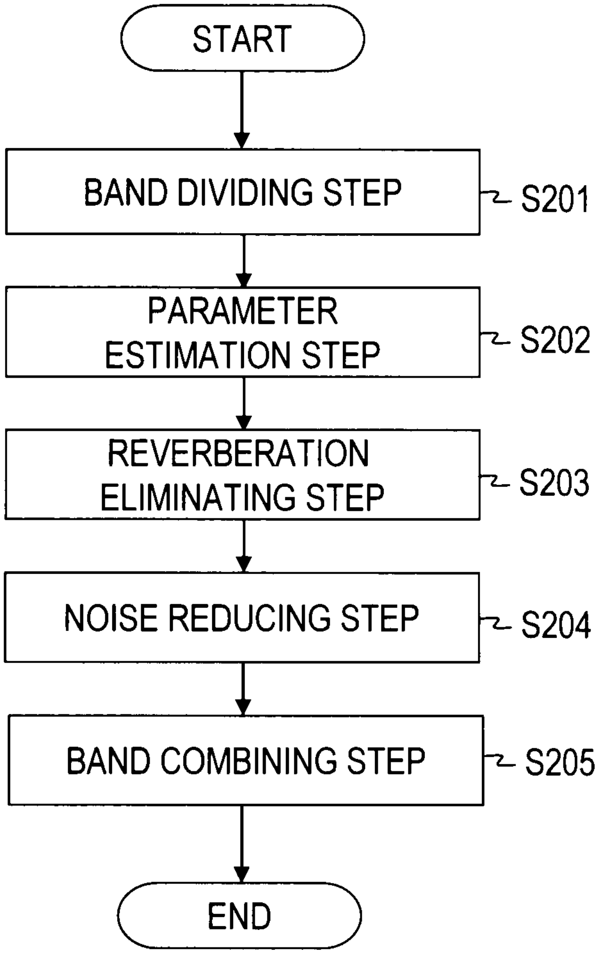
FIG. 10 is a flowchart describing processing in the third embodiment.

FIG. 9 is a block diagram showing the functional structure of a signal enhancement device 200 according to the third embodiment. FIG. 10 is a flowchart illustrating the processing in the third embodiment.

The signal enhancement device 200 in this embodiment includes a subband decomposition unit 220, a parameter estimation unit 310, a source signal estimation unit 230, a controller 250, and a subband synthesis unit 240. The source signal estimation unit 230 includes a linear filter 231 and a nonlinear filter 232. The subband decomposition unit 220 and the subband synthesis unit 240 are the same as those in the first and second embodiments. The signal enhancement device 200 is a special device implemented by reading a predetermined program into a computer composed of a CPU, a RAM, a ROM, and other units and executing the program on the CPU.

The subband decomposition unit 220 decomposes time-domain observed signals to observed signal vectors $y_{t,w}$ ($0 \le t \le T-1$, $0 \le w \le N-1$) in different frequency bands (step S201), where the number of frequency bands are set in advance. Based on the input observed signal vector $y_{t,w}$, the parameter estimation unit 310 estimates the true values of reverberation parameters ${}_g\Theta$ including a regression matrix $G_{k,w}$ required for estimating reverberation, noise parameters ${}_v\Theta$ including a noise short-term cross-power spectral matrix ${}_v\Lambda_w$ required for estimating the source signal, source parameters ${}_s\Theta$ that define the source-signal short-term power spectrum ${}_s\lambda_{t,w}$, and a set ${}_b\Theta$ of steering vectors $b_w$ (step S202).

<Details of Step S202>

Figure 11:
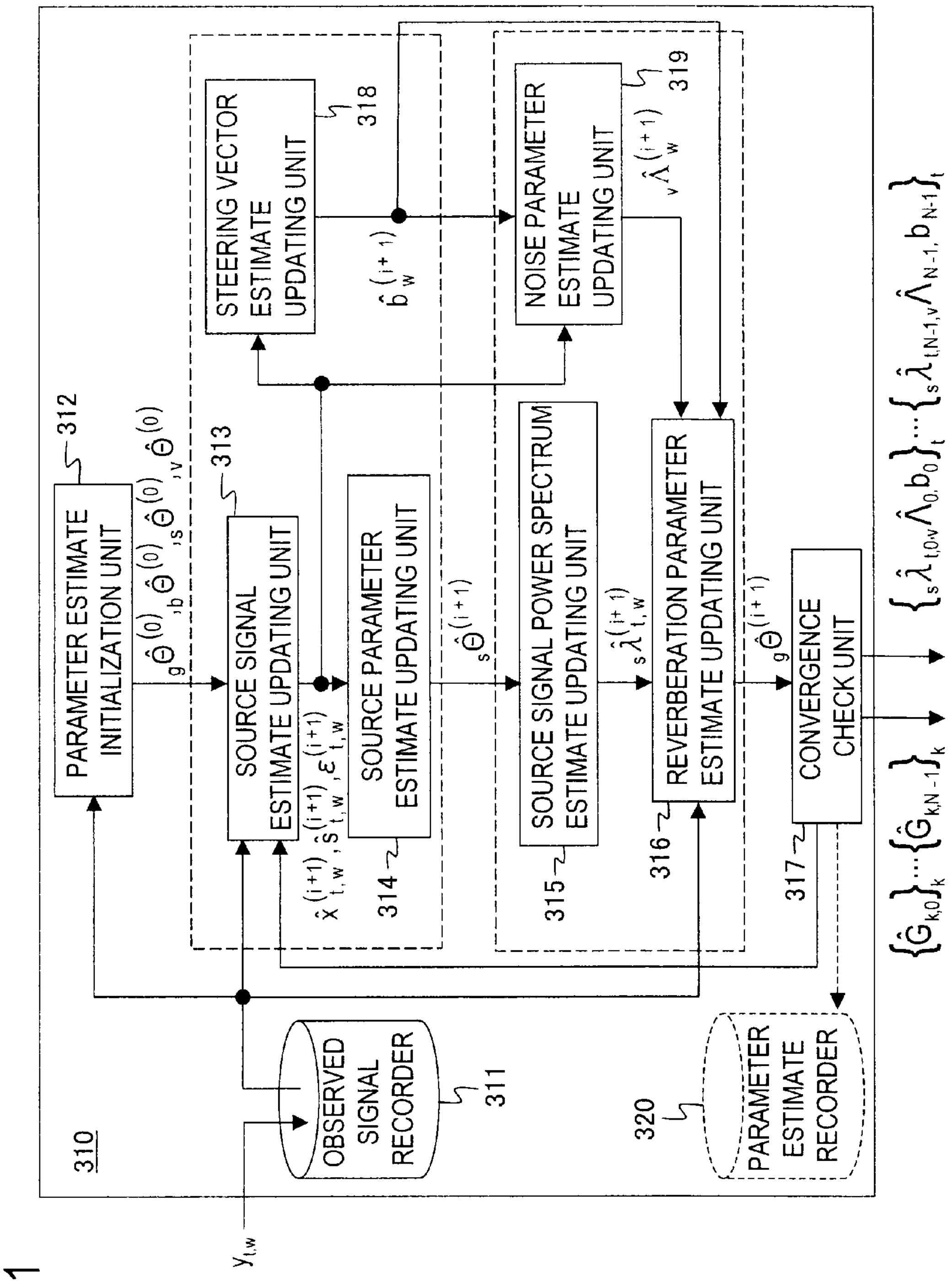
FIG. 11 is a block diagram showing an example functional structure of a parameter estimation unit in the third embodiment.
Figure 12:
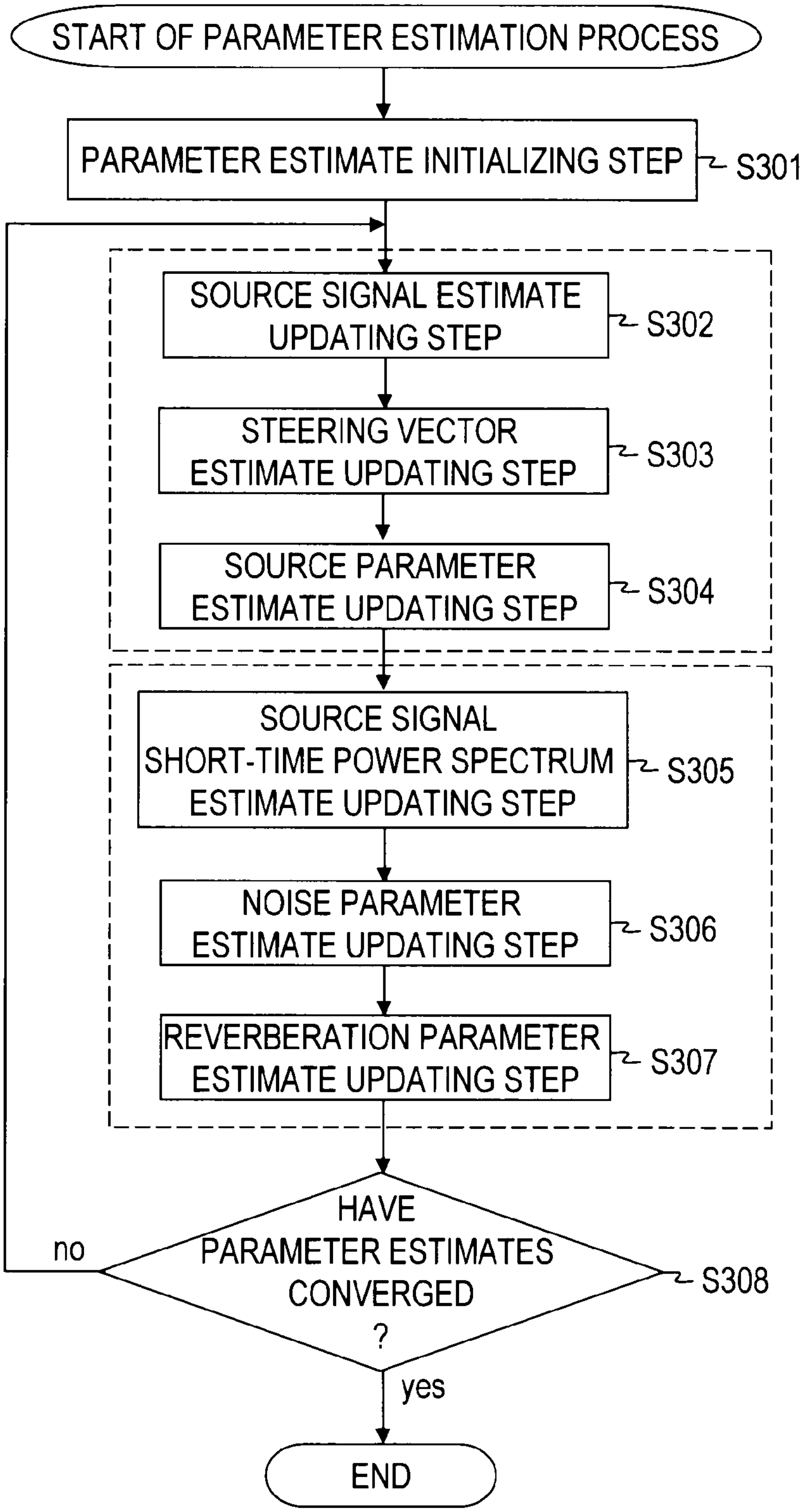
FIG. 12 is a flowchart describing parameter estimation processing in the third embodiment.

FIG. 11 is a block diagram showing the functional structure of the parameter estimation unit 310 of the third embodiment. FIG. 12 is a flowchart illustrating the parameter estimation processing in the third embodiment. The parameter estimation unit 310 of this embodiment iteratively updates the estimates of the reverberation parameters ${}_g\Theta$, the steering vectors $_b\Theta$, the source parameters $_s\Theta$, and the noise parameters $_v\Theta$ with maximum likelihood estimation for the unknown parameters $\Theta$.

The parameter estimation unit 310 consists of an observed signal storage 311, a parameter estimate initialization unit 312 (corresponding to the initialization unit), a source signal estimate updating unit 313, a source parameter estimate updating unit 314, a source signal power spectrum estimate updating unit 315, a reverberation parameter estimate updating unit 316, a steering vector estimate updating unit 318, a noise parameter estimate updating unit 319, and a convergence check unit 317.

The source signal estimate updating unit 313, the steering vector estimate updating unit 318, and the source parameter estimate updating unit 314 are included in the first updating unit, which was described earlier. The source signal power spectrum estimate updating unit 315, the noise parameter estimate updating unit 319, and the reverberation parameter estimate updating unit 316 are included in the second updating unit, which was described earlier.

The observed signal storage 311 stores the observed signal that are obtained by being divided into the predetermined number of frequency bands by the subband decomposition unit 220. The observed signal storage 311 stores all noisy reverberant signals captured in the observation period. The observed signal storage 311 outputs the observed signals to the source signal estimate updating unit 313, the reverberation parameter estimate updating unit 316, and the parameter estimate initialization unit 312.

The parameter estimate initialization unit 312 specifies the initial values of the reverberation parameters $_g\Theta$, the steering vectors $_b\Theta$, the source parameters $_s\Theta$, and the noise parameters $_v\Theta$, by using the input observed signal vectors $y_{t,w}$. The controller 250 sets an index i indicating an iteration count to 0.

The source signal estimate updating unit 313 updates the source signal estimate $S_{t,w}^{(i)\hat{}}$, its associated error variance, and the noisy signal estimate $\phi_{t,w}^{(i)\hat{}}$ to obtain $S_{t,w}^{(i+1)\hat{}}$, the updated associated error variance, and $\phi_{t,w}^{(i+1)\hat{}}$. This is done by using the input observed signal vectors $y_{t,w}$ and the initial values $_g\Theta^{(0)\hat{}}$, $_b\Theta^{(0)\hat{}}$, $_s\Theta^{(0)\hat{}}$, and $_v\Theta^{(0)\hat{}}$ of the parameter estimates or updated parameter estimates $_g\Theta^{(i)\hat{}}$, $_b\Theta^{(i)\hat{}}$, $_s\Theta^{(i)\hat{}}$, and $_v\Theta^{(i)\hat{}}$ (step S301). Here, $S_{t,w}^{(i+1)\hat{}}$ is calculated by using Equation (115), $\phi_{t,w}^{(i+1)\hat{}}$ is calculated by using Equation (114), and the error variance is calculated by using Equation (122).

$$\varepsilon_{t,w}^{(i+1)} = \left({}_s\hat{\lambda}_{t,w}^{(i)-1} + \hat{b}_w^{(i)\tau}\,{}_v\hat{\Lambda}_w^{(i)-1}\hat{b}_w^{(i)}\right)^{-1} \tag{122}$$

The steering vector estimate updating unit 318 receives the updated source signal estimate $S_{t,w}^{(i+1)\hat{}}$ and the noisy signal estimate $\phi_{t,w}^{(i+1)\hat{}}$. By using them, the steering vector estimate updating unit 318 calculates the updated steering vector estimates according to Equation (123). Equation (123) is based on the assumption that the mean of the noise vector is $O_M$.

$$\hat{b}_w^{(i+1)} = \left(\sum_{t=0}^{T-1}(\hat{S}_{t,w}^{(i+1)})^*\hat{\phi}_{t,w}^{(i+1)}\right)\Bigg/\left(\sum_{t=0}^{T-1}|\hat{S}_{t,w}^{(i+1)}|^2\right) \tag{123}$$

Here, the asterisk (*) represents a complex conjugate. The updated steering vector estimates $_b\Theta^{(i+1)\hat{}}$ are obtained by calculating Equation (123) for all the frequency bands w (0≤w≤N−1) (step S303).

The source parameter estimate updating unit 314 calculates the power spectrum $\gamma_{t,w}^{(i+1)}$ that is obtained by adding the power of the source signal estimate $S_{t,w}^{(i+1)\hat{}}$ and the associated error variance $\epsilon_{t,w}^{(i+1)}$, as shown in Equation (124).

$$\gamma_{t,w}^{(i+1)} = |\hat{S}_{t,w}^{(i+1)}|^2 + \varepsilon_{t,w}^{(i+1)} \tag{124}$$

The source parameter estimate updating unit 314 updates the source parameter estimates based on the obtained power spectrum $\gamma_{t,w}^{(i+1)}$. This is done by using the Levinson-Durbin algorithm. Since the Levinson-Durbin algorithm is a widely known method, a detailed description thereof will be omitted. The updated source parameter estimates ($a_{t,1}^{(i+1)\hat{}}$, . . . , $a_{t,P}^{(i+1)\hat{}}$, $_s\sigma_t^{2(i+1)\hat{}}$) are calculated by the equations that are obtained by replacing $V_{t,w}^{(i)}$ with $\gamma_{t,w}^{(i+1)}$ in Equation (36) to (40). This process is done for all frame numbers t (0≤t≤T−1). Thus, the updated source parameter estimates $_s\Theta^{(i+1)\hat{}}$ are obtained (step S304).

The source signal power spectrum estimate updating unit 315 receives the updated source parameter estimates. The source signal power spectrum estimate updating unit 315 updates the short-term power spectrum estimates of the source signal by using the updated source parameter estimates (step S305). The updated short-term power spectrum estimates of the source signal, $_s\lambda_{t,w}^{(i+1)\hat{}}$, are calculated by using Equations (102), (103), and (104).

The noise parameter estimate updating unit 319 receives the updated source signal estimate $S_{t,w}^{(i+1)\hat{}}$, the noisy signal estimate $\phi_{t,w}^{(i+1)\hat{}}$, and the updated steering vector estimate $_b\Theta^{(i+1)\hat{}}$. By using them, the noise parameter estimate updating unit 319 calculates the noise short-term cross-power spectral matrix estimates $_v\Lambda_w^{(i+1)\hat{}}$ of all frequency bands w (0≤w≤N−1) according to Equation (125).

$${}_v\hat{\Lambda}_w^{(i+1)} = \sum_{t=0}^{T'-1}\left(\hat{\phi}_{t,w}^{(i+1)} - \hat{b}_w^{(i+1)}\hat{S}_{t,w}^{(i+1)}\right)\cdot\left(\hat{\phi}_{t,w}^{(i+1)} - \hat{b}_w^{(i+1)}\hat{S}_{t,w}^{(i+1)}\right)^H \tag{125}$$

Here, T' is a sufficiently small value, and the period from t=0 to t=T'−1 corresponds to the beginning part of the observed signal. This embodiment assumes that the T' frames (0.3 second, for example) at the beginning contains noise alone, and the noise short-term cross-power spectral matrix estimates $_v\Lambda_w^{(i+1)\hat{}}$ are updated by using this period (step S306).

The reverberation parameter estimate updating unit 316 calculates the updated reverberation parameter estimates $_g\Theta^{(i+1)\hat{}}$, by using the input observed signal vectors $y_{t,w}$, the updated steering vector estimates $_b\Theta^{(i+1)\hat{}}$, the source signal short-term power spectrum estimates $_s\lambda_{t,w}^{(i+1)\hat{}}$, and the noise short-term cross-power spectral matrix estimates $_v\Lambda_w^{(i+1)\hat{}}$ (step S307). When implementing the reverberation parameter estimate updating unit 316, the elements of the regression matrices in the w-th frequency band are put into a single vector according to Equation (126) and Equation (127).

$$g_w = [g_{1,w}, \ldots, g_{K_w,w}]_{1\times M^2K_w} \tag{126}$$

$$g_{k,w} = [g_{k,w}^{(1)\tau}, \ldots, g_{k,w}^{(M)\tau}]_{1\times M^2} \tag{127}$$

The subscripts appearing in Equation (126) and Equation (127) represent the sizes of the matrices (or vectors) appearing in the respective equations, where $g_{k,w(m)}$ represents the m-th column of regression matrix $G_{k,w}$. Hereafter, $g_w$ is referred to as a regression matrix component vector. A set $\{g_w\}_{0\le w\le N-1}$ of the component vectors $g_w$ across the whole frequency bands is equivalent to the reverberation parameters ${}_g\Theta$.

An observed signal matrix for the previous frame, $MY_{t-1,w}$, is defined as Equation (128).

$$MY_{t-1,w} = \lfloor my_{t-1,w}, \ \ldots \ , my_{t-K_w,w} \rfloor_{M\times M^2 K_w} \tag{128}$$

$$my_{t-k,w} = \begin{bmatrix} y_{t-k,w}^T & & 0 \\ & \ddots & \\ 0 & & y_{t-k,w}^T \end{bmatrix}_{M\times M^2} \tag{129}$$

By using these equations, the updated regression matrix component vector estimates $g_w^{(i+1)\hat{}}$ are calculated as Equation (130).

$$\hat{g}_w^{(i+1)} = \left\{ \left( \sum_{t=0}^{T-1} MY_{t-1,w}^H {}_\phi\hat{\Lambda}_{t,w}^{(i+1)^{-1}} \cdot MY_{t-1,w} \right)^{-1} \times \left( \sum_{t=0}^{T-1} MY_{t-1,w}^H {}_\phi\hat{\Lambda}_{t,w}^{(i+1)^{-1}} \cdot y_{t,w} \right) \right\}^H \tag{130}$$

Here, ${}_\phi\Lambda_{t,w}^{(i+1)\hat{}}$ can be obtained by substituting $b_w = b_w^{(i+1)\hat{}}$, ${}_s\lambda_{t,w} = {}_s\lambda_{t,w}^{(i+1)\hat{}}$, and ${}_v\Lambda_w = {}_v\Lambda_w^{(i+1)\hat{}}$ in Equation (119). By calculating the updated component vector estimates in all the frequency bands w ($0\le w\le N-1$), the updated reverberation parameter estimates ${}_g\Theta^{(i+1)\hat{}}$ are obtained.

The convergence check unit 317 decides whether the reverberation parameter estimates ${}_g\Theta^{(i+1)\hat{}}$ updated according to the procedure described above, the steering vector estimates ${}_b\Theta^{(i+1)\hat{}}$, the source parameter estimates ${}_s\Theta_{(i+1)\hat{}}$, and the noise parameters ${}_v\Theta^{(i+1)\hat{}}$ have been converged (by checking the termination condition) (step S308). For example, the convergence check unit 317 may determine that these parameter estimates have been converged if the iteration count i reaches a predetermined number or if the increment in the logarithmic likelihood function (Equation (118)), which is obtained in each iteration of the above-described procedures, is smaller than a predetermined threshold. The operations of steps S302 to S307 are iterated until the estimates are converged. When the predetermined termination condition is satisfied, the reverberation parameter estimates ${}_g\Theta^{\hat{}(i+1)}$, the steering vector estimates ${}_b\Theta^{(i+1)\hat{}}$, the source parameter estimates ${}_s\Theta^{(i+1)\hat{}}$, and the noise parameters ${}_v\Theta^{(i+1)\hat{}}$ at that time are output to the source signal estimation unit 230. These parameter estimates may be stored in a parameter estimate storage 320 (now, the detailed description of step S202 has been completed).

The linear filter 231 obtains the reverberation by convolving the observed signal vector $y_{t,w}$ with the regression matrix estimates $G_{k,w}\hat{}$. The linear filter 231 then generates a dereverberated signal vector $\phi_{t,w}\hat{}$ by subtracting the obtained reverberation from the observed signal vector (step S203). The nonlinear filter 232 generates a source signal estimate $s_{t,w}\hat{}$ by reducing noise from the dereverberated signal $\phi_{t,w}\hat{}$, by using given noise short-term cross-power spectral matrix estimates ${}_v\Lambda_{t,w}\hat{}$, source signal short-term power spectrum estimates ${}_s\lambda_{t,w}\hat{}$, steering vector estimates $b_w\hat{}$, and the dereverberated signal $\phi_{t,w}\hat{}$ (step S204). The subband synthesis unit 240 combines the source signal estimates $S_{t,w}\hat{}$ to yield a time-domain source signal estimate (step S205). The controller 250 controls each of the processing units described above so that the time-domain (dereverberated/denoised) source signal estimate is generated from the input time-domain observed signal.

In the signal enhancement device 200, the linear filter 231 generates the dereverberated signal vector $\phi_{t,w}\hat{}$ by reducing reverberation from the observed signal vector $y_{t,w}$, and then the nonlinear filter 232 reduces noise from the dereverberated signal. The time-domain source signal estimate is obtained by processing the observed signal vector with the linear filtering and then the nonlinear filtering. Therefore, the noise and reverberation would be reduced sufficiently and the time-domain source signal estimate would be of high quality.

In the above description, the regression order (length of the linear filter) $K_w$ is a fixed scalar. The regression order may vary with the central frequency of the frequency band. It is widely known that the reverberation time depends on frequency. In usual room acoustics, since the reverberation time in the frequency bands below 500 Hz is long, the regression order $K_W$ may be increased in those frequency band, and the regression order $K_W$ may be decreased in the other frequency bands. The parameter estimation unit 310 may include a regression order changing unit 301, where the regression order changing unit 301 is used to change the regression order (the length of the linear filter 231) with the frequency band. This makes it possible to perform dereverberation efficiently. Accordingly, the amount of computation required by the linear filter 231 can be reduced. The same modification is possible for the first and second embodiments described earlier.

[Result of Experiment]

An experiment was conducted for the purpose of confirming the effect of the signal enhancement method of this embodiment. The experimental conditions of will now be described. Utterances of ten persons (five male and five female) were extracted from the ASJ-JNAS database and used as source signals. The speech signals were played from a loudspeaker placed in a room whose reverberation time was about 0.6 seconds and captured by two microphones that were placed 1.8 m away from the speaker. Pink noise was played simultaneously from four loudspeakers and captured by the same microphones in the same room. Then, the captured reverberant speech signals and noise were mixed so that the SNR became 10 dB, and the resultant signals were used as time-domain observed signals. The sampling frequency was 8 kHz.

The subband decomposition unit of this embodiment was implemented by using polyphase filter bank analysis. The number of frequency bands were 256, and the decimation factor was 128.

The linear prediction order of a source signal was P=12. The regression orders $K_w$ were set depending on the frequency band: $K_w$=5 for frequency bands below 100 Hz, $K_w$=10 for 100 to 200 Hz, $K_w$=30 for 200 to 1,000 Hz, $K_w$=20 for 1,000 to 1,500 Hz, $K_w$=15 for 1,500 to 2,000 Hz, $K_w$=10 for 2,000 to 3,000 Hz, $K_w$=5 for 3,000 Hz or above. The convergence check unit determined that convergence was achieved when the iteration count was 3.

Under the above conditions, the average MFCC distances between the source signal and the observed signal, those between the source signal and the source signal estimate of the first embodiment, and those between the source signal and the source signal estimate of this embodiment were compared. The averages were 7.39, 5.81, and 5.11, respectively. This result indicates that the signal enhancement method of the present embodiment was the best in terms of the MFCC distance.

The present invention is not limited to the embodiments described above. The processing described above is not always executed in the chronological order according to the description; it may be executed in parallel or separately depending on the capability of the device that executes the processing. Any other modifications may be made within the scope of the present invention.

If the procedures described above are to be implemented by using a computer, the function of each unit is described by a program. When the program is executed by the computer, the corresponding function is simulated on the computer.

The program implementing the procedures can be stored on a computer-readable recording medium. The computer-readable recording medium can be of any type, such as magnetic recording apparatuses, optical disks, magneto-optical recording media, and semiconductor memories.

The program is distributed, for example, by selling, transferring, lending, of a DVD, a CD-ROM, or any other types of transportable recording medium on which the program is recorded. The program may be distributed by storing the program in a storage device of a server computer and transferring the program from the server computer to another computer through a computer network.

For example, the computer for executing the program first stores the program recorded on the transportable recording medium or the program transferred from the server computer in its own storage device. Then, when the processing is executed, the computer reads the program stored in its own recording medium and executes processing in accordance with the read program. There are some other program execution styles: The computer may execute the programmed processing by reading the program directly from the transportable recording medium; and each time the program is transferred from the server computer, the computer may execute processing in accordance with the transferred program.

The device is configured in each of the above embodiments by executing the predetermined program on the computer. At least a part of the processing can be implemented by hardware.

INDUSTRIAL APPLICABILITY

The fields of the present invention include processing for enhancing the source speech signal in speech recognition systems, videoconferencing systems, and others.

What is claimed is:

1. An acoustic signal enhancement device comprising:

a memory which stores time-frequency-domain observed signals which are calculated based on acoustic signals observed in the time domain; and circuitry configured to act as:

an initializer which sets initial values of parameter estimates that include reverberation parameter estimates, which include regression coefficients used for linear convolution performed for calculating an estimate of reverberation contained in the time-frequency-domain observed signals, source parameter estimates, which include estimates of linear prediction coefficients and prediction residual powers that characterize power spectra of a source signal, and noise parameter estimates, which include one or more noise power spectrum estimates;

a first updater which receives the time-frequency-domain observed signals and the parameter estimates for a predetermined observation period, and executes any one of two update processing stages: one updates at least the reverberation parameter estimates for the predetermined observation period; another updates the source parameter estimates for the predetermined observation period, where update in the two update processing stages is done so that a logarithmic likelihood function of the parameter estimates is increased;

a second updater which receives at least a part of the parameter estimates updated by the first updater and executes one of the two update processing stages: one updates at least the reverberation parameter estimates for the predetermined observation period; the other updates the source parameter estimates for the predetermined observation period, where the one of the two update processing stages that has not been executed by the first updater is chosen and update in a chosen update processing stage is done so that a logarithmic likelihood function of the parameter estimates is increased; and a checker which checks if a termination condition for the predetermined observation period is satisfied, wherein the linear convolution performed for calculating the estimate of reverberation for each time frame comprising the predetermined observation period includes a linear convolution performed on a plurality of successive time frames which are previous to the time frame; and if the termination condition is not satisfied, a processing in the first updater is executed again for the predetermined observation period and then a processing in the second updater is executed again for the predetermined observation period.

2. The acoustic signal enhancement device according to claim 1, wherein the acoustic signals observed in the time domain are signals observed by M sensors;

the reverberation parameter estimates include M-by-M regression matrix estimates whose elements are the regression coefficients;

the noise parameter estimates include an M-by-M noise cross-power spectral matrix estimate whose diagonal elements are the one or more noise power spectrum estimates;

the parameter estimates include the reverberation parameter estimates, the source parameter estimates, the noise parameter estimates, and an M-dimensional steering vector estimate;

the first updater comprises a source signal estimate updater, a steering vector estimate updater, and a source parameter estimate updater, where the source signal estimate updater receives the time-frequency-domain observed signals and the parameter estimates and calculates noisy signal estimates, a source signal estimate, and error variances associated with the source signal estimate, the steering vector estimate updater receives the noisy signal estimates and the source signal estimate and calculates an updated estimate of a steering vector, and the source parameter estimate updater calculates power spectra by adding powers of the source signal estimates and the error variances and uses the power spectra to calculate updated estimates of source parameters; and the second updater comprises a source signal power spectrum estimate updater, a noise parameter estimate updater, and a reverberation parameter estimate updater, where the source signal power spectrum estimate updater receives the updated estimates of the source parameters and calculates updated estimates of source signal power spectra that are defined by the updated estimates of the source parameters, the noise parameter estimate updater receives the source signal estimate, the noisy signal estimates, and the updated estimate of the steering vector and calculates updated estimates of the noise parameters, and the reverberation parameter estimate updater receives the time-frequency-domain observed signals, the updated estimate of the steering vector, the updated estimates of the source signal power spectra, and the updated estimates of the noise parameters and calculates updated estimates of regression matrices.

3. The acoustic signal enhancement device according to claim 2, wherein the (m, m)-th element (m∈1, . . . , M) of the noise cross-power spectral matrix estimate is given by a power spectrum of a noise at the m-th sensor, and the (m1, m2)-th element (m1, m2 ∈1, . . . , M) of the noise cross-power spectral matrix estimate is given by a cross spectrum between noises contained in the time-frequency-domain observed signals of the m1-th and m2-th sensors;

the noisy signal estimates are given by an M-dimensional vector that is obtained by subtracting a convolution of the regression matrix estimates and an observed signal vector from the observed signal vector, where the observed signal vector is a non-conjugate transpose of an M-dimensional vector whose elements are time-frequency-domain observed signals associated with the sensors;

the source signal estimate is a product of the noisy signal estimates and a gain vector of a Wiener filter derived from the estimates of source signal power spectra, the noise cross-power spectral matrix estimate, and the steering vector estimate;

each of the error variances of the source signal estimate is a reciprocal of a sum of a product of a non-conjugate transpose of the steering vector estimate, the inverse matrix of the noise cross-power spectral matrix estimate, and the steering vector estimate, and one of the reciprocals of the estimates of source signal power spectra;

an updated estimate of the steering vector is a vector obtained by dividing a sum of products of complex conjugates of the source signal estimates and the noisy signal estimate by a sum of powers of the source signal estimate;

an updated estimate of a noise cross-power spectral matrix is a sum of products of noise vectors and conjugate transposes of the noise vectors, where each noise vector is obtained by subtracting a product of the source signal estimate and the updated estimate of the steering vector from the noisy signal estimates;

a component vector consisting of the elements of the updated estimates of the regression matrices is calculated as a conjugate transpose of a product of an inverse matrix of a sum of products of conjugate transposes of observed signal matrices comprising the time-frequency-domain observed signals, inverse matrices of estimates of covariance matrices of the noisy signals, and the observed signal matrices, and a sum of products of conjugate transposes of the observed signal matrices, the inverse matrices of the estimates of the covariance matrices of the noisy signals, and observed signal vectors that consist of time-frequency-domain observed signals; and each of the estimates of the covariance matrices of the noisy signals is a sum of the updated estimate of the noise cross-power spectral matrix and one of products of the updated estimates of the source signal power spectra, the updated estimate of the steering vector, and the conjugate transpose of the updated estimates of the steering vector.

4. The acoustic signal enhancement device according to claim 2, wherein regression orders of the regression matrix estimates included in the reverberation parameter estimates or updated reverberation parameter estimates can be changed depending on frequency bands.

5. The acoustic signal enhancement device according to claim 2 comprising:

a linear filter which receives the time-frequency-domain observed signals and final reverberation parameter estimates and generates final noisy signal estimates that are obtained as elements of an M-dimensional vector calculated by subtracting a convolution of the final reverberation parameter estimates and the observed signal vector from observed signal vector; and a non-linear filter which receives a final source signal power spectrum estimates that are defined on final source parameter estimates, a final noise cross-power spectral matrix estimate included in final noise parameter estimates, a final steering vector estimate, and the final noisy signal estimates, and calculates a final source signal estimate as the product of a gain vector of a Wiener filter and the final noisy signal estimates, where the gain vector is derived from the final source signal power spectrum estimates, the final noise cross-power spectral matrix estimate, and the final steering vector estimate, wherein the final reverberation parameter estimates, the final source parameter estimates, the final noise parameter estimates, and the final steering vector estimate include the updated estimates of the regression matrices, the updated estimates of the source parameters, the updated estimates of the noise parameters, and the updated estimate of the steering vector, respectively, that are obtained at the time the termination condition is satisfied.

6. The acoustic signal enhancement device according to claim 1, wherein the acoustic signals observed in the time domain are signals observed by one sensor;

the parameter estimates include the source parameter estimates, the reverberation parameter estimates, and the noise parameter estimates;

the first updating unit updates the source parameter estimates, and the second updating unit updates the reverberation parameter estimates;

the first updating unit comprises a noise reduction unit and a source parameter estimate updating unit, where the noise reduction unit receives the time-frequency-domain observed signals and the parameter estimates, and calculates a covariance matrix and a mean of a complex normal distribution that defines a conditional posterior distribution p(reverberant signal set|observed signal set, parameter estimates) of a reverberant signal set given an observed signal set and the parameter estimates, where elements of the reverberant signal set are given by reverberant signals in the predetermined observation period, and elements of the observed signal set are given by the time-frequency-domain observed signals in the predetermined observation period, the reverberant signals are obtained by removing noise from the time-frequency-domain observed signals, the source parameter estimate updating unit receives the reverberation parameter estimates and the covariance matrix and mean of the complex normal distribution, calculates updated estimates of the source parameters, and updates the source parameter estimates with the updated estimates of the source parameters, the updated estimates of the source parameters are obtained by maximizing a first auxiliary function while fixing reverberation parameters in the reverberation parameter estimates, and a value of the first auxiliary function is an integral of a product of the conditional posterior distribution p(reverberant signal set|observed signal set, parameter estimates) and a log of a first likelihood function p(observed signal set, reverberant signal set|second parameter estimates) of second parameter estimates with respect to the reverberant signal set, where the first likelihood function is defined on the observed signal set and the reverberant signal set and the second parameter estimates include the reverberation parameter estimates, the updated estimates of the source parameters, and the noise parameter estimates; and the second updating unit comprises a reverberation parameter estimate updating unit, which receives the updated estimates of the source parameters and the covariance matrix and mean of the complex normal distribution, calculates updated estimates of the reverberation parameters, and updates the reverberation parameter estimates with the updated estimates of the reverberation parameters, where the updated estimates of the reverberation parameters are obtained by maximizing a second auxiliary function while fixing the source parameters in the source parameter estimates, and a value of the second auxiliary function is an integral of the product of the conditional posterior distribution p(reverberant signal set|observed signal set, parameter estimates) and a log of a second likelihood function p(observed signal set, reverberant signal set|third parameter estimates) of third parameter estimates with respect to the observed signal set and the reverberant signal set, where the third parameter estimates include the updated estimates of the reverberation parameters, the updated estimates of the source parameters, and the noise parameter estimates.

7. The acoustic signal enhancement device according to claim 1, wherein the acoustic signals observed in the time domain are signals observed by M sensors, where M is two or greater;

the reverberation parameter estimates include M-by-M regression matrix estimates whose elements are the regression coefficients;

the noise parameter estimates include an M-by-M noise cross-power spectral matrix estimate whose diagonal elements are the one or more noise power spectrum estimates;

the parameter estimates include the reverberation parameter estimates, the source parameter estimates, and the noise parameter estimates;

the first updating unit updates the source parameter estimates, and the second updating unit updates the reverberation parameter estimates;

the first updating unit comprises a noise reduction unit and a source parameter estimate updating unit, where the noise reduction unit receives the time-frequency-domain observed signals and the parameter estimates and calculates a covariance matrix and a mean of a complex normal distribution that defines a conditional posterior distribution p(reverberant signal set|observed signal set, parameter estimates) of a reverberant signal set given an observed signal set and the parameter estimates, where elements of the reverberant signal set are given by reverberant signals in the predetermined observation period, and elements of the observed signal set are given by the time-frequency-domain observed signals in the predetermined observation period, the reverberant signals are obtained by removing noises from the time-frequency-domain observed signals, the source parameter estimate updating unit receives the reverberation parameter estimates and the covariance matrix and mean of the complex normal distribution, calculates updated estimates of the source parameters, and updates the source parameter estimates with the updated estimates of the source parameters, the updated estimates of the source parameters are obtained by maximizing a first auxiliary function while fixing reverberation parameters in the reverberation parameter estimates, and a value of the first auxiliary function is an integral of a product of the conditional posterior distribution p(reverberant signal set|observed signal set, parameter estimates) and a log of a first likelihood function p(observed signal set, reverberant signal set|second parameter estimates) of second parameter set with respect to the reverberant signal set, where the first likelihood function is defined on the observed signal set and the reverberant signal set, and the second parameter estimates include the reverberation parameter estimates, the updated estimates of the source parameters, and the noise parameter estimates; and the second updating unit comprises a reverberation parameter estimate updating unit, which receives the updated estimates of the source parameters and the covariance matrix and the mean of the complex normal distribution, and calculates updated estimates of the reverberation parameters, and updates the reverberation parameter estimates with the updated estimates of the reverberation parameters, where the updated estimates of the reverberation parameter estimates are obtained by maximizing a second auxiliary function while fixing the source parameters in the source parameter estimates, and a value of the second auxiliary function is the integral of the product of the conditional posterior distribution p(reverberant signal set|observed signal set, parameter estimates) and a log of a second likelihood function p(observed signal set, reverberant signal set|third parameter estimates) of third parameter estimates with respect to the observed signal set and the reverberant signal set, where the third parameter estimates include the updated estimates of the reverberation parameters, the updated estimates of the source parameters, and the noise parameter estimates.

8. The acoustic signal enhancement device according to one of claims 6 and 7, wherein each of the one or more noise parameter estimates to a variance of a complex normal distribution that defines a probability distribution of a noise; and a scale of a covariance matrix of the conditional posterior distribution p(reverberant signal set|observed signal set, parameter estimates) monotonically increases as the variance of the complex normal distribution that defines the probability distribution of the noise.

9. The acoustic signal enhancement device according to one of claims 6 and 7 comprising a source signal estimation unit which receives the third parameter estimates as fourth parameter estimates and the time-frequency-domain observed signals when the termination condition is satisfied and calculates source signal estimates, where the source signal estimation unit comprises:

a reverberant signal estimation unit which receives the time-frequency-domain observed signals and the fourth parameter estimates and calculates a mean of the conditional posterior distribution p(reverberant signal set|observed signal set, parameter estimates) to give one or multiple final reverberant signal estimates; and a linear filtering unit which receives the one or multiple final reverberant signal estimates and reverberation parameter estimates that are included in the fourth parameter estimates and calculates a final source signal estimate by subtracting a convolution of the one or multiple final reverberant signal estimates and regression coefficients or regression matrices included in the reverberation parameter estimates after the update, from the one or multiple final reverberant signal estimates.

10. The acoustic signal enhancement device according to one of claims 6 and 7, wherein each of the one or more noise power spectrum estimates is calculated by using the time-frequency-domain observed signals in a period wherein the source signal is assumed to be absent.

11. The acoustic signal enhancement device according to one of claims 6 and 7, wherein regression orders of the regression coefficients of the reverberation parameter estimates or updated reverberation parameter estimates can be changed depending on frequency bands.

12. An acoustic signal enhancement method, implemented by an acoustic signal enhancement device, comprising:

(A) a step of storing, in a memory of the acoustic signal enhancement device, time-frequency-domain observed signals which are calculated based on acoustic signals observed in a time domain;

(B) a step of setting, in an initialization unit, initial values of parameter estimates that include reverberation parameter estimates, which include regression coefficients used for linear convolution performed for calculating an estimate of reverberation contained in the time-frequency-domain observed signals, source parameter estimates, which include estimates of linear prediction coefficients and prediction residual powers that characterize power spectra of a source signal, and noise parameter estimates, which include one or more noise power spectrum estimates;

(C) a step of inputting the time-frequency-domain observed signals and the parameter estimates for a predetermined observation period to a first updating unit and executing, in the first updating unit, any one of two update processing stages: one updates at least the reverberation parameter estimates for the predetermined observation period; another updates the source parameter estimates for the predetermined observation period, where the update in the any one of the two update processing stages is done so that a logarithmic likelihood function of the parameter estimates is increased;

(D) a step of inputting at least a part of the parameter estimates updated in the step (C), to a second updating unit and executing, in the second updating unit, one of two updating processing stages: one updates at least the reverberation parameter estimates for the predetermined observation period; the other updates the source parameter estimates for the predetermined observation period, where the one of two updating processing stages that has not been executed in the step (C) is chosen and updated in a chosen update processing stage is done so that a logarithmic likelihood function of the parameter estimates is increased; and (E) a step of checking, in a termination condition check unit, whether a termination condition is satisfied for the predetermined observation period, wherein the linear convolution performed for calculating the estimate of reverberation includes a linear convolution performed on a plurality of successive observation periods which are previous to the predetermined observation period; and if the termination condition is not satisfied, a processing in the first updating unit is executed again for the predetermined observation period and then a processing in the second updating unit is executed again for the predetermined observation period.

13. The acoustic signal enhancement method according to claim 12, wherein the acoustic signals observed in the time domain are signals observed by M sensors;

the reverberation parameter estimates include M-by-M regression matrix estimates whose elements are the regression coefficients;

the noise parameter estimates include an M-by-M noise cross-power spectral matrix estimate whose diagonal elements are the one or more noise power spectrum estimates;

the parameter estimates include the reverberation parameter estimates, the source parameter estimates, the noise parameter estimates, and an M-dimensional steering vector estimate;

the first updating unit comprises a source signal estimate updating unit, a steering vector estimate updating unit, and a source parameter estimate updating unit, the step (C) comprises:

(C-1) a step of inputting the time-frequency-domain observed signals and the parameter estimates to the source signal estimate updating unit and calculating, in the source signal estimate updating unit, noisy signal estimates, a source signal estimate, and error variances associated with the source signal estimate;

(C-2) a step of inputting the noisy signal estimates and the source signal estimate to the steering vector estimate updating unit and calculating, in the steering vector estimate updating unit, an updated estimate of a steering vector; and (C-3) a step of calculating power spectra by adding powers of the source signal estimates and the error variances and using the power spectra to calculate updated estimates of source parameter, in the source parameter estimate updating unit, and the second updating unit comprises a source signal power spectrum estimate updating unit, a noise parameter estimate updating unit, and a reverberation parameter estimate updating unit;

the step (D) comprises:

(D-1) a step of inputting the updated estimates of the source parameters to the source signal power spectrum estimate updating unit and calculating, in the source xc signal power spectrum estimate updating unit, an updated estimate of source signal power spectra that are defined by the updated estimates of the source parameters;

(D-2) a step of inputting the source signal estimate, the noisy signal estimates, and the updated estimate of the steering vector to the noise parameter estimate updating unit and calculating, in the noise parameter estimate updating unit, updated estimates of the noise parameters; and (D-3) a step of inputting the observed signal, the updated estimate of the steering vector, the updated estimates of the source signal power spectra, and the updated estimates of the noise parameters to the reverberation parameter estimate updating unit and calculating, in the reverberation parameter estimate updating unit, updated estimates of regression matrices.

14. The acoustic signal enhancement method according to claim 12, wherein the acoustic signals observed in the time domain are signals observed by one sensor;

the parameter estimates include the source parameter estimates, the reverberation parameter estimates, and the noise parameter estimates;

the first updating unit updates the source parameter estimates, and the second updating unit updates the reverberation parameter estimates;

the first updating unit comprises a noise reduction unit and a source parameter estimate updating unit, the step (C) comprises:

(C-1) a step of inputting the observed signal and the parameter estimates to the noise reduction unit and calculating, in the noise reduction unit, covariance matrix and mean of the complex normal distribution that defines the conditional posterior distribution p(reverberant signal set|observed signal set, parameter estimates) of a reverberant signal set given an observed signal set and the parameter estimates, where elements of the reverberant signal set are given by reverberant signals in the predetermined observation period, and elements of the observed signal set are given by the time-frequency-domain observed signals in the predetermined observation period; and (C-2) a step of inputting the reverberation parameter estimates and the covariance matrix and means of complex normal distribution to the source parameter estimate updating unit, calculating, in the source parameter estimate updating unit, updated estimates of the source parameters, and updating the source parameter estimates with the updated estimates of the source parameters, the reverberant signals are obtained by removing noises from the time-frequency-domain observed signals, the updated estimates of the source parameters are obtained by maximizing a first auxiliary function while fixing reverberation parameters in the reverberation parameter estimates, and a value of the first auxiliary function is an integral of a product of the conditional posterior distribution p(reverberant signal set|observed signal set, parameter estimates) and a log of a first likelihood function p(observed signal set, reverberant signal set|second parameter estimates) of second parameter estimates with respect to the reverberant signal set, where the first likelihood function is defined on the observed signal set and the reverberant signal set and the second parameter estimates include the reverberation parameter estimates, the updated estimates of the source parameters, and the noise parameter estimates; and the second updating unit comprises a reverberation parameter estimate updating unit;

the step (D) comprises a step of inputting the updated estimates of the source parameters and the covariance matrix and mean of the complex normal distribution to the reverberation parameter estimate updating unit, calculating, in the reverberation parameter estimate updating unit, updated estimates of the reverberation parameters, and updating the reverberation parameter estimates with the updated estimates of the reverberation parameters, where the updated estimates of the reverberation parameters are obtained by maximizing a second auxiliary function while fixing the source parameters in the source parameter estimates, and a value of the second auxiliary function is an integral of a product of the conditional posterior distribution p(reverberant signal set|observed signal set, parameter estimates) and a log of a second likelihood function p(observed signal set, reverberant signal set|third parameter estimates) of third parameter estimates with respect to the observed signal set and the reverberant signal set, where the third parameter estimates include the updated estimates of the reverberation parameter estimates, the updated estimates of the source parameters, and the noise parameter estimates.

15. The acoustic signal enhancement method according to claim 12, wherein the acoustic signals observed in the time domain are signals observed by M sensors, where M is two or greater;

the reverberation parameter estimates include M-by-M regression matrix estimates whose elements are the regression coefficients;

the noise parameter estimates include an M-by-M noise cross-power spectral matrix estimate whose diagonal elements are the one or more noise power spectrum estimates;

the parameter estimates include the reverberation parameter estimates, the source parameter estimates, and the noise parameter estimates;

the first updating unit updates the source parameter estimates, and the second updating unit updates the reverberation parameter estimates;

the first updating unit comprises a noise reduction unit and a source parameter estimate updating unit, the step (C) comprises:

(C-1) a step of inputting the time-frequency-domain observed signals and the parameter estimates to the noise reduction unit and calculating, in the noise reduction unit, the covariance matrix and the mean of the complex normal distribution that defines the conditional posterior distribution p(reverberant signal set|observed signal set, parameter estimates) of a reverberant signal set given an observed signal set and the parameter estimates, where elements of the reverberant signal set are given by reverberant signals in the predetermined observation period, and elements of the observed signal set are given by the time-frequency-domain observed signals in the predetermined observation period; and (C-2) a step of inputting the reverberation parameter estimates and the covariance matrix and means of complex normal distribution to the source parameter estimate updating unit, calculating, in the source parameter estimate updating unit, updated estimates of the source parameters, and updating the source parameter estimates with the updated estimates of the source parameters, the reverberant signals are obtained by removing noises from the time-frequency-domain observed signals, the updated estimates of the source parameters are obtained by maximizing a first auxiliary function while fixing reverberation parameters in the reverberation parameter estimates, and a value of the first auxiliary function is an integral of a product of the conditional posterior distribution p(reverberant signal set|observed signal set, parameter estimates) and a log of a first likelihood function p(observed signal set, reverberant signal set|second parameter estimates) of second parameter set with respect to the reverberant signal set, where the first likelihood function is defined on the observed signal set and the reverberant signal set, and the second parameter estimates include the reverberation parameter estimates, the updated estimates of the source parameters, and the noise parameter estimates; and the second updating unit comprises a reverberation parameter estimate updating unit;

the step (D) comprises a step of inputting the updated estimates of the source parameters and the covariance matrix and the mean of the complex normal distribution to the reverberation parameter estimate updating unit, calculating, in the reverberation parameter estimate updating unit, updated estimates of the reverberation parameters, and updating the reverberation parameter estimates with the updated estimates of the reverberation parameters, where the updated estimates of the reverberation parameters are obtained by maximizing a second auxiliary function while the source parameters are kept fixed to the source parameter estimates, and a value of the second auxiliary function is the integral of the product of the conditional posterior distribution p(reverberant signal set|observed signal set, parameter estimates) and a log of a second likelihood function p(observed signal set, reverberant signal set|third parameter estimates) of third parameter estimates with respect to the observed signal set and the reverberant signal set, where the third parameter estimates include the updated estimates of the reverberation parameters, the updated estimates of the source parameters, and the noise parameter estimates.

16. A non-transitory computer-readable recording medium having stored therein a program for enabling a computer to execute each step of the acoustic signal enhancement method according to any one of claims 12, 13, 14, and 15.

* * * * *

UNITED STATES PATENT AND TRADEMARK OFFICE

CERTIFICATE OF CORRECTION

PATENT NO. : 8,848,933 B2
APPLICATION NO. : 12/920222
DATED : September 30, 2014
INVENTOR(S) : Takuya Yoshioka et al.

It is certified that error appears in the above-identified patent and that said Letters Patent is hereby corrected as shown below:

In the Claims:

Column 41, Claim 1, line 50, change "act as" to --provide--;
line 51, change "initializer" to --initialization unit--;
line 62, change "updater" to --updating unit--;

Column 42, Claim 1, line 2, change "where update in the two" to --where the update in the any one of the two--;
line 5, change "updater" to --updating unit--;
line 6, change "updater" to --updating unit--;
line 13, change "updater" to --updating unit--;
line 17, change "checker" to --termination condition check unit--;
line 26, change "updater" to --updating unit--;
line 28, change "updater" to --updating unit--.

Column 42, Claim 2, line 45, change "updater" to --updating unit--;
line 46, change "updater, a steering vector estimate updater" to --updating unit, a steering vector estimate updating unit--;
line 47, change "updater" to --updating unit--;
line 48, change "updater" to --updating unit--;
line 53, change "updater" to --updating unit--;
line 56, change "updater" to --updating unit--;
line 60, change "updater" to --updating unit--;
line 61, change "updater" to --updating unit--;
line 62, change "updater" to --updating unit--;
line 63, change "updater" to --updating unit--;

Column 43, Claim 2, line 1, change "updater" to --updating unit--;
line 5, change "updater" to --updating unit--.

Signed and Sealed this
Seventeenth Day of March, 2015

Michelle K. Lee

Michelle K. Lee
*Director of the United States Patent and Trademark Office*